United States Patent
Narisi et al.

(10) Patent No.: US 6,757,744 B1
(45) Date of Patent: Jun. 29, 2004

(54) DISTRIBUTED TRANSPORT COMMUNICATIONS MANAGER WITH MESSAGING SUBSYSTEM FOR HIGH-SPEED COMMUNICATIONS BETWEEN HETEROGENEOUS COMPUTER SYSTEMS

(75) Inventors: Anthony Narisi, Glenmoore, PA (US); Lois B. Coyne, Lansdale, PA (US); Susan Jennion, Chester Springs, PA (US); Michael T. Kain, Chester Springs, PA (US); Charles Austin Parker, Exton, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/310,543

(22) Filed: May 12, 1999

(51) Int. Cl.[7] .............................................. G06F 15/16
(52) U.S. Cl. ...................................................... 709/250
(58) Field of Search ........................ 709/250, 321–328; 370/463; 712/28–31; 703/23–25; 719/321–328

(56) References Cited

U.S. PATENT DOCUMENTS

| | | |
|---|---|---|
| 3,400,372 A | 9/1968 | Beausoleil et al. |
| 4,155,117 A | 5/1979 | Mitchell et al. |
| 4,414,620 A | 11/1983 | Tsuchimoto et al. |
| 5,093,780 A | 3/1992 | Sunahara |
| 5,117,486 A | 5/1992 | Clark et al. |
| 5,247,616 A | 9/1993 | Berggren et al. |
| 5,321,817 A | 6/1994 | Feinstein |
| 5,379,296 A | 1/1995 | Johnson et al. |
| 5,381,534 A | 1/1995 | Shi |
| 5,459,836 A | 10/1995 | Whittaker et al. |
| 5,517,668 A * | 5/1996 | Szwerinski et al. ......... 709/230 |
| 5,561,806 A | 10/1996 | Fitchett et al. |
| 5,581,709 A * | 12/1996 | Ito et al. ........................ 710/38 |
| 5,581,741 A | 12/1996 | Clark et al. |
| 5,612,953 A | 3/1997 | Olnowich |
| 5,634,015 A | 5/1997 | Chang et al. |
| 5,648,965 A | 7/1997 | Thadani et al. |
| 5,655,140 A | 8/1997 | Haddock |
| 5,669,002 A | 9/1997 | Buch |
| 5,701,423 A | 12/1997 | Crozier |
| 5,734,865 A * | 3/1998 | Yu .............................. 709/250 |
| 5,764,894 A * | 6/1998 | Boucher et al. ............. 709/250 |
| 5,970,066 A * | 10/1999 | Lowry et al. ................ 370/353 |
| 6,131,163 A * | 10/2000 | Wiegel ........................ 713/201 |
| 6,233,619 B1 * | 5/2001 | Narisi et al. ................ 709/230 |
| 6,289,388 B1 * | 9/2001 | Disney et al. ............... 709/238 |
| 6,473,803 B1 * | 10/2002 | Stern et al. .................. 709/238 |

FOREIGN PATENT DOCUMENTS

| | | |
|---|---|---|
| WO | WO 97/01944 | 1/1997 |
| WO | WO 98/56150 | 12/1998 |

* cited by examiner

Primary Examiner—Andrew Caldwell
(74) Attorney, Agent, or Firm—Michael B. Atlass; Mark T. Starr; Woodcock Washburn

(57) ABSTRACT

Methods and apparatus that enable a transport protocol executing on a first computer system to be utilized by applications executing on a second computer system which is directly interconnected and closely coupled to the first computer system. An interconnection couples an input/output (I/O) subsystem of the first computer system to an I/O subsystem of the second computer system and provides a path over which data can be transmitted between the first and second computer systems independent of a network interface card, and an interconnection messaging system executing on the first and second computer systems provides general purpose transport interfaces between said first and second computer systems. A distributed transport communications manager executing on the first and second computer systems controls use of the interconnection messaging system to establish a dialog through which the transport protocol of the first computer system may be used by an application executing on the second computer system in a manner which is transparent to the application. The transport protocol executing on the first computer system may be utilized by a plurality of networked computer systems including the second computer system, where the interconnection messaging system establishes dialogs through which the transport protocol of the first computer system may be used by applications executing on the networked computer systems. Conversely, applications executing on the second computer system may utilize transport protocols executing on a plurality of networked computer systems including the first computer system.

16 Claims, 49 Drawing Sheets

OSP:

ICD:

*QSP-Based Output Data Transfer Flow Diagram*

*QSP-Based Input Data Transfer Flow Diagram*

*Emulation-Based Output Data Transfer Flow Diagram*

*Emulation-Based Input Data Transfer Flow Diagram*

*CIA—Based Output Data Transfer Flow Diagram*

CIA—Based Input Data Transfer Flow Diagram

*MSS Initialization / Greeting*

*MSS Termination*

*MSS Data Transfer*

*MSS Endpoint Dialog Creation*

*MSS Endpoint Dialog Termination (Normal Close)*

*MSS Endpoint Dialog Termination (Destroy)*

Dialog Establishment (MSS)

Dialog Establishment (MSS)

*Dialog Establishment (MSS)*

Dialog Establishment (MSS)

*Dialog Establishment*

*Dialog Establishment (MSS)*

Output Over MSS

*Output*

Input From MSS

Input From MSS

*Dialog Termination (MSS)*

Dialog Termination (MSS)

*Dialog Termination (MSS)*

Normal MCP Passive Open

Normal MCP Evvironment Directed Opens

*MCP Aborted Passive Open*

*TCP Dialog Establishment Failure*

*General Data Path Design*

*DTCM—Client Output*

*General Output Data Transfer Flow Diagram*

*General Input Data Transfer Flow Diagram*

*MCP Environment Initiated Orderly Dialog Termination*

*Remotely Initiated Orderly Dialog Termination*

MCP Environment Initiated Abortive Dialog Termination

*Remotely Initiated Abortive Dialog Termination*

DISTRIBUTED TRANSPORT COMMUNICATIONS MANAGER WITH MESSAGING SUBSYSTEM FOR HIGH-SPEED COMMUNICATIONS BETWEEN HETEROGENEOUS COMPUTER SYSTEMS

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention relates to the field of computer networking, and, more particularly, to apparatus and methods that allow a transport protocol executing on one computer system to be utilized by network applications executing on a second computer system.

2. Description of the Prior Art

The ability for heterogeneous computer systems to communicate with each other over a network using standard ISO and/or proprietary networking protocols is known. Most computer systems have some form of networking architecture that enables the computer system to perform networking in accordance with those protocols. For example, the generic networking platform with the standard 7 layer ISO Reference Model includes a network stack: applications, presentation, and sessions levels under user control, and transport, network, data link, and physical levels under kernel (operating system) control. Typical networking architectures comprise both system software and hardware.

FIG. 1 is a block diagram illustrating the components of a networking architecture employed by a Unisys A Series enterprise server 10 in order to communicate with other hosts, or nodes, on a network 15. The A Series enterprise server 10 executes the Unisys MCP operating system 12, and has an I/O subsystem that comprises one or more I/O Modules (IOM) 14 housed within the A Series chassis. The IOM 14 implements a Unisys proprietary bus architecture referred to as CS-BUS II or CS-Bus III (hereinafter "the CS Bus"). A plurality of card slots, e.g. slots 16a–d, are provided for connecting interface cards, referred to as "channel adapters", into the CS Bus. Different groups, or racks, of channel adapter slots are each controlled by a Channel Manager Unit (CMU) (e.g., CMUs 18a, 18b). An IOM can contain several CMUs, each of which controls a different rack of channel adapter card slots via the CS-Bus. The CMUs manage the physical and data layers of the CS-Bus data transfer protocol.

Channel adapter cards, which each may occupy one or more channel adapter card slots within the IOM 14, provide various connectivity solutions for the A Series enterprise server 10. For example, Unisys provides a channel adapter card that implements the Small Computer System Interface (SCSI) protocol for connecting SCSI peripherals to the enterprise server 10.

For network connectivity, Unisys provides several channel adapters to support various physical networking protocols. These channel adapters are generally referred to as network processors (NP). For example, Unisys ICP22 and ICP26 network processors are channel adapter cards that implement the Ethernet network protocol and can be used to connect an A Series enterprise server 10 to an Ethernet network. Unisys also provides network processors for connectivity to FDDI and ATM networks. As shown in FIG. 1, a number of different network processors (e.g., NPs 20a, 20b, and 20c) can be installed in respective channel adapter slots (e.g., slots 16b, 16c, and 16d) of the IOM 14, in order to provide different network connectivity solutions.

As shown in the more detailed view of network processor 20c (installed in channel adapter slot 16d), a network processor may comprise a plurality of different lines, e.g., Line0, Line1 Y LineN, where a line represents a physical endpoint within a network. For example, the Unisys ICP22 network processor has two lines, each of which comprises a separate Ethernet connection—one line could be connected to one Ethernet network, and the other to a different Ethernet network.

Each line of a network processor can have one station group defined on that line. A station group consists of one or more stations. A station is a logical endpoint that represents a logical dialog on that line. Thus, more than one logical dialog can take place over a given line of a network processor. This is achieved through multiplexing. For example, with a connection-oriented networking protocol, such as the Burroughs Network Architecture—Version 2 protocol (BNAv2), one station may represent a logical dialog with one other BNAv2 host on the network, whereas another station may represent a logical dialog to a different BNAv2 host. As illustrated in FIG. 1, for example, Station0 of LineN may represent a logical dialog with BNAv2 host 22, and Station1 of LineN may represent a logical dialog with BNAv2 host 24. For networking protocols that are not connection-oriented, like the Internet Protocol (IP), only one station needs to be defined to handle all communications for that protocol stack. For example, in FIG. 1, StationN of LineN could be defined as the logical endpoint for all IP traffic over LineN. A Local Area Network Station Group (LANSG) module 26, which comprises software executing on the network processor 20c, provides callable procedures for creating and maintaining stations and station groups on the various lines of the network processor 20d and for sending and receiving data over them.

Other software components that execute on the network processor 20c include a Queue Service Provider (QSP) module 28, which handles the passing of messages between the NP Support 40 and the channel adapters. QSP module 28 also multiplexes and demultiplexes data for all stations defined on a given NP. Some data is blocked together for efficiency; other data is not. Other components include two stub modules—a Network Services Manager stub (NSM-stub) 30 and a Link Layer Manager stub (LLM-stub) 32—which interface with corresponding modules of a Core Network Services (CNS) software component 34, to and from modules within the MCP environment.

Generally, a network processor (e.g., NP 20a, 20b, or 20c) implements the data link and physical layers of the 7-layer ISO Reference Model. Higher level networking protocols that a client application 46 may wish to employ in order to communicate with applications running on different hosts of the network 15, such as the BNA version 2 (BNAv2) and TCP/IP networking protocols, are implemented as network protocol providers on the A Series system 10. A network protocol provider is a software module that implements these higher level networking protocols. For example, Unisys provides both BNAv2 Host Resident Network Provider (HRNP) modules and TCP/IP HRNP modules. In the example of FIG. 1, a BNAv2 HRNP 42 and a TCP/IP HRNP 44 are shown.

The Core Network Services (CNS) software 34 provides support for the network protocol providers 42, 44 and handles the initialization and maintenance of network processors and the station groups defined thereon. Specifically, CNS 34 comprises a Network Services Manager (NSM) 36 that initializes and manages the network processors (e.g., 20a, 20b, 20c) installed in the system, and a Link Layer Manager (LLM) 38 that initializes and maintains the identity and attributes of each station group defined on a given network processor. Another component (not shown) of CNS 34 validates attributes associated with station groups and stations created on a network processor. These attributes are passed between the network processor and CNS 34 via a control dialog when the stations are defined. Like the stub procedures for the NSM and LLM modules 36, 38, network processors also have a stub procedure (LLAH, not shown) that corresponds to the attribute handler of CNS 34. An NPSUPPORT software library 40, as well as portions of the MCP operating system 12, provide routines and procedure calls that serve as an interface between a network processor and the CNS 34 and network protocol providers 42, 44, and control loading of software to the NPs and dumping of their state.

Each network processor has an associated identifier that uniquely identifies that network processor within the system 10. When a network processor is initialized and brought on-line, the NSM-stub 30 in the network processor interfaces with the NSM 36 of CNS 34 via a control dialog in order to pass its identifier to the NSM 36. The NSM 36 manages the identifiers of all active network processors.

Each station group and station defined for a given network processor also has a unique identifier associated with it. Via a control dialog established between the LLM-stub 32 on the network processor and the LLM 38 of CNS 34, the station and station group identifiers are passed to the LLM 38 during initialization. Within the LLM 38, a station corresponds to a connection, and a station group corresponds to a connection group.

As mentioned above, the ability to define multiple stations (i.e., a station group) on a single physical line of a network processor is achieved through multiplexing. Specifically, the QSP 28 in the network processor multiplexes inbound and outbound data for multiple stations on a given line. Moreover, the QSP 28 is responsible for distributing request and response data between the NSM 36 and NSM-stub 30 and between the LLM 38 and LLM-stub 32. To that end, each entity on the network processor that receives outbound data from the MCP 12, including every station, the NSM-stub 30, and the LLM-stub 32, is assigned a unique Remote Queue Reference (RQR) by the QSP 28. The NSM-stub RQR is reported to the NSM 36 within CNS 34 via NPSUPPORT 40 when the NP is loaded. The LLM-stub RQR is reported to the LLM 38 via the NSM 36 by the NSM-stub 30 when the network processor initializes. All of the station RQRs are reported to the HRNPs 42, 44 as the stations open.

When a client application is required to send data via network 15 to some other host or node on the network 15, such as another BNAv2 Host 22, 24 or another TCP/IP host 25, it invokes the services of the appropriate network protocol provider, e.g., 42, 44. The network protocol provider 42, 44 determines the appropriate network processor and station on which the data is to be output, adds protocol headers for each of the network layers, and makes a corresponding request to the MCP 12 that includes the identifier of the network processor and the RQR of the station. The data and associated RQR are passed from the MCP 12 to the QSP 28 on the network processor (e.g., network processor 20c), which, in combination with the LANSG module 26, sends the data out to the network 15 via the appropriate line (e.g., Line0, Line1, Y or LineN) as part of the logical dialog represented by the designated station.

When data is received from the network 15 on a given line, the LANSG module 26 determines, from header information associated with the data, the station (i.e. logical dialog) for which the data is intended. The LANSG and QSP modules 26, 28, in combination with portions of the MCP 12 and NPSUPPORT library 40, pass the received data to the appropriate network protocol provider 42, 44 associated with that station, along with an indication of which station received the data. For example, one of the stations on LineN of the network processor 20c of FIG. 1 (e.g., station0) may be defined as the logical endpoint for the BNAv2 HRNP 42, while a different station (e.g., station1) may be defined as the logical endpoint on which all IP traffic over LineN is received for the TCP/IP HRNP 44. When a frame of data is received from the network on LineN, the LANSG module 26 determines from header information which of the network protocol providers (i.e., stations) is intended to receive the data. This determination is performed in accordance with the methods described in commonly assigned, U.S. Pat. No. 5,379,296, entitled "Method and Apparatus for Interfacing a Workstation to a Plurality of Computer Platforms" (Johnson et al.).

In addition to its use in A Series computers, the foregoing networking architecture is also employed in Unisys Clear-Path HMP NX enterprise servers. A ClearPath HMP NX server comprises an A Series enterprise server tightly integrated with a server running Microsoft Window NT. Please note that "Microsoft," "Windows", and "Windows NT" are registered trademarks of Microsoft Corporation. Additional information concerning the foregoing networking architecture can be found in the following documents, each of which is available from Unisys Corporation, assignee of the present invention, and each of which is hereby incorporated by reference in its entirety:

ClearPath HMP NX Series with Windows NT Network Services Implementation Guide (Part No. 4198 6670);

BNA/CNS Network Implementation Guide, Volume 2: Configuration (Part No. 3789 7014);

ClearPath HMP NX Series with Windows NT Implementations and Operations Guide (Part No. 8807 6542);

ClearPath HMP NX Series with Windows NT Migration Guide (Part No. 8807 7730);

Networking Capabilities Overview (Part No. 3789 7139) Networking Operations Reference Manual, Volumes 1 and 2: Commands and Inquiries (Part No. 3787 7917); and Networking Products Installation Guide (Part No. 4198 4840).

Using a Unisys ICP22 network processor, which is an Ethernet-based channel adapter, it has been possible in the past for a Unisys A Series enterprise server to communicate with a workstation or personal computer (PC) over a network. An example of this ability is illustrated in FIG. 2. In this example, the A Series enterprise server 10 communicates with an Intel-based workstation 48 running the Microsoft Windows NT operating system (hereinafter "the NT server"). The A Series enterprise server 10 is connected to the network via network processor 20a, which may, for example, be a Unisys ICP22 Ethernet-based network processor.

The I/O subsystem of the NT server 48 comprises portions of the NT operating system kernel, an EISA or PCI bus 52, and appropriate device driver software. To provide network connectivity, a network interface card (NIC) 50 is installed in an available bus slot on the NT server 48. The NT server may support one or both of the PCI and EISA bus standards. NICs are available for both bus standards.

A NIC device driver 54 that typically is sold with the NIC card 50 is installed in the kernel space of the NT operating system. The NIC device driver 54 interfaces with a higher level network protocol provider, such as an implementation of the transport (TCP) and network and data link (IP) protocols. Microsoft Corporation provides an implementation of the TCP/IP protocol in the form of a kernel level device driver, also referred to as a transport protocol driver, named TCPIP.SYS 58. TCPIP.SYS 58 interfaces with the NIC device driver 54 via NDIS 56, an industry standard Network Driver Interface Specification jointly developed by Microsoft and 3Com. NDIS 56 defines an interface for communication between hardware-independent protocol drivers, such as TCPIP.SYS 58, which implement the Data Link, Network, and Transport layers of the ISO model, and hardware-dependent NIC drivers 54 which provide an interface to the NIC hardware and which correspond to the Physical Layer of the ISO model. A client program 60 on the NT server can communicate over the network 15 in accordance with the TCP/IP protocol by issuing suitable calls via the NT operating system to the TCPIP.SYS protocol driver 58, and the A series server 10 and NT server 48 communicate over network 15 at the physical layer of the ISO model.

To avoid the costs associated with the development of NIC cards for proprietary systems such as the A series enterprise server, it has been proposed in U.S. Pat. No. 6,289,388, also assigned to the present assignee and the contents of which are hereby incorporated by reference in their entirety, to provide a direct interconnection between A series enterprise server 10 and NT server 48 so that both systems may connect to a network via a shared network interface card installed on the NT server. Such an invention is implemented as part of a Cooperative Networking Platform (CNP) deployed on a Unisys ClearPath HMP NX computer system ("the ClearPath system"). As will now be described, the ClearPath system comprises a Unisys A Series enterprise server 100 and an Intel-based server 102 running Windows NT ("the NT server").

As shown in FIGS. 3, 4, and 5, the CNP may take different forms. As illustrated in these figures, the interconnection couples the I/O subsystem of the A Series server 100 to the I/O subsystem of the NT server 102 to provide a relatively high speed data path between systems. Preferably, the interconnection comprises a physical connection between the I/O subsystems of the A series enterprise server 100 and the NT server 102 and an interconnection device driver that controls access to the physical connection by other software modules on the NT server 102.

In the embodiment of FIG. 3, the physical connection comprises a feedthrough card 62 installed in a channel adapter slot of the A Series server 100, an EISA Personal Computer Channel Adapter (EPCCA) card 66 installed in an EISA slot of the I/O bus of the NT server 102, and a CS-BUS II cable 64 that connects the CS-BUS II of the A Series server 100 to the EPCCA card 66 via the feedthrough card 62. The interconnection device driver (ICD) 70 is installed in the kernel space of the NT operating system and controls access to the physical connection (specifically the EPCCA card 66) by other modules on the NT server 102. The prior art embodiment of FIG. 3 also includes a Queue Service Provider module 76 that functions analogously to the QSP 28 of FIG. 1, a LANSG module 78 that functions analogously to the LANSG module 26 of FIG. 1, and NSM-stub and LLM stub modules 84, 86 of CNP.EXE 80 that function analogously to the corresponding components 30, 32 of FIG. 1. In addition, LDM and LLAH modules 82, 88 of CNP.EXE 80 are provided which function analogously to the similar components (not shown in FIG. 1) in a traditional Unisys networking architecture.

In FIG. 3, the interconnection device driver 70, including its PCCA and OPENCA drivers 72, 74, and the physical connection formed by the feedthrough card 62, cable 64, and EPCCA card 66, together define a Host Interface Function (HIF). The procedural interface between the QSP 76 and the interconnection device driver 70 of the HIF is designed to isolate the QSP 76 from the HIF. As will be apparent from the detailed description below, this enables the present invention to be employed with different implementations of the HIF. Specifically, the procedural interface between the QSP 76 and the interconnection device driver 70 is established through a process by which each module publishes entry points (i.e., pointers) to the procedures that implement its functionality, along with any required variable values. Another device driver entity maintains a record of these entry points, while the interconnection device driver 70 of the HIF registers the entry points and their attributes and the QSP 76 registers the entry points.

In order to invoke one of the entry point functions, a call is made to the registered entry point for that function. As a result of this indirection, different interconnection device drivers are installed for different implementations of the HIF in a manner that is completely transparent to the QSP 76.

FIGS. 4 and 5 illustrate two alternate embodiments of the HIF, which illustrate the modularity provided by the procedural interface design. In FIG. 4, the physical connection (i.e., the feedthrough card 62, cable 64, and EPCCA card 66) is replaced by a PCI Bridge card 67 that connects via a cable 65 directly to a port on one of the CMUs 18b of the IOM 14 of the A Series server 100. By connecting directly to the CMU 18b, some of the latency inherent in the CS-Bus II protocol is avoided. This provides a more direct, higher speed connection between the I/O subsystems of the two servers 100, 102. Because the physical connection is changed, a modified interconnection device driver 70 is provided. The modified interconnection device driver 70 comprises a single device driver module, PXN 73, that provides the interface between the QSP 76 and the hardware on the PCI Bridge card 67. However, the procedural interface, and the mechanism by which the QSP 76 and interconnection device driver 70 register entry points to the respective procedures of that interface is unchanged. Accordingly, the changes to the HIF are transparent to the QSP 76 and the other modules that comprise the Cooperative Networking Platform (CNP).

FIG. 5 is an embodiment in which the A Series server 100 is emulated through software in the NT server 102. Unisys provides such an emulated system in its ClearPath HMP NX 4200 series enterprise servers. In this embodiment, the physical connection is emulated such that it becomes a memory-to-memory connection 63 between the 30 memory space of the emulated I/O subsystem 14 and the memory space of the NT system 102. The emulated connection 63 functions in a manner similar to the feedthrough card 62, cable 64, EPCCA card 66, and PCCA 72 components of the hardware implementation of FIG. 3. The interconnection device driver 70" in this embodiment comprises a modified form 74 of the OPENCA module 74 of the implementation of FIG. 3. Again, however, the procedural interface between the modified OPENCA module 74 and the QSP 76 is not changed, so that the emulated A Series server 100 and its emulated connection 63 to the NT server 102 is transparent to the QSP 76 and the other modules of the present invention that comprise the Cooperative Networking Platform (CNP).

Also, a "virtual" LAN device driver 79 and an NDIS Miniport Interface Library 81 together with LANSG and the remainder of the interconnection components in the systems of FIGS. 3–5 provide a high speed, low latency communications path between the A Series server 100 and the NT server 102 as described in U.S. Pat. No. 6,473,803, also assigned to the present assignee and the contents of which are hereby incorporated by reference in their entirety. As described therein, these modules, in combination with the physical connection (e.g., feedthrough card 62, cable 64, and EPCCA card 66) and the interconnection device driver 70, simulate a traditional channel adapter-based network processor of the type described above and illustrated in FIG. 1. VLAN 79 allows the A series enterprise server 100 and the NT server 102 to both use their native mechanisms to communicate with each other rather than conventional network communications paths such as Ethernet, which may be considerably slower. In particular, VLAN 79 allows the A series enterprise server 100 and the NT server 102 to communicate at the data link level of the ISO network reference model by simulating the physical level with the HIF.

A system which further improves the communications efficiency of the ClearPath system by simulating the TCP transport protocol and the IP networking protocol between the A series enterprise server 100 and the NT server 102 via the interconnect so that data may be transferred point to point between systems at the transport level rather than the data link level is described in U.S. Pat. No. 6,233,619, also assigned to the present assignee and the contents of which are hereby incorporated by reference in their entirety. By simulating the transport and network layer protocols, the system described therein removes the inherent limitations of the TCP/IP protocols by using a more reliable network connection through which larger blocks of data may be transmitted without being broken up into smaller data chunks with prepended network protocol information. Since the session level is unaffected, this is accomplished in a manner which is transparent to the user. Since the session level is unaffected, this is accomplished in a manner which is transparent to the user.

It is desired to expand upon the systems described above to allow a known transport protocol executing on one computer system to be utilized by applications on another, tightly coupled computer system in a way that is transparent to the application, i.e., no application programming changes are needed. The present invention provides such capabilities.

SUMMARY OF THE INVENTION

The present invention is directed to methods and apparatus that enable a transport protocol executing on a first computer system to be utilized by applications executing on a second computer system which is directly interconnected and closely coupled to the first computer system. Preferably, both systems use their native mechanisms to communicate with each other without affecting their native protocols, rather than over conventional network communication paths such as Ethernet. In accordance with a preferred embodiment thereof, the present invention comprises an interconnection that couples the input/output (I/O) subsystem of the first computer system to the I/O subsystem of the second computer system and over which data can be transmitted between the systems independent of a network interface card, and an interconnection messaging system and distributed transport communications manager executing on the first and second computer systems that together allow a transport protocol executing on the first computer system to be utilized by applications on the second computer system in a manner that is transparent to the application (e.g., no application programming changes are needed).

The interconnection between the I/O subsystem of the first computer system and the I/O subsystem of the second computer system preferably comprises a physical connection between the I/O subsystems over which data can be transmitted between them. The interconnection messaging system, on the other hand, includes a messaging subsystem ("MSS") which provides general purpose transport interfaces to the first and second network protocol providers which is independent of communication protocols of the inter-connection and provides further interfaces on either end of the interconnection which are dependent on the communication protocols of the interconnection, whereby only the further interfaces must be changed when the interconnection is changed.

Preferably, the MSS includes an MSS component on each of the first and second computer systems, each MSS component having at least one local MSS user connected thereto through the interconnection independent interface. An MSS component on the first computer system creates a dialog to each complementary remote MSS user of the second computer system. Each MSS component includes means for building dialog tables for local MSS users informing the local MSS users about any complementary remote MSS users accessible via the interconnection and for updating the dialog tables as complementary remote MSS users are added or removed. Each MSS component also includes means for performing dialog management functions which allow the local MSS users to establish, receive status about, and destroy dialogs with the complementary remote MSS users over the interconnection. Each MSS component further includes means for performing control message functions which allow the local MSS users and the complementary remote MSS users to pass control messages to each other in a manner which is independent of the communication protocols of the inter-connection. Each MSS component additionally includes means for transferring data between local and remote MSS users over dialogs established between the local and remote MSS users so as to optimize data transfers between the first and second computer systems.

The major advantage of the MSS of the present invention is the ability to isolate interconnect dependent mechanisms to a single component. In this manner, as additional functionality is added by implementing components which require inter-system communication via the interconnect independent MSS interface (i.e., as "MSS users"), changes to existing interconnects as well as opportunities to incorporate additional interconnects may be accomplished entirely via the MSS components without affecting the MSS users.

In a presently preferred embodiment, one of the local and one of the remote MSS users are complementary components of a distributed transport communications manager which allows a known transport protocol executing on the first computer system to be utilized by applications on the second computer system. The complementary components of the distributed transport communications manager use the MSS and the transport protocol of the first computer system to provide dialog establishment, data transfer, and dialog termination between a network application executing on the second computer system and another network application executing in a computer network including the first and second computer systems. Also, the complementary components respectively interface with the network application executing on the second computer system and the transport protocol executing on the first computer system and are implemented on the first and second computer systems as complementary MSS users which are connected to the MSS through the independent transport interfaces of the MSS. Such techniques may be used to permit the transport protocol of the first computer system to be utilized by a plurality of networked computer systems including the second computer system or to permit applications executing on the second computer system to utilize transport protocols executing on a plurality of networked computer systems including the first computer system.

For reference, the computer system executing the transport protocol is known as the "Protocol Environment," while the computer system executing the network application is known as the "Application Environment." The software modules which facilitate this functionality are collectively referred to as "Distributed Transport Communications Management (DTCM)". DTCM contains both Application Environment and Protocol Environment components and relies on an underlying interconnect mechanism (the MSS). The Application Environment DTCM component is referred as the DTCM-Client while the Protocol Environment DTCM component is referred to as the DTCM-Server. DTCM-Client processes requests from network applications and, as needed depending of the nature of the request, utilizes the protocol stack executing in the Protocol Environment via requests issued to the corresponding remote DTCM-Server. DTCM-Server, by request of the DTCM-Client, interfaces to the local transport protocol. DTCM-Server maps requests from DTCM-Clients onto the corresponding local API functionality, reporting results back to the requesting DTCM-Client.

The scope of the invention also includes a method for enabling a transport protocol executing on a first computer system to be utilized by applications executing on a second computer system which is directly interconnected and closely coupled to the first computer system via an interconnection between an input/output (I/O) subsystem of the first computer system and an I/O subsystem of the second computer system to transmit data therebetween independent of a network interface using an interconnection messaging system on the first and second computer systems having a messaging subsystem (MSS) that provides general purpose transport interfaces between the first and second computer systems, use of the interconnection messaging system being controlled by a distributed transport communications manager (DTCM) having complementary DTCM components on the first and second computer systems, comprising the steps of:

the complementary DTCM components opening an MSS dialog over the interconnection;

the transport protocol of the first computer system and a transport entity in a computer network including the second computer system opening a transport dialog between the first computer system and another computer system in the computer network; and managing the MSS dialog and the transport dialog so that the transport protocol of the first computer system may be used by a network application executing on the second computer system in a manner which is transparent to the network application.

In a preferred embodiment of the method of the invention, the method includes the additional steps of creating a plurality of MSS dialogs over the interconnection for a plurality of pairs of network applications whereby the network applications in each pair may communicate in a manner which is transparent to the native protocols of the network applications in the pair, and specifying the transport dialog which is to be used for the data transfer between the network applications in the pair.

The major advantages of the DTCM technique of the invention are:

1. The ability to utilize commodity software and hardware elements in the Protocol Environment, thereby avoiding costly development of those elements in the Application Environment. The use of commodity components also allows rapid deployment of new hardware and software functionality.
2. By "off-loading" transport protocol processing to the Protocol Environment, processing cycles in the Application Environment are freed, allowing the Application Environment to perform additional tasks.
3. The Protocol Environment may be chosen to optimize network performance of the coupled systems as a whole.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings several embodiments that are presently preferred, it being understood, however, that the invention is not limited to the specific methods and instrumentalities disclosed. In the drawings.

DETAILED DESCRIPTION OF THE PREFERRED EMBODIMENT

Figure 1:
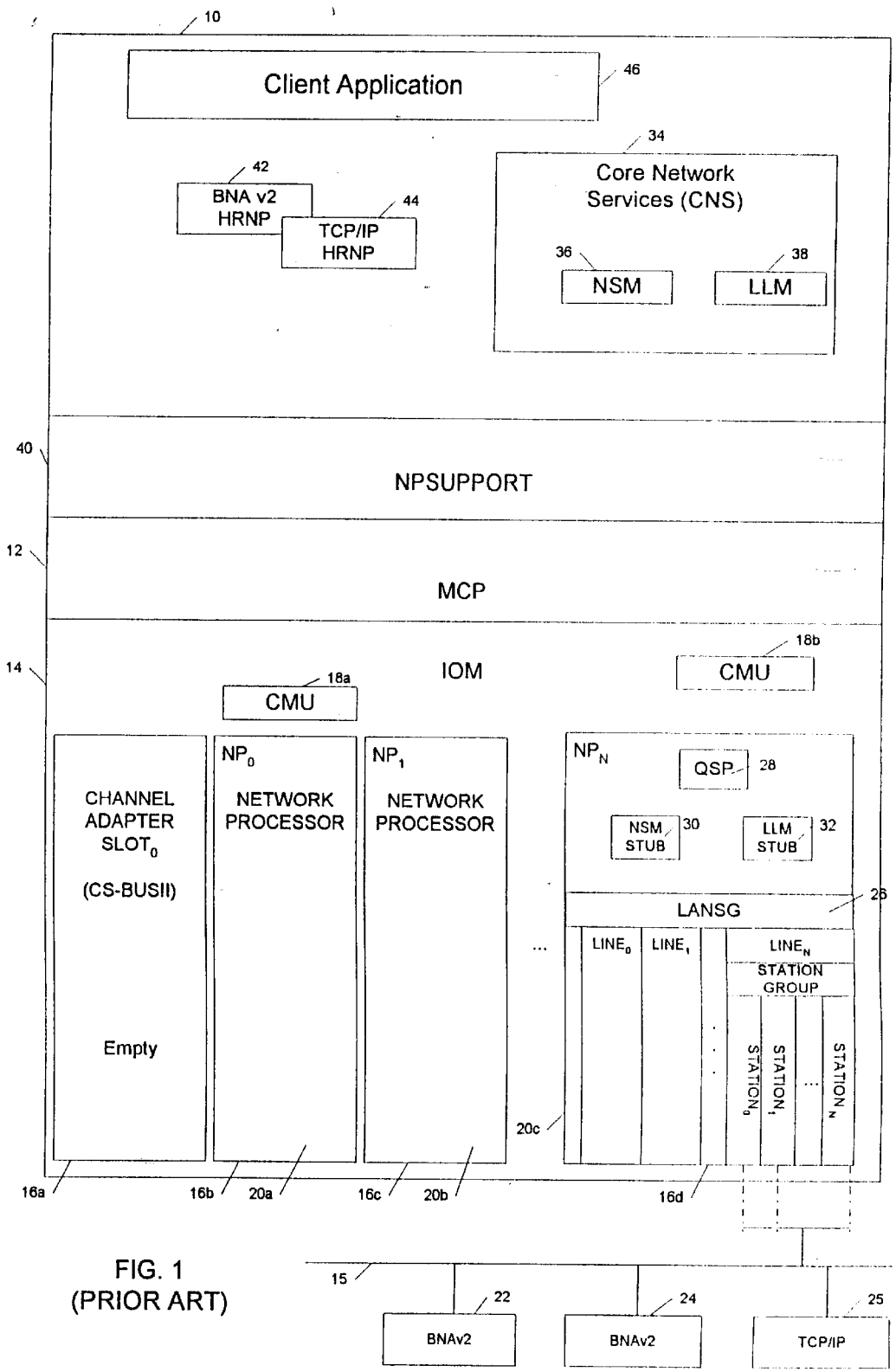
FIG. 1 is a block diagram illustrating the components of a prior art networking architecture employed by Unisys A Series enterprise servers in order to communicate with other hosts, or nodes, on a network.
Figure 2:
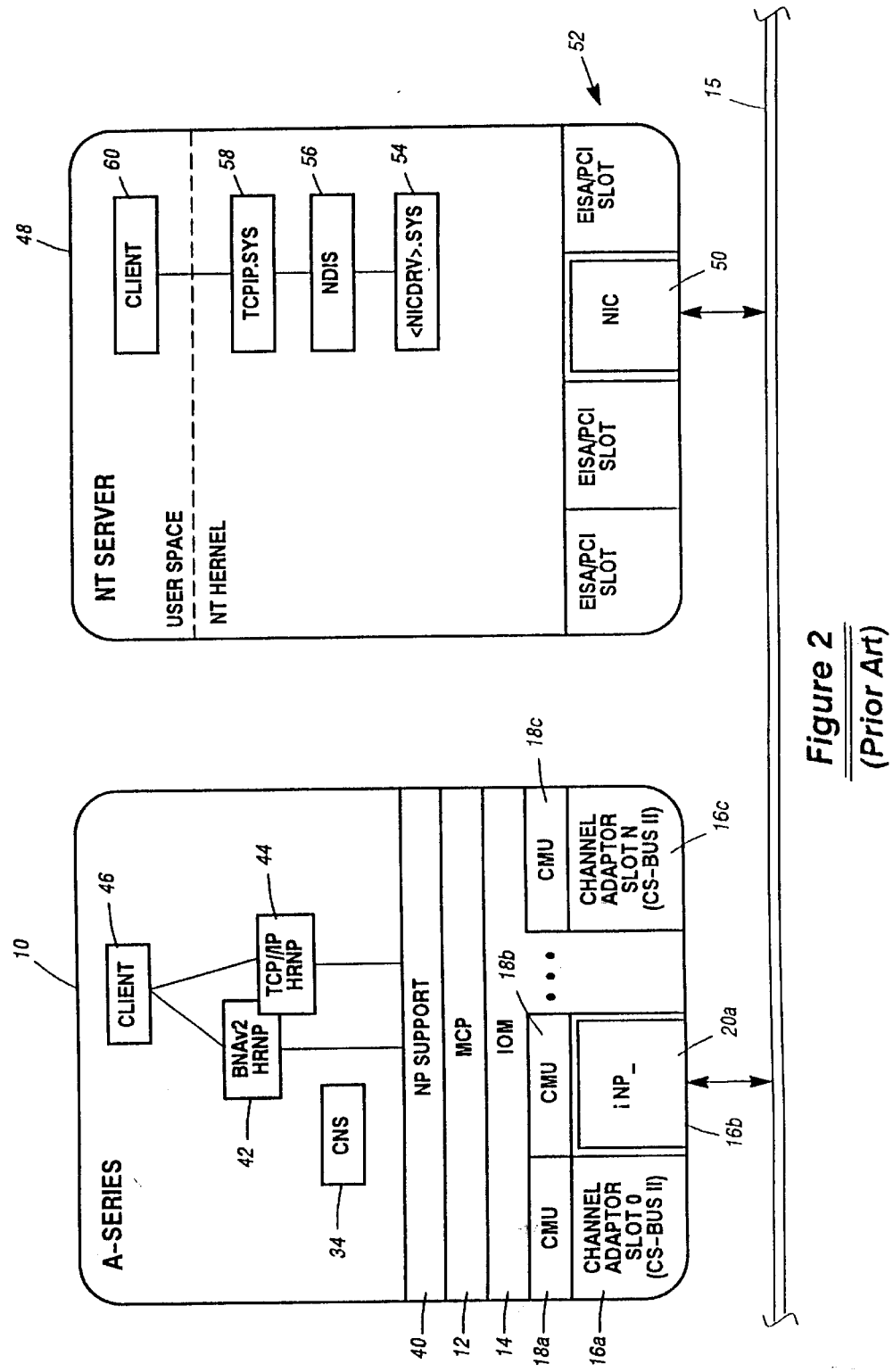
FIG. 2 is a block diagram showing a prior art method by which a Unisys A Series enterprise server can communicate via a network with a server running Microsoft Windows NT.

As will be described below with respect to FIGS. 6–39, the present invention is directed to methods and apparatus that enable a transport protocol executing on a first computer system to be utilized by applications on a second computer system, which is directly interconnected and closely coupled to the first computer system. In accordance with a preferred embodiment thereof, the present invention comprises an interconnection that couples the input/output (I/O) subsystem of the first computer system to the I/O subsystem of the second computer system and over which data can be transmitted between systems, and a Distributed Transport Communications Management ("DTCM") and messaging subsystem ("MSS") communications interface between the respective computer systems.

In one embodiment, described more fully hereinafter, the methods and apparatus of the present invention may be implemented as part of a Cooperative Networking Platform (CNP) (sometimes also referred to ANX/Network Services" or ANNS") provided as a feature of Unisys ClearPath HMP NX enterprise servers, in which, as mentioned above, a Unisys A Series enterprise server is tightly integrated with an Intel-based server running Microsoft Windows NT. In that embodiment, the A Series enterprise server comprises the second computer system and the NT server comprises the first computer system. As embodied in that environment, the present invention allows a network protocol provider (e.g., TCP/IP HRNP) on the A Series server to communicate with a peer network protocol (e.g., TCP/IP) on the NT server using native mechanisms at high speed with low latency.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The present description uses pseudocode to describe some of the software features of the invention. Those skilled in the art should note that all such pseudocode follows the C programming language syntax.

Apparatus of the present invention comprises an interconnection that couples the I/O subsystem of the A Series server 100 to the I/O subsystem of the NT server 102 so that data can be transmitted between the two servers, and a Distributed Transport Communications Management ("DTCM") and a messaging subsystem ("MSS") that provide communication paths between the A Series server 100 and the NT server 102. Additional details of the interconnection and of a virtual LAN ("VLAN") communication path providing data link layer network communications between the two servers are provided in the afore-mentioned related U.S. Pat. No. 6,473,803, the contents of which have been incorporated by reference. The DTCM/MSS communications system implemented herein to allow a transport protocol executing on the NT server 102 to be utilized by applications on the A Series server 100 will be described in detail hereinafter. Those skilled in the art will appreciate that the following detailed description is for illustrative purposes only and is not intended to limit the scope of the invention. Rather, the scope of the invention can be determined from the appended claims.

Figure 3:
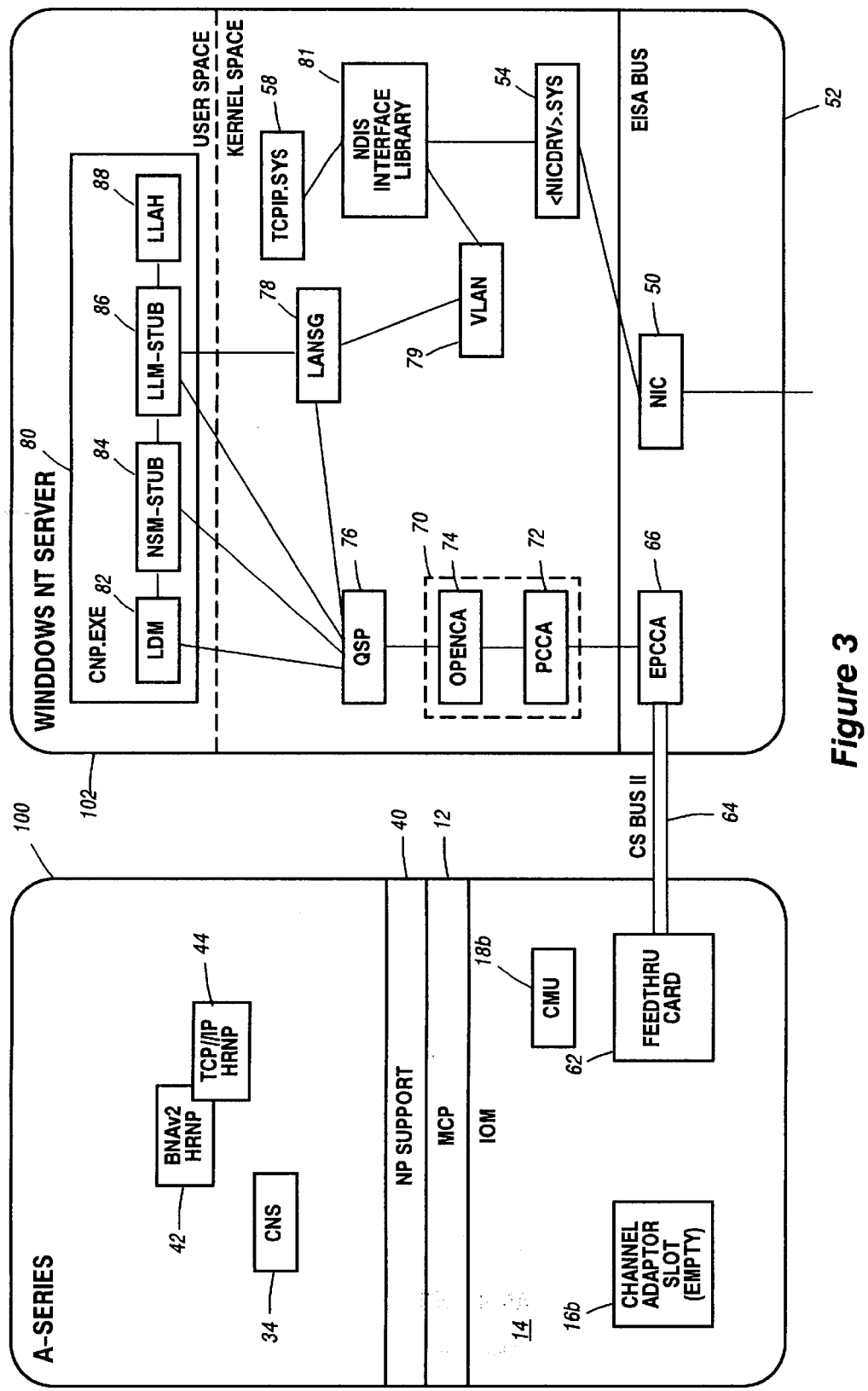
FIG. 3 is a block diagram illustrating a prior art apparatus that enables two closely coupled computer systems to communicate via a virtual LAN.
Figure 4:
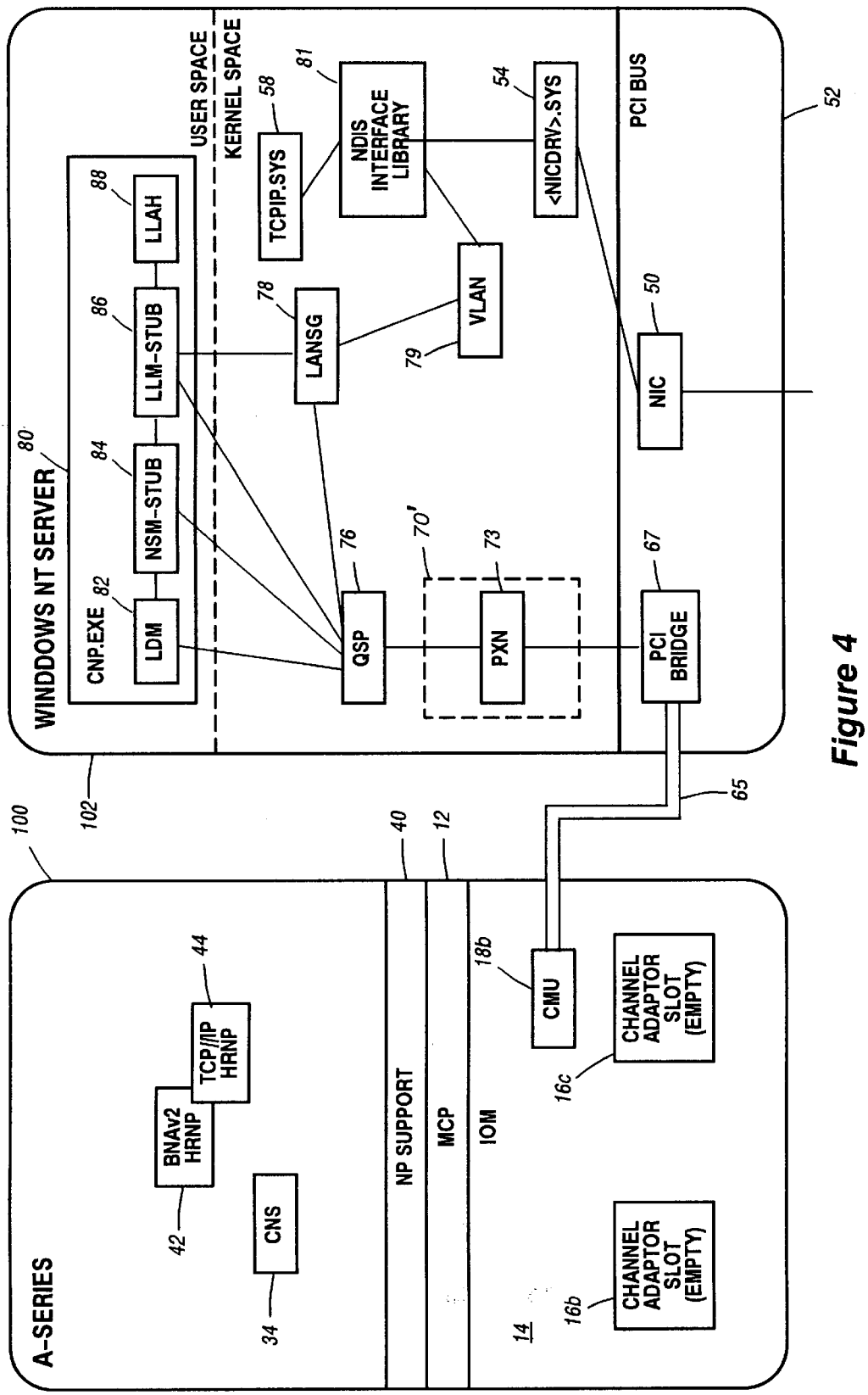
FIG. 4 is a block diagram illustrating the prior art apparatus of FIG. 3 with an alternative embodiment of the interconnection.
Figure 5:
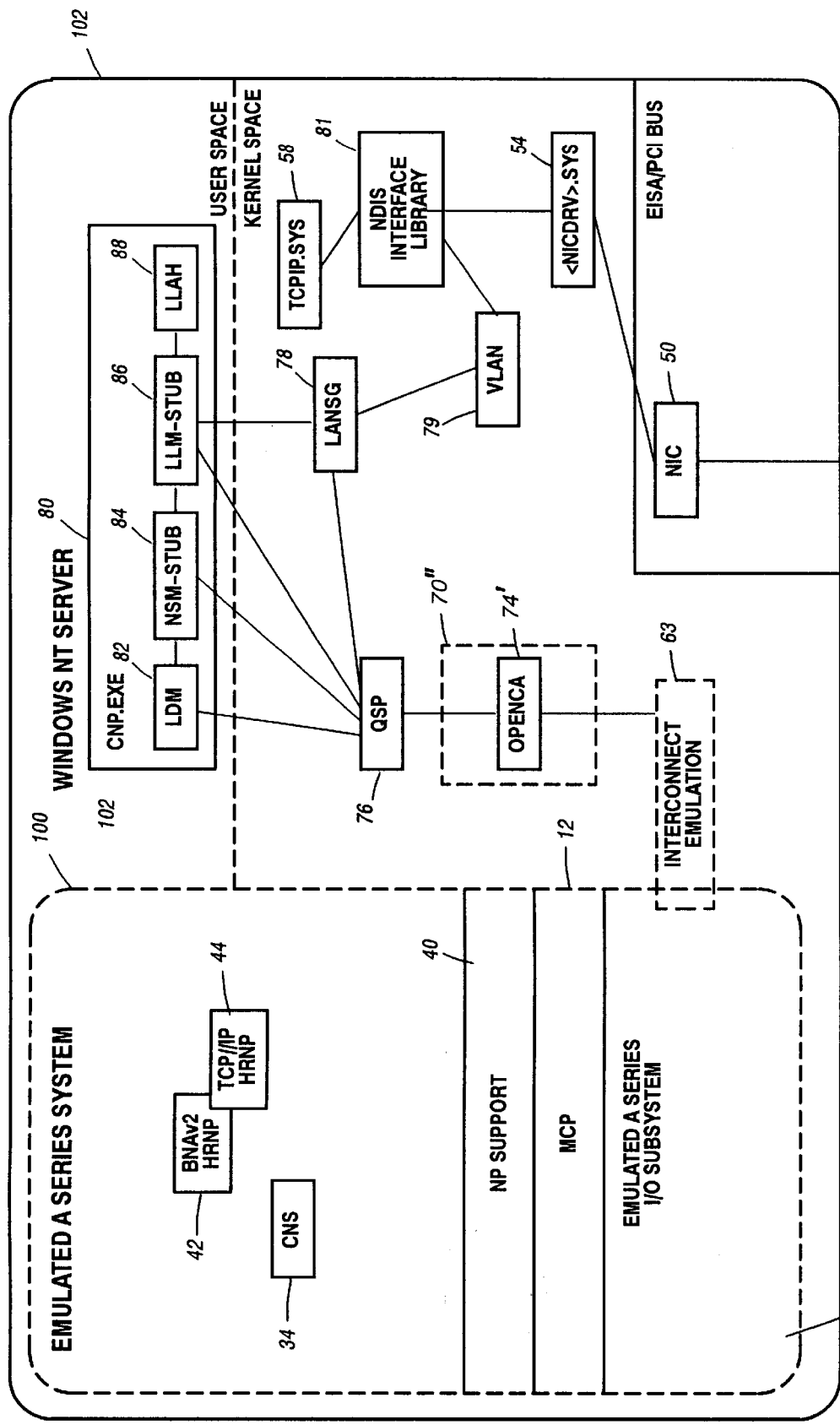
FIG. 5 is a block diagram illustrating the prior art apparatus of FIG. 3 with another alternative embodiment of the interconnection.
Figure 6:
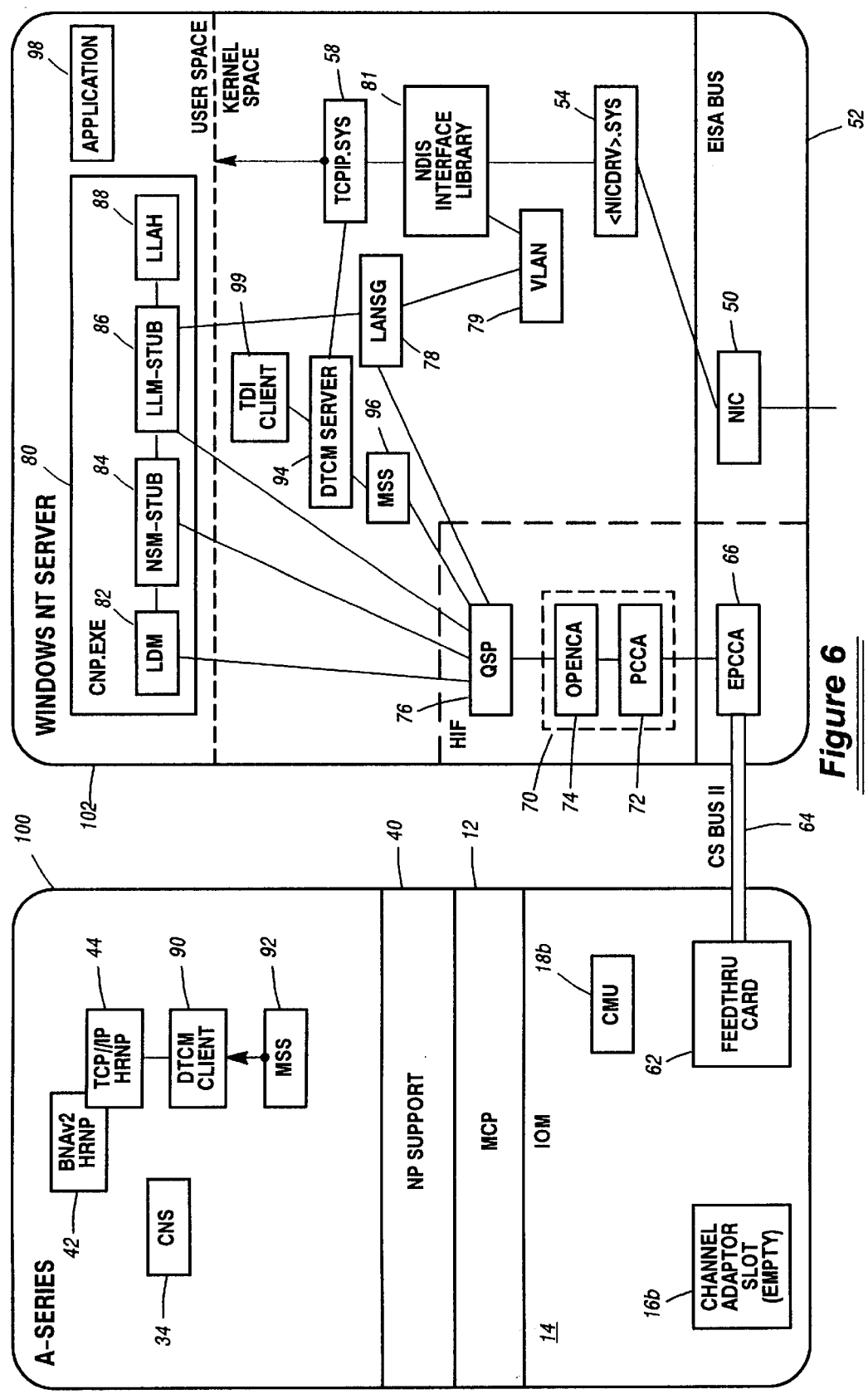
FIG. 6 is a block diagram illustrating an embodiment of the invention that enables a transport protocol executing on one computer system to be utilized by applications on another computer system using a DTCM/MSS protocol in accordance with the invention.
Figure 7:
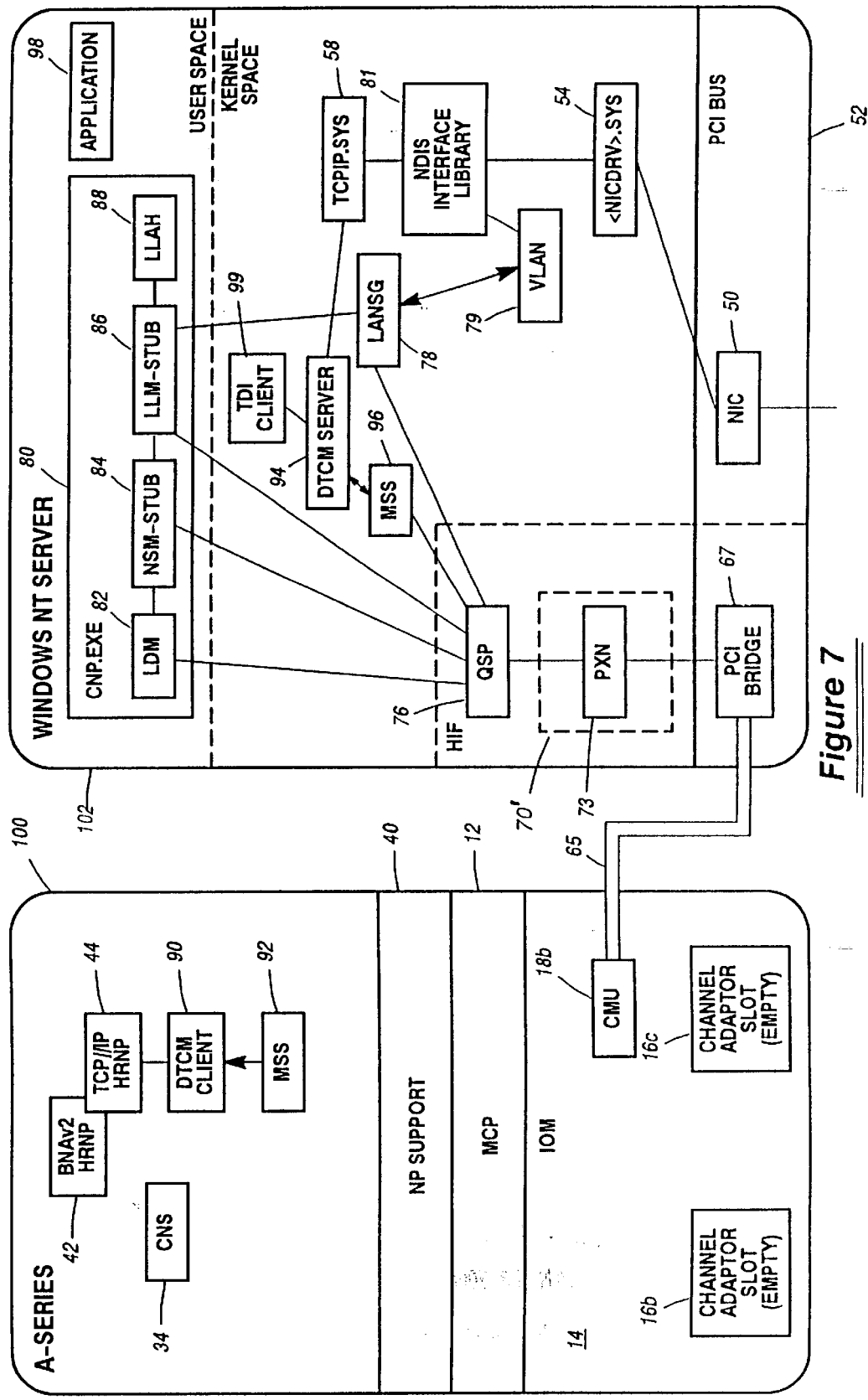
FIG. 7 is a block diagram illustrating an embodiment of the invention using a DTCM/MSS protocol in accordance with the invention over the interconnect of FIG. 4.
Figure 8:
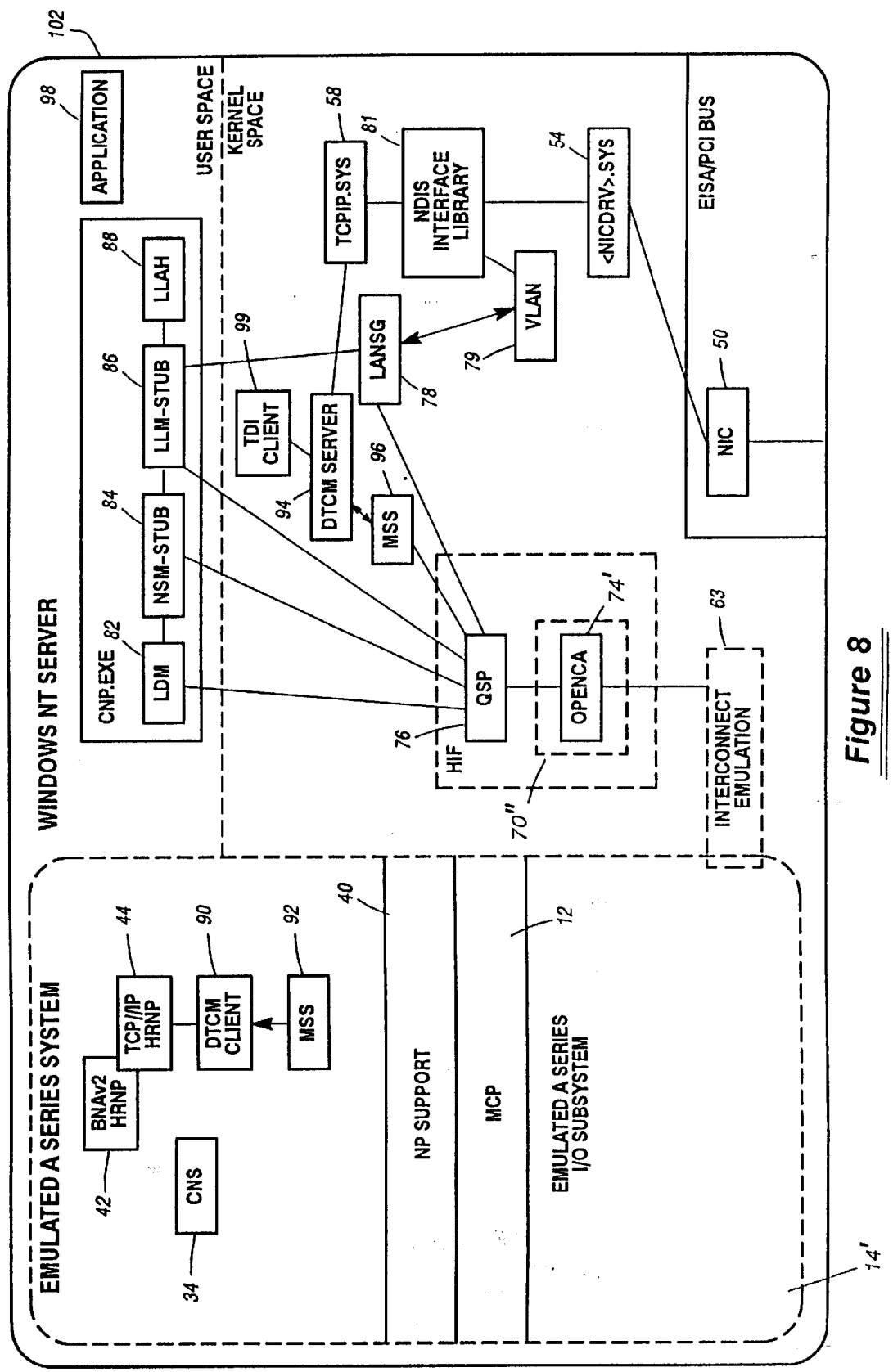
FIG. 8 is a block diagram illustrating an embodiment of the invention using a DTCM/MSS protocol in accordance with the invention over the interconnect of FIG. 5.

In the drawings, where like numerals represent like elements throughout, FIGS. 6–8 are block diagrams illustrating embodiments of the present invention for each of the interconnects described above with respect to FIGS. 3–5, in which the methods and apparatus of the present invention are implemented as part of a Cooperative Networking Platform (CNP) deployed on a Unisys ClearPath HMP NX computer system ("the ClearPath system"). In each case, a first network protocol provider 44 is provided on the A Series system 100, in this case a TCP/IP HRNP, and it has multiple network addresses (i.e., IP addresses) associated with it, one for each connection (e.g., channel adapter) out of the A Series system 100. As will be explained in detail below, the A Series system 100 also includes a DTCM-Client 90 and a Messaging SubSystem ("MSS") 92 which allow the A Series system 100 to bypass the conventional ISO network protocol stack for communications with the NT Server 102 via the interconnectA second network protocol provider 58 is provided on the NT Server 102, in this case TCPIP.SYS (available from Microsoft Corporation), and it has its own network address (i.e., IP address) associated with each network interface card ("NIC") that defines a second network address in this embodiment. As also will be explained in detail below, the NT Server 102 also includes a DTCM-Server 94 and a Messaging SubSystem ("MSS") 96 which allow the NT Server 102 to bypass the conventional ISO network protocol stack for communications with the A Series server 100 via the interconnect. Also, a NIC 50 is installed in a slot of the I/O bus (e.g., EISA or PCI) of the NT server 102. Any LAN-type NIC that is compatible with Windows NT can be employed. Preferably, the NIC supports the Fast-Ethernet networking protocol (e.g., 100Base-T). NICs of this type are available from numerous vendors and original equipment manufacturers (OEMs). NICs supporting other physical media types, such as Ethernet/802.3, FDDI, or Gigabit Ethernet, or ATM can alternatively be employed. Typically, a NIC vendor will supply a device driver with the NIC, which is installed in the kernel space of the operating system so that other entities on the system can access the networking functionality of the NIC. The NIC 50 of the exemplary systems of FIGS. 6–8 has a device driver 54 ("<nicdrv>.sys") that is installed in the Windows NT kernel space, as shown.

Other network protocol providers may be installed on the A Series and NT servers as well. For example, on the A Series server, a BNA (version 2) HRNP 42 may be provided, and an unreliable datagram protocol ("UDP") may be provided in addition to TCP/IP. However, because the BNAv2 protocol is a Unisys proprietary protocol and uses another addressing scheme for network endpoints, the BNAv2 HRNP 42 does not have an IP address associated with it.

FIGS. 9(a)–9(f) provide further details of how data is transferred between the A Series server 100 and the NT server 102 via the interconnection device driver of the HIF and the QSP module 76 in the embodiments of FIGS. 6–8. The details provided in FIGS. 9(a)–9(e) are applicable to any of the QSP-based embodiments of the Host Interface Function ("HIF") shown in FIGS. 6, 7, and 8. Thus, as used in the following discussion, the term interconnection device driver (ICD) refers to any of the three interconnection device driver embodiments described with respect to those figures.

The QSP 76 multiplexes multiple client dialogs (e.g., dialogs with the NSM-stub and LLM-stub modules 84, 86 and with the different stations defined by LANSG 78) over one or more transfer units, which are an abstraction of the communication paths supported by the ICD. Units may be logical dialogs or physical devices. In order to more fully utilize the unit resources, the QSP 76 may aggregate messages waiting for transfer over a same unit into a block that can be transferred in a single operation. The QSP 76 supports such blocking by providing a Message-Count field in its message headers. The first message header in a block contains the number of messages that the block contains in its Message-Count field. Subsequent message headers within the block have a zero value in that field.

The ICD then takes each block and programs the physical connection (i.e., the EPCCA board 66, the PCI Bridge card 67, or the emulated memory-to-memory connection 63, depending upon the implementation) to transfer the block to the A Series server 100. In the reverse direction, the ICD is awakened when a message is transferred via the physical connection into the memory of the NT server 102, either by an interrupt (in the case of the hardware connections of FIGS. 6 and 7) or by a function call (in the case of the emulated connection 63 of FIG. 8). The ICD delivers the received message to the QSP 76, which in turn, distributes it to the appropriate client dialog (e.g., NSM-stub 84, LLM-stub 86, or a given station defined by LANSG 78), based on the destination queue address (a Remote Queue Reference or "RQR") associated with the message. In accordance with the invention, the NT Server 102 further includes a DTCM-Server 94 and a Messaging SubSystem ("MSS") 96 which allow the NT Server 102 to bypass the conventional ISO network protocol stack for communications with the A Series Server 100 via the interconnect. Operation of the DTCM and MSS interfaces will be described at length below.

FIGS. 9(a)–9(d) provide further information concerning the steps performed by the QSP 76 and ICD in transferring messages from a client on the NT server 102 (e.g., NSM-stub 84, LLM-stub 86, or a station defined by LANSG 78) to the A Series server 100 via the physical connection. This transfer process begins when a client, for example, the LANSG module 78, which may need to pass data received from TCPIP.SYS 58 to the A Series server 100, calls the QSP 76 requesting that a message (e.g., the data received from the network) be transferred to the A Series server 100. A parameter is passed with the request that points to non-contiguous message segments that comprise the full message. At step 112, the QSP 76 determines on what unit the message should be transferred. Next, at step 114, the QSP 76 calculates the total size of the message by examining each non-contiguous segment in the message. At step 116, a header is added to the beginning of the message, and a descriptor list is built that points to the header and to each segment in the message. Next, at step 118, the QSP 76 determines whether blocking (described above) is supported for this unit. If so, at step 120, the QSP 76 determines whether any blocks are presently waiting for transfer. If so, at step 121, the QSP 76 determines whether the message will fit in the last pending block. If so, then at step 122, the QSP 76 adds the descriptor list to the last pending block. Control then passes to step 127 (FIG. 9(b)).

If in step 118, blocking is not supported for this unit, or if in step 120 it is determined that there are no blocks presently waiting for transfer, or if in step 121 it is determined that the message will not fit in the last pending block, then control passes in all three cases to step 124. At step 124, the QSP 76 builds a block containing only the descriptor list built in step 116. Next, at step 126, the newly created block is added to the list of pending blocks. Control then passes to step 127 (FIG. 9(b)).

Figure 9A:
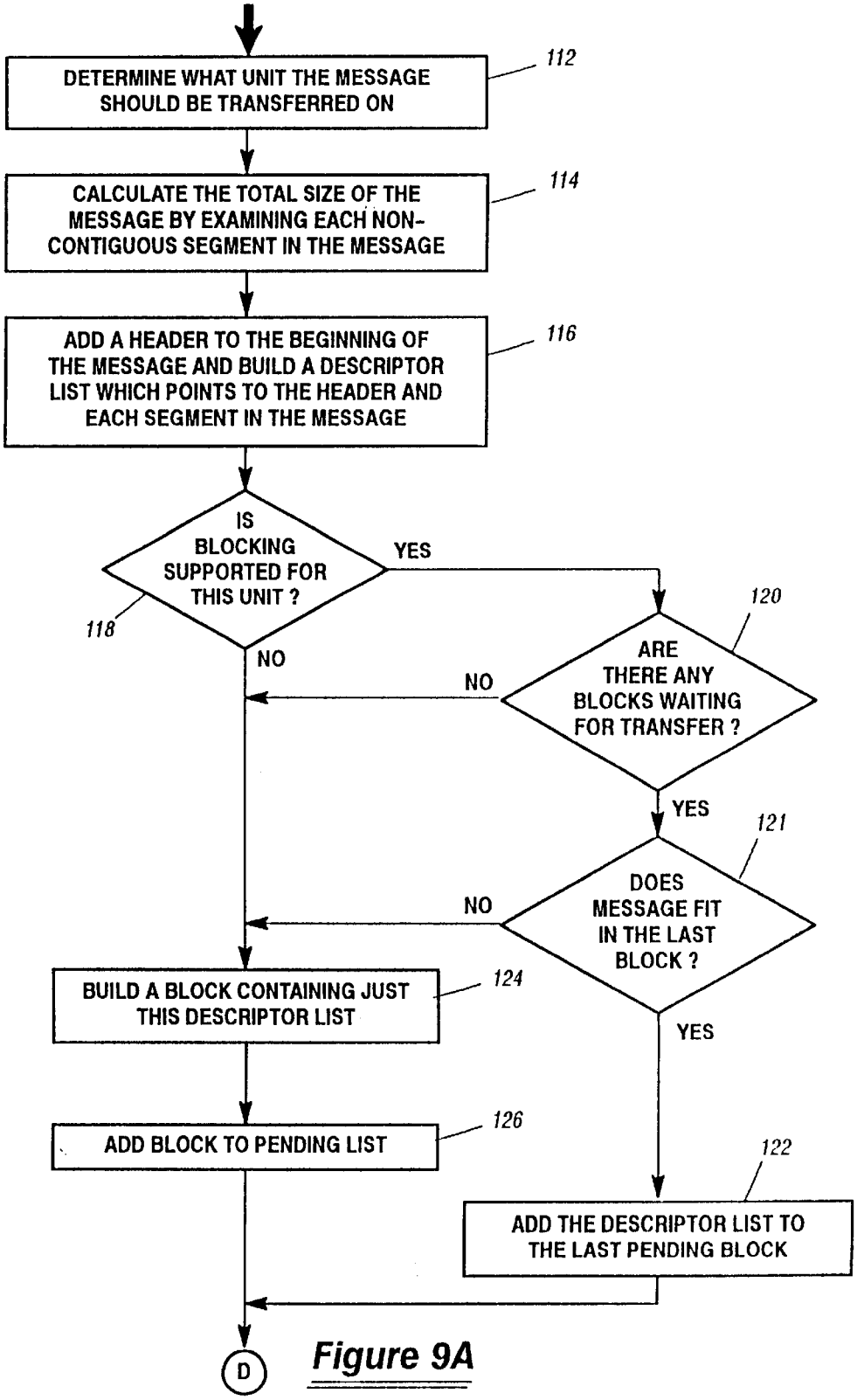
FIGS. 9(a)–9(f) are flow diagrams that illustrate the general operation of the interconnections illustrated in FIGS. 3–8.
Figure 9B:
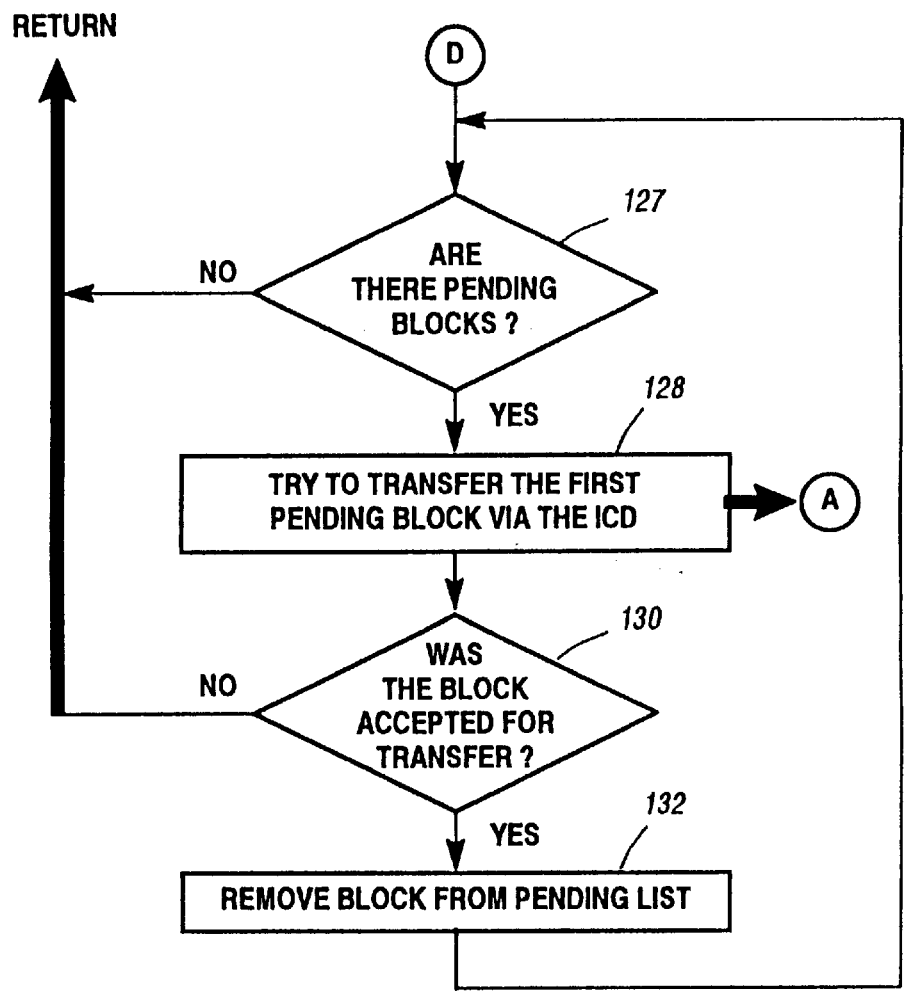

In FIG. 9(b), the QSP 76 determines whether any blocks are pending at step 127. If not, the QSP 76 simply returns to the client. However, if there are pending blocks to be transferred, then control passes to step 128.

Figure 9C:
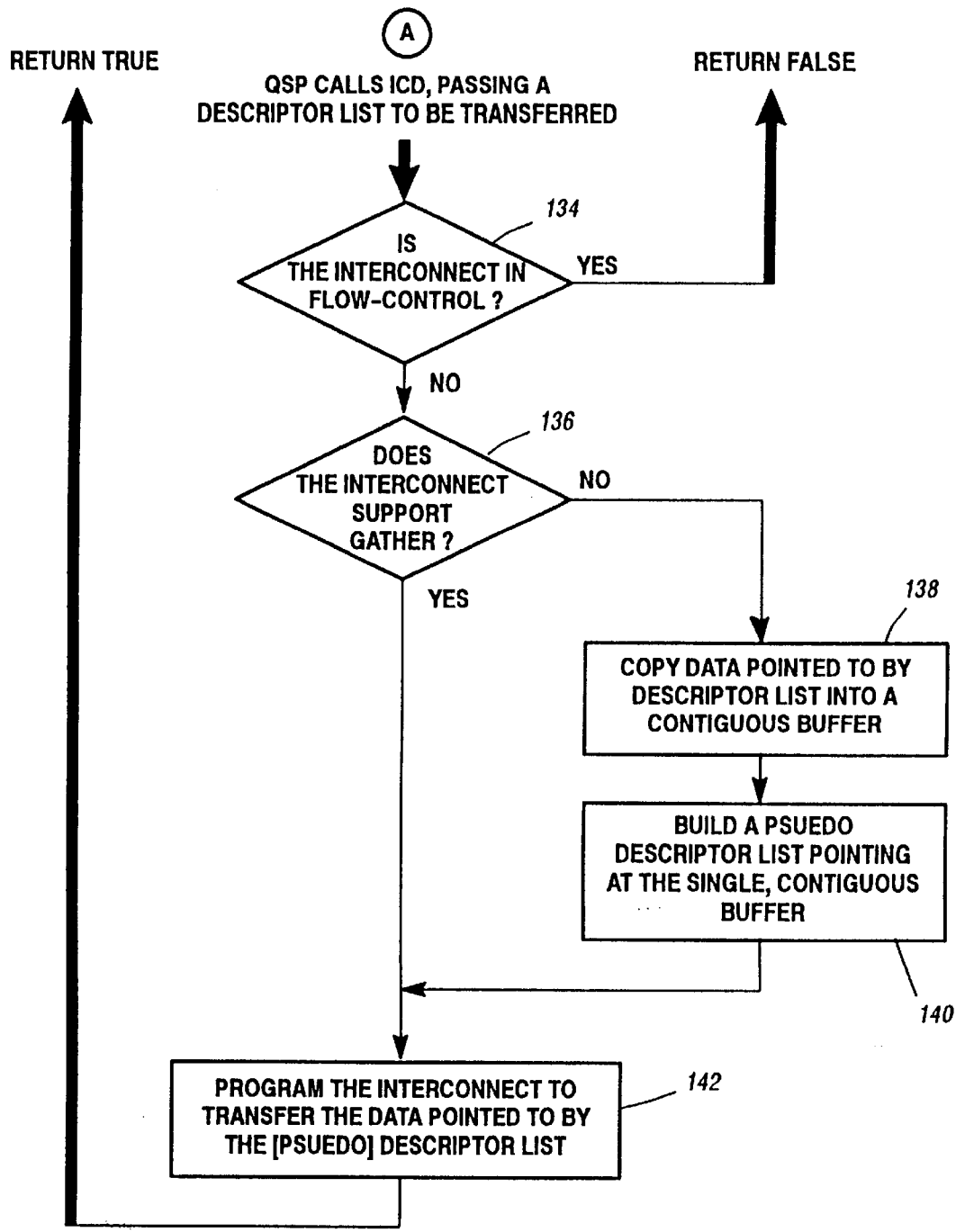

At step 128, the QSP 76 attempts to send the first block in the list of pending blocks to the ICD by invoking the HifSendBlockToHost( ) procedure of the ICD, which is called by the QSP 76 to deliver a block of data to the MCP 12. As indicated by the arrow labeled "A" in FIG. 9(b), the ICD begins processing the request at that point. The steps performed by the ICD are illustrated in FIG. 9(c). Still referring to FIG. 9(b), however, the QSP's processing continues to step 130, where the QSP 76 determines whether the ICD accepted the block for transfer. If so, that block is removed from the pending list at step 132, and control loops back to step 127 where the QSP 76 again checks whether there are any pending blocks to be transferred and processing continues for any such subsequent blocks. However, if in step 130 it is determined that the ICD did not accept a given block for transfer, then the QSP 76 returns to the client, leaving the block containing the message to be sent on the pending list.

As shown in FIG. 9(c), the ICD begins processing the HifSendBlockToHost( ) request from the QSP at step 134, where it determines whether the physical connection is in flow-control mode. Flow-control mode is a mode in which the MCP operating system 12 of the A Series server 100 is not prepared to receive data on the specific unit, for example, because no buffer is available. If the physical connection is in flow-control mode, the ICD returns a value of "FALSE" to the QSP 76 and stops processing the transfer at this point. If the physical connection is not in flow-control mode, then control passes to step 136 where the ICD determines whether the physical connection supports a Gather function. Gather is the ability to transfer data from non-contiguous memory regions in one operation. If the physical connection does not support a Gather capability, control passes to step 138 where the ICD copies the data pointed to by the descriptor list (passed to it by the QSP 76) into a contiguous buffer. Next, at step 140, the ICD builds a pseudo descriptor list that points at the single, contiguous buffer. Control then passes to step 142.

At step 142, whether entered directly from step 136 (Gather supported) or from step 140 (Gather not supported), the ICD programs the physical connection (i.e., the EPCCA board 66, the PCI Bridge card 67, or the emulated memory-to-memory connection 63 depending upon the particular embodiment) to transfer the data pointed to either by the descriptor list received from the QSP 76 (Gather) or the pseudo descriptor list created in step 140 (no Gather). The ICD then returns a value of "TRUE" to the QSP 76.

Figure 9D:
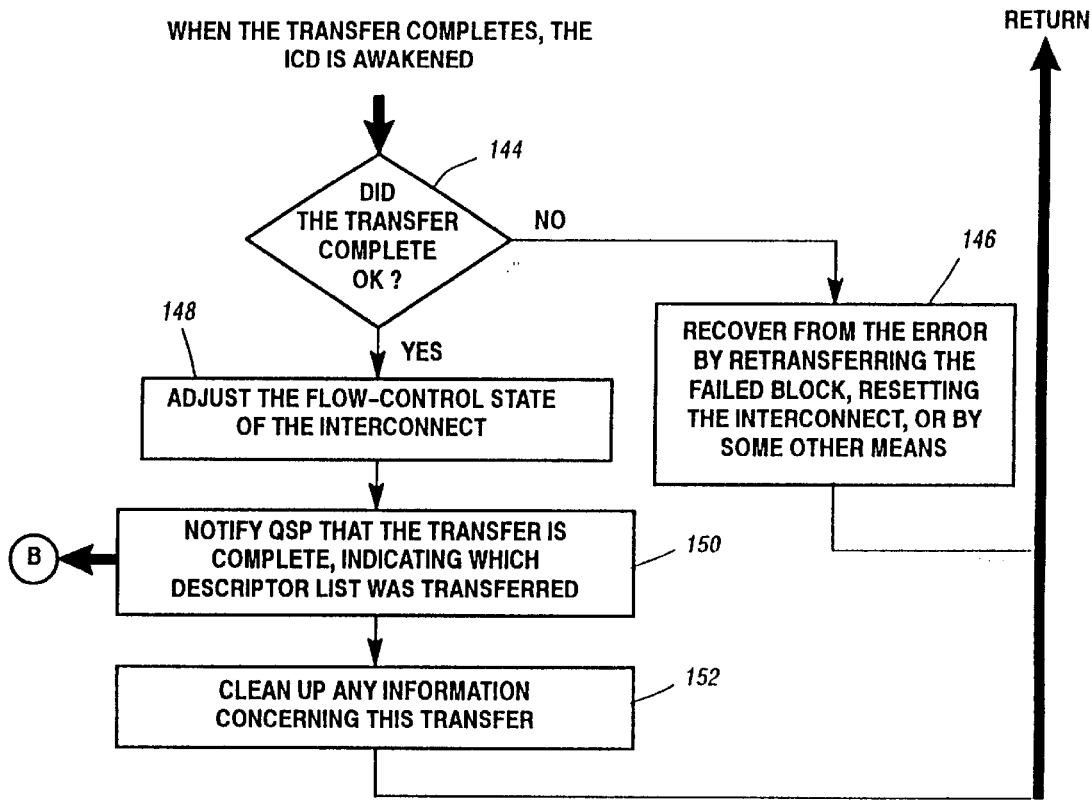
Figure 9D:
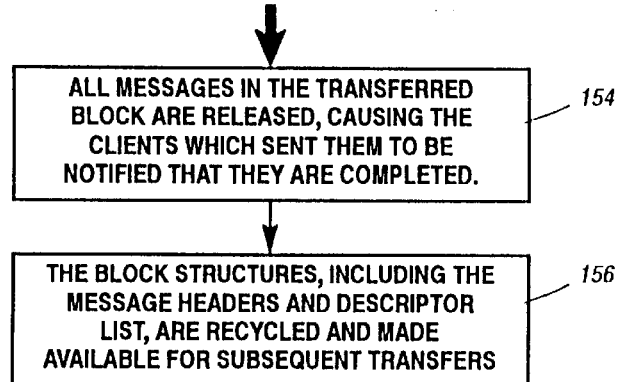

FIG. 9(d) illustrates the steps performed by the ICD and QSP 76 when the transfer completes. As shown, when the transfer completes, the ICD is awakened. At step 144, the ICD receives an indication of whether the transfer completed successfully. If not, control passes to step 146 where the ICD attempts to recover from the error by, for example, retransferring the block in question, resetting the physical connection, etc. If the transfer completed successfully, control passes to step 148. At step 148, the ICD adjusts the flow-control state of the physical connection. This is done because in the embodiments of the physical connection described above, the interconnection is polled. When a transfer completes, the interconnection may not be able to initiate another transfer until it is polled again, so the flow-control state is adjusted to reflect this. Next at step 150, the ICD calls the QspAckBlockToHost( ) procedure to notify the QSP that the transfer to MCP 12 is complete and to indicate which descriptor list was transferred. At step 152, the ICD performs a cleanup procedure and then returns.

As shown at point "B" in FIG. 9(d), when the QSP 76 receives the QspAckBlockToHost( ) indication from the ICD, notifying it that the transfer to MCP 12 completed successfully, the QSP 76 enters step 154 where all messages in the transferred block are released, causing the clients that sent them to be notified that they were successfully transferred. At step 156, the block structures, including the message headers and descriptor list, are recycled and made available for subsequent transfers. Control then loops back to step 127 of FIG. 9(b) for processing of subsequent blocks.

Figure 9E:
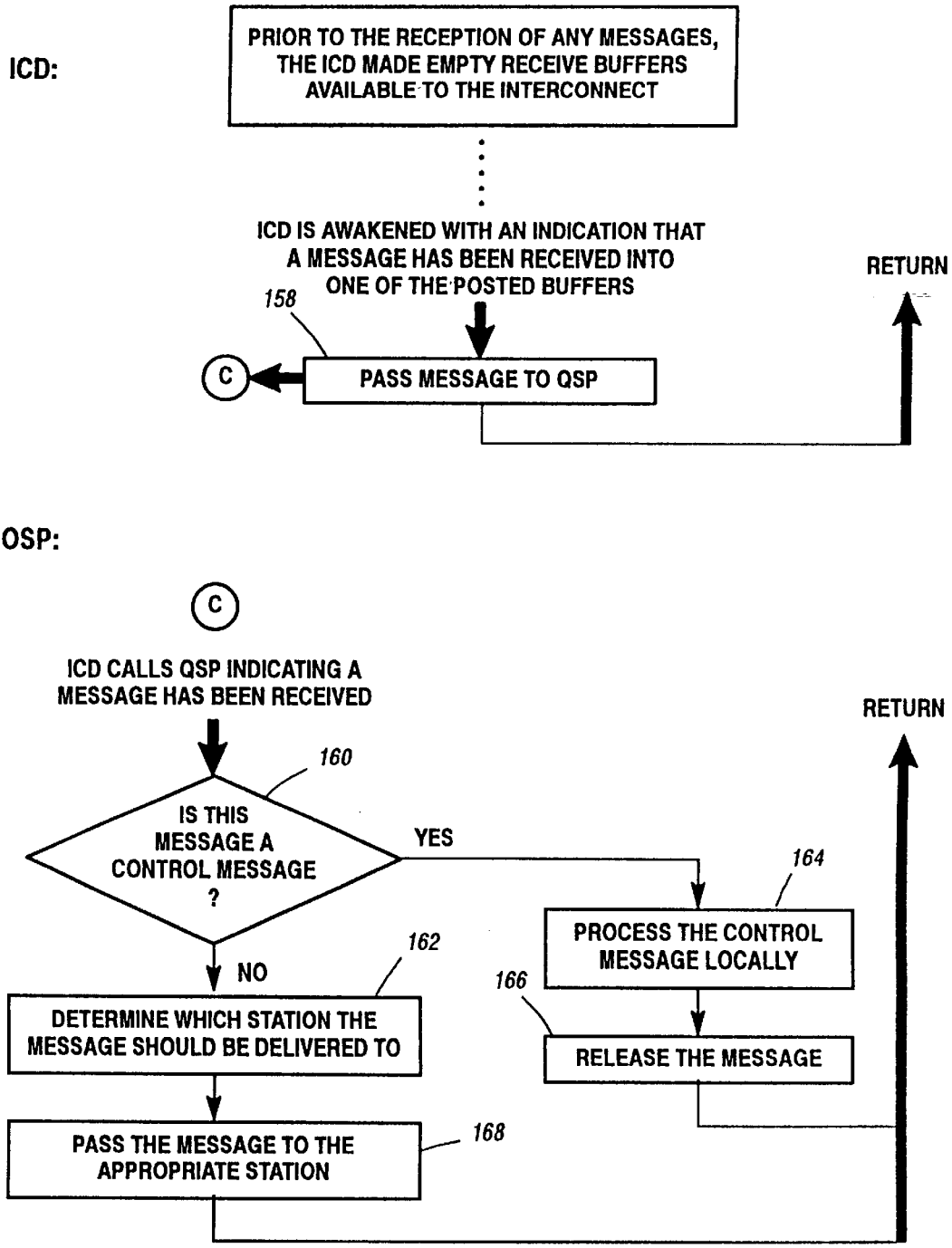
Figure 9F:
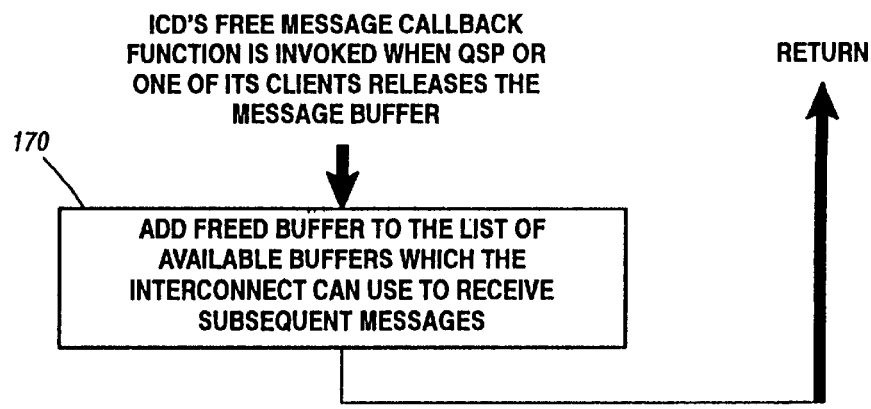

FIGS. 9(e)–9(f) illustrate the steps performed by the ICD and QSP 76 in transmitting a message from the A Series server 100 to the NT server 102. As shown, prior to the reception of any messages from the A Series server 100 via the physical connection, the ICD makes empty receive buffers available to the connection. When a message is transferred from the A Series server 100 to the NT server 102 via the physical connection (e.g., through the feedthrough card 62, across cable 64, and through the EPCCA card 66 in the embodiment of FIG. 6), the ICD is awakened with an indication that a message has been received into one of the empty receive buffers that it posted. At step 158, the ICD passes the message to the QSP 76 from the A Series server 100 using the QspLRPut( ) function and returns.

At step 160, the QSP 76 determines whether the message is a control message. If so, at step 164, the QSP 76 processes the control message locally, and then releases the message at step 166 and returns. If the message is not a control message, then control passes to step 162. At step 162, the QSP 76 determines from the RQR in the message header which station is to receive the message. Next, at step 168, the message is passed to the appropriate station.

As shown in FIG. 9(f), when the QSP 76 or one of its clients releases the message buffer, a free message callback function of the ICD is invoked. At step 170, the ICD adds the freed buffer to the list of available buffers which the physical connection can then use to receive subsequent messages in the manner described above.

As noted above, VLAN 79 provides a high speed communications interface between the A Series server 100 and the NT server 102. As shown in each of the embodiments of FIGS. 6–8, a Virtual LAN Miniport driver (VLAN) 79 is provided in the communications path between the A Series server 100 and the NT server 102. Generally, VLAN 79 is an NDIS device driver which appears as a "Virtual LAN" to both the A Series TCP/IP network provider (TCP/IP HRNP 44) and to the Windows NT-based TCP/IP stack (TCPIP.SYS 58). VLAN 79 implements a high speed, low latency path between an A Series server 100 and an NT server 102 such that both servers may use their native mechanisms to communicate with each other.

VLAN 79 is a Windows NT Network Driver Interface Specification (NDIS) driver that simulates an NDIS Fiber Distributed Data Interface (FDDI) network interface card (NIC) Miniport driver to TCPIP.SYS 58 on the NT server 102 and exchanges data with the LANSG 78 via line 0 for delivery to and receipt from the A Series server 100. In other words, VLAN 79 appears to be an FDDI NIC to TCPIP.SYS 58 and to the LANSG 78. However, in reality, VLAN 79 is just a NDIS device driver that simulates an FDDI interface card to the Windows NT NDIS Wrapper. VLAN 79 provides the same external interfaces as any other NDIS driver. VLAN 79 conforms to the standards set by Microsoft for NDIS Miniport Drivers in order to remain transparent to the higher layer protocols. VLAN 79 has a procedural interface to the LANSG module 78 which is not bound by strictly enforced interface definitions. Generally, the interface to LANSG is based upon a modified set of the rules that are enforced by the NDIS Wrapper.

As described in the afore-mentioned commonly owned application, VLAN 79 emulates an FDDI-like LAN, although it is really point-to-point within the memory of the NT server 102. Because a standard LAN such as FDDI is emulated, the communications protocol, for example, TCP/IP on both servers, can work unmodified. Likewise, all programs that use TCP port files on the MCP 12, and WinSock TCP sockets on the NT server 102 can intercommunicate without changes. Also, because the LAN connection is actually the memory of the NT server 102, the latency of a message going from the NT server 102 to MCP 12 or vice-versa is small, and the VLAN 79 can sustain a higher transaction rate than other channel adapters. Also, emulating an FDDI LAN allows the use of segment sizes larger than can be supported over Ethernet (4500 bytes versus 1500 bytes for Ethernet). Moreover, because the overhead of each segment is spread out over larger segments, the overall data throughput is correspondingly higher.

MSS is a system interconnect independent messaging transport which presents to its users many different delivery and notification mechanisms for the reliable transfer of both control and data information between different heterogeneous environments. In preferred embodiments, the underlying interconnection may be the afore-mentioned QSP interconnect or a CIA interconnect of the type described in U.S. Pat. Nos. 6,088,729, 6,345,296, and 6,064,805, and all assigned to the present Assignee, Unisys Corporation. The contents of these patents are hereby incorporated by reference in their entireties. For each interconnection, the MSS allows for receipt of all acknowledgments before the transmitted data is dropped from the transmitting system=s memory. Large messages may be sent since it is not necessary to break the messages into LAN segment sizes, thereby further improving communications efficiency. Since the MSS interfaces directly to the host interface function ("HIF"), when the interconnect is changed, only the MSS interface to the HIF needs to be changed; all other software need not be modified.

Figure 10:
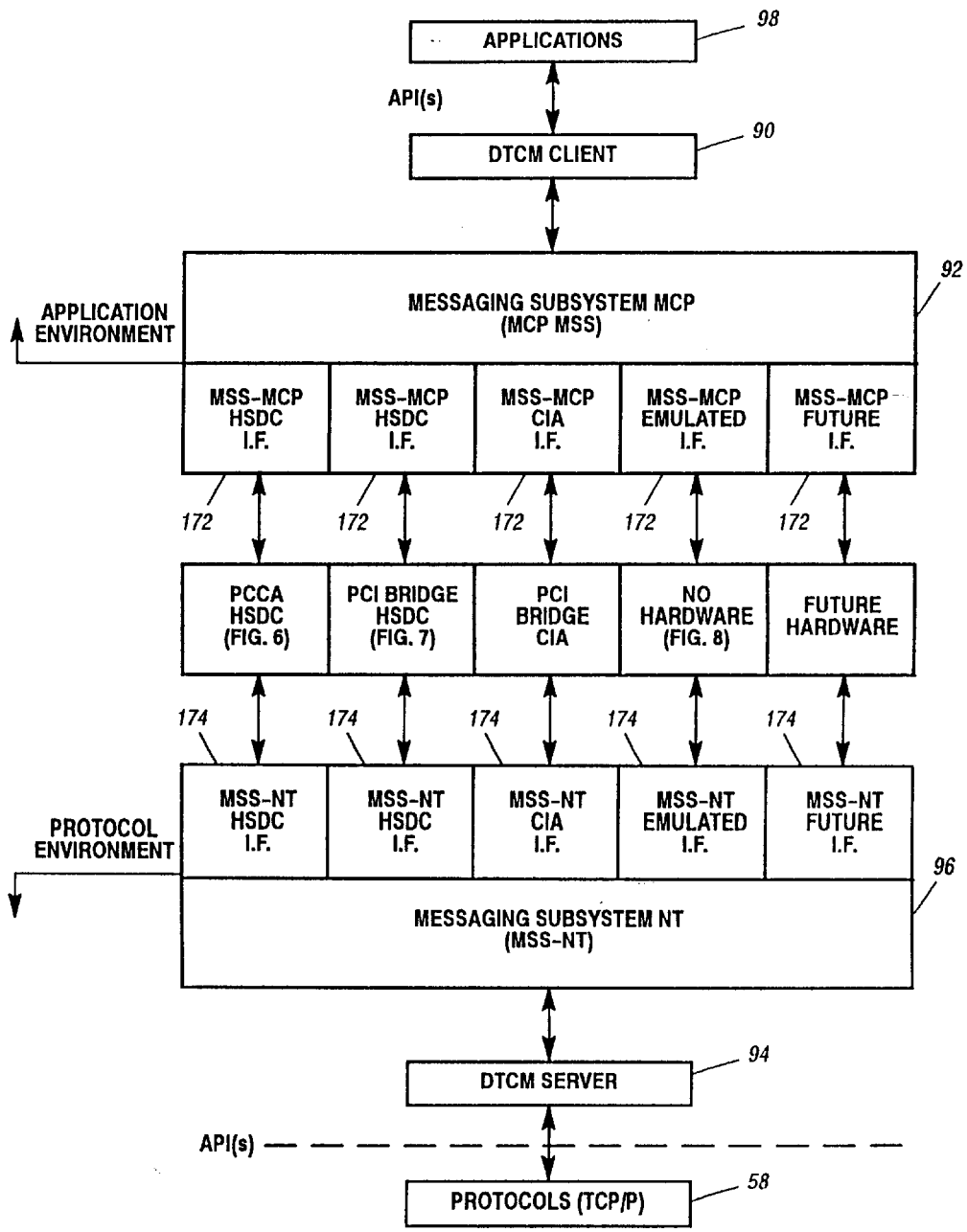
FIG. 10 illustrates the DTCM/MSS interconnect communications interface of the invention.

FIG. 10 illustrates the DTCM/MSS interconnect communications interface of the invention on a ClearPath HMP NX enterprise server with one MCP environment and one NT environment. As illustrated, the communications interface includes the following modules:

1. DTCM-Client 90 processes API requests for network transport services. These API requests are unaltered, i.e., they are the standard network transport APIs provided in the Application Environment from applications 98. DTCM-Client 90 utilizes remote protocol stacks via requests issued to a corresponding remote DTCM-Server 94.

2. DTCM-Server 94, by request of the DTCM-Client 90, interfaces to the local transport protocol stack 58. DTCM-Server 94 maps requests from DTCM-Clients onto the corresponding local API functionality, reporting results back to the requesting DTCM-Client 90.

3. The Messaging Subsystem (MSS) isolates all environment-dependent functionality such as the underlying mechanisms by which other DTCM components communicate. MSS components are unique, as required for different platforms, while the other portions of DTCM are common. Depending on system platform, the MSS utilizes the appropriate underlying interconnect.

The DTCM/MSS protocol of the invention for replacing the conventional transport protocol in accordance with the invention will be described in the following sections, starting with the network layer (MSS) and concluding with the DTCM.

I. MESSAGING SUBSYSTEM ("MSS")

The Messaging SubSystem ("MSS") is a system interconnect independent messaging system used by DTCM or other transport layer protocols ("MSS users") in place of the IP protocol to provide different messaging models (both a pull model and a push model) and a variety of services to its users. As shown in FIG. 10, the MSS is a general purpose messaging architecture suitable for any networking use. Generally, the MSS is analogous to the current network provider's (e.g., TCP/IP and BNA network providers) I/O interface to Network Processors of the MCP 12. However, the MSS provides a level of abstraction from the actual I/O interface which allows the same interface to be used across a plurality of system platforms and system interconnect paradigms. As will be appreciated by those skilled in the art from the following description, unlike the IP protocol, MSS provides for the reliable delivery of data to its users. One such user is the Distributed Transport Communications Manager ("DTCM") to be described in detail in the next section.

Generally, in a preferred embodiment, the MSS is responsible for the initiation, data transfer, and termination of dialogs between the DTCM-Server 94 and the DTCM-Client 90 across the system interconnect(s) provided by the system platform architecture. The MSS provides multiple data dialogs between clients and server(s) and hides any platform or system interconnect independent characteristics and idiosyncrasies from the MSS "user". The MSS presents a procedural interface (with callbacks) for its users to perform these services.

Since all system interconnects present the same interface to the MSS "user", no changes are necessary in the DTCM-Client 90 or DTCM-Server 94 because of the MSS or because of changes in the interconnect. However, since the MSS interface provides both a "pull model" and a "push model," components in different environments may wish to use different delivery semantics for environment-specific reasons.

In presently preferred embodiments of the invention implementing DTCM (the "MSS user") in place of TCP, the MSS is initialized by the DTCM-Server 94 and DTCM- Client 90 upon startup via a call to MSS_Initialize( ). This creates any structures needed by the MSS. MSS, upon initialization, searches the interconnect for other MSS users which have already been initialized. It informs the local MSS user about any complementary MSS users via a USER-CHANGE-NOTIFICATION (e.g., it tells the local DTCM components about any other DTCM components found in the interconnect). There is one USER-CHANGE-NOTIFICATION for each remote MSS user found. This can be used by the local MSS user to initialize with each remote MSS user (e.g., exchange IP addresses or other configuration information). The local MSS is terminated via a call to MSS_Terminate( ) from the DTCM-Server 94 or DTCM-Client 90. This terminates any MSS dialogs from this environment. All remote environments with dialogs to this local environment are notified via a DIALOG-CHANGE-INDICATION (for Endpoint (or data) Dialogs) and a USER-CHANGE-INDICATION (for the control dialogs).

Following initialization by a user, the MSS is responsible for initializing with all of its counterparts executing in remote complementary environments. This means that the MCP MSS 92 must initialize with all NT MSSs 96 which are active. The MSS is also responsible for allocating and reserving some amount of memory for incoming messages from remote environments as well as for outbound control information (which is transmitted along with outbound data requests). This area will be different for each environment (MCP versus NT) as well as each system interconnect paradigm (e.g., FIGS. 6, 7, 8, or CIA).

Operation of the MSS will be described below in four major areas: (1) Remote MSS User Management functions which allow the MSS to inform its users of status changes of remote MSS users (those in different co-resident environments); (2) Endpoint Dialog Management functions which allow MSS Users to establish, receive status about, and destroy MSS Endpoint Dialogs with remote MSS users; (3) Control Message Transfer Functions which allow MSS users to transfer control messages with each other such that control message content is completely transparent to the MSS; and (4) Data Transfer functions which allow MSS users to transfer data separate from Control Message Transfer in order to provide optimization of data transfers.

A. Remote MSS User Management

The MSS is responsible for informing its local users of status changes of remote users. Remote user status is distinguished only as either "available" or "unavailable". The MSS provides its users with a User-Change-Notification whenever it detects a status change for a remote user of interest to one of its local users. The notification indicates the current status of the remote user. When "available" is indicated, the MSS identifies the environment which the remote user is located in, the MSS control dialog connecting the MSS users, and the remote user's type (e.g., DTCM-Server 94, DTCM-Client 90). In response, the MSS user provides its own local reference value for the indicated MSS dialog. MSS includes this reference in any other operations on the same control dialog.

On detecting a remote user's change to "unavailable" status or any error which occurs on the dialog, MSS also provides a User-Change-Notification. Once told of a remote user's unavailability, the corresponding MSS dialog can no longer be used. If the dialog is "unavailable," functions performed on that dialog will not work and return an error result to the caller. The dialog can be used again when a User-Change-Notification of "available" is presented to the MSS user.

B. Endpoint Dialog Management

In addition to the control dialog which the MSS automatically establishes on behalf of its users, an MSS user may also establish additional MSS_Endpoint_Dialogs at its discretion. MSS provides two operations for this purpose: Create-Endpoint-Dialog and Open-Endpoint-Dialog. In order to complete MSS Endpoint Dialog establishment, a Create-Endpoint-Dialog operation is performed by one of the MSS users and an Open-Endpoint-Dialog is performed by the peer MSS user. The Open-Endpoint-Dialog operation requires information obtained via the Create-Endpoint-Dialog; this information is communicated to the peer over a control dialog (or any other applicable mechanism).

To perform a Create-Endpoint-Dialog, the MSS user provides sufficient information to uniquely identify the remote MSS user to which a dialog should be established. This includes the environment in which the remote user is located, the remote user's type, and an identifier for the particular instance of the remote user. In addition, the MSS user also indicates any options for this dialog describing how it wishes MSS to deliver data to the remote user, along with a local reference to be used by the MSS for any notifications back to the MSS user about this dialog. On completing a Create-Endpoint-Dialog, the MSS provides a system-unique identifier for this MSS dialog. To complete the process, the peer MSS user must be given the value of the dialog identifier obtained by the Create-Endpoint-Dialog and then invoke an Open-Endpoint-Dialog, providing that value as input (along with its own local reference value for the local MSS). However, a MSS user may not utilize a dialog after a successful completion of a Create-Endpoint-Dialog or Open-Endpoint-Dialog because the dialog will not be completely established. The MSS user must wait for a Dialog-Change-Notification of "available" to start sending data over this dialog.

Generally, the MSS_Endpoint_Dialogs have five states: PENDING_OPEN, OPEN, NOT_READY, REMOTE_CLOSED, and CLOSED. PENDING_OPEN indicates that the local environment has successfully completed the create MSS_Endpoint_Dialog, but the remote environment has not initiated the corresponding open or the open has not completely finished. Data cannot be sent or received on this dialog. OPEN indicates that the MSS_Endpoint_Dialog is active and ready for use. Data can be sent or received on this dialog. NOT_READY indicates that this dialog is being flow controlled. Data cannot be sent on this dialog; however, data may be received. The REMOTE_CLOSED dialog is in the process of closing or destroying. The remote environment has closed the dialog and the user has been notified about this closure. Data may still be available in the MSS for this dialog, but new data cannot be sent using this dialog. Finally, CLOSED indicates that this dialog is closed and that data cannot be sent or received across this dialog.

MSS endpoint dialogs are terminated by performing a Close_Endpoint_Dialog or Destroy_Endpoint_Dialog operation. If the Close_Endpoint_Dialog operation is performed, then peer MSS users perform this operation independently, and are notified of the remote side closing by a remote close indication. After the local MSS user closes, the remote user cannot send data on this dialog, but the remote user can retrieve any queued input data on this dialog, until it closes its side of the dialog. If the Destroy_Endpoint_Dialog operation is performed, then the remote user is notified immediately that the dialog is "CLOSED" and all waiting data is discarded.

C. Control Message Transfer

Control Message Transfer functions allow MSS users to transfer control messages with each other. Control message content is completely transparent to the MSS. A MSS user initiates a control message transfer by starting a Send-Control-Message operation. The caller identifies the MSS dialog to send on, the length of the message, and a pointer to the start of the message. The target MSS dialog need not be a control dialog, for the control message may be sent over MSS Endpoint Dialogs. If sent over an MSS Endpoint Dialog, control messages are delivered in order with any data messages sent on the same dialog. The peer MSS component delivers a control message to an MSS user via Receive-Control—Message, providing the MSS user's reference value for the MSS dialog data arrived on, the length of the data, and a pointer to the data. Control messages must be sent and delivered (into and out of the MSS) in a contiguous memory area.

D. Data Transfer

Data Transfer functions allow MSS users to transfer data in an efficient manner. MSS supports both byte-stream and message oriented data transfers. An MSS user selects the mode of operation by its setting (or not setting) the Endpoint Dialog's Message-Oriented option. The MSS requires that both ends of an endpoint dialog use the same message-oriented option value. An MSS user also must select the mode of data delivery for MSS to use when data arrives in the local environment.

For MSS data transfer, the following operations are used by MSS:

The Deliver-Data operation requests that MSS deliver data over an MSS dialog. Data is delivered to the peer MSS user via either a Data-Notification or Accept-Data operation. This operation may not be performed on a control dialog. However, the request need not be used exclusively for application data, for the MSS user may choose to send control information using this mechanism. All data presented to MSS, excluding the MSS header, must be in a contiguous memory area. MSS is responsible for delivering data reliably and in order. For both byte-stream and message oriented dialogs, MSS may chose to deliver data to the peer MSS user in more than one piece. If delivered in multiple parts, partial and final transfers are noted as such to the receiver, including indications of the length of this portion of the data and the length of the original Deliver-Data request. For message-oriented dialogs, the MSS and MSS user cooperate to handle message semantics. Two variants of Deliver-Data exist and are applicable to both stream and message oriented dialogs: (a) the "shared-buffer" variant which allows ownership of the data buffer to be passed to MSS, and (b) the "private-buffer" variant in which MSS must copy the data into buffer(s) it is responsible for acquiring. MSS is permitted to reject either variant of this request with a "no resources" indication. For the shared-buffer variant of this request, MSS is responsible for providing a Deliver-Data-Completed indication to the caller when the operation has been completed.

The Deliver-Data-Complete operation indicates to the MSS user that a previously initiated Deliver-Data operation has been completed. This indication may occur independently of processing occurring in the receiving environment; it does not indicate that the peer MSS user has received the data, only that the local MSS component has completed its processing and ensures delivery (barring dialog failure). The MSS user is provided with a transparent (to MSS) reference value which it provided in its corresponding Deliver-Data operation.

The Accept-Data operation is the resultant action of completing a Deliver-Data request initiated by a peer MSS user when the receiving MSS user has selected the Auto-Data-Delivery dialog option. This request always includes passing buffer ownership from MSS to the MSS user; there is no private-buffer variant of this operation. When the MSS user has completed its processing, it is responsible for providing a corresponding Accept-Data-Complete notification to the MSS.

The Accept-Data-Complete operation provides MSS with an indication that a previously initiated Accept-Data operation has been completed. MSS is provided with a transparent (to the MSS user) reference value provided by the MSS in its corresponding Accept-Data operation.

The Data-Notification operation is an indication provided by MSS to inform a MSS user that data is available. This occurs as a result of the MSS completing a Deliver-Data request by a peer MSS user when the MSS user has not selected an Auto-Data-Delivery dialog option. MSS indicates how much data is available but no transfer of data or buffer ownership occurs with this action.

The Retrieve-Data operation is a request made by a MSS user to retrieve data from MSS (previously indicated via a Data-Notification). The MSS user provides a buffer, with maximum data length indication, into which MSS is to copy data. Depending on the amount of data requested in the Retrieve-Data request and the status of previously indicated data, the private-buffer variant may result in the transfer of data consisting of the partial content of a MSS I/O buffer, the entire content of one or more MSS I/O buffers, or a combination thereof. For message oriented dialogs, MSS transfers only up to one complete message in a single Retrieve-Data operation. If the specified maximum data length is less than the length of the next available message, that message is truncated and the remainder of the message is discarded. This status is returned to the MSS user.

E. MSS Over Different Interconnects

As noted above, the MSS varies over different interconnect architectures. The MSS for each interconnect paradigm mentioned above will now be described.

1. QSP Interconnects

Figure 11:
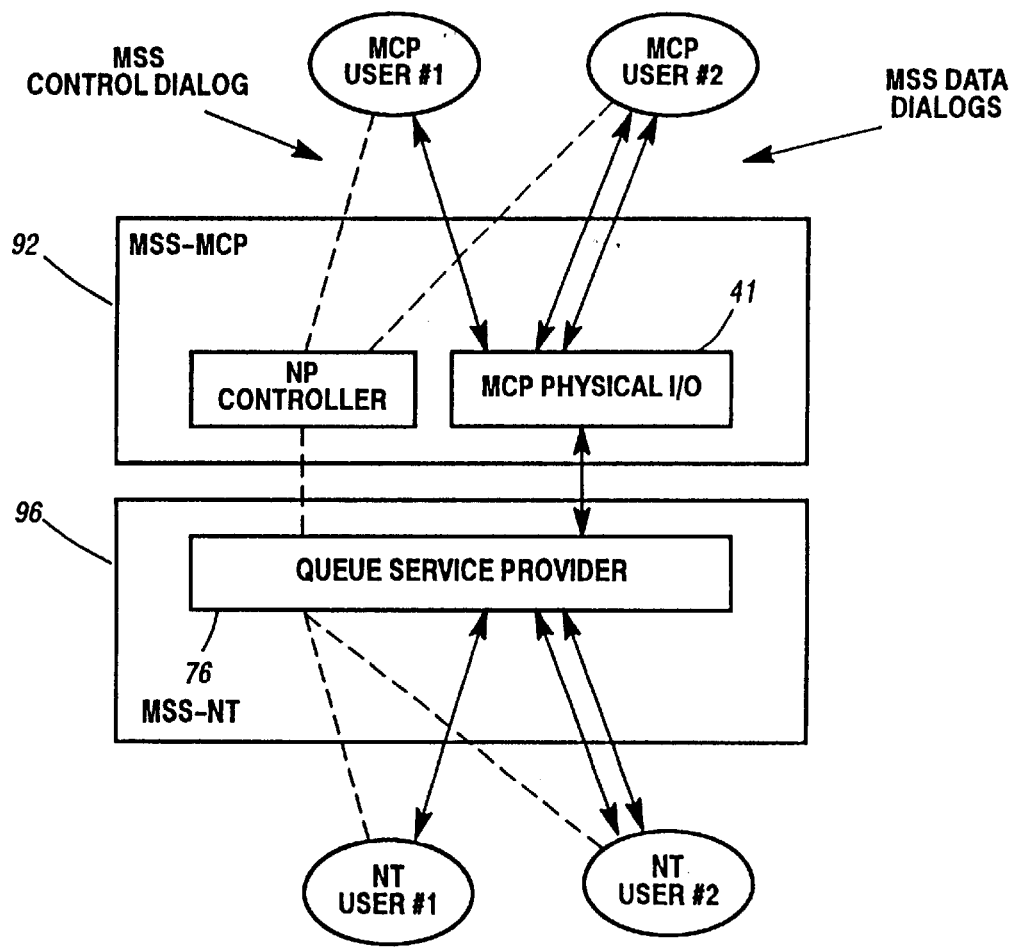
FIG. 11 illustrates how QSPv2 dialogs are used by MSS over the MCP/NPSupport interface to talk with each MSS-NT environment.

Generally, as shown in FIG. 11, the MSS uses the QSPv2 message format as the protocol over the interconnect architecture (HSDC) interface to talk to each remote MSS. In the MCP environment, all outbound data for each NT environment goes through the MCP Physical I/O 41 for that device. Inbound control data from the NT environment is received through the MCP Physical I/O 41. Inbound data for control dialogs is received via the MSS/CONTROL stack for that device, and inbound data for MSS_Endpoint_Dialogs is received via the MSS/DATA stack for that device. There is one set of stacks per NT environment. MSS dialog IDs are multiplexed over the range of QSPv2 addresses. Outbound MSS_Endpoint_Dialog addresses use ID #2 to determine the NT MSS user. Inbound MSS_Endpoint_Dialogs use ID #1 to determine the MCP MSS user.

For QSP based interconnects, the MSS is a non-shared memory model. Thus, MSS input/output buffers exist in both the MCP and NT environments and the MSS utilizes QSP 76 to move memory content between these buffers. MCP output in this environment is summarized in FIG. 12. As illustrated in the top half of FIG. 12, upon processing a private-buffer Deliver-Data request, the MCP MSS 92 obtains an available MSS MCP output buffer 200 of the appropriate size. Within this buffer, the MCP MSS 92 first places any control information needed by MSS 96 to complete the operation, and then copies the Data Transfer Header and application data into this buffer 200. The MCP MSS 92 then initiates a write for the single area. A large data transfer may be split between multiple buffers.

Figure 12:
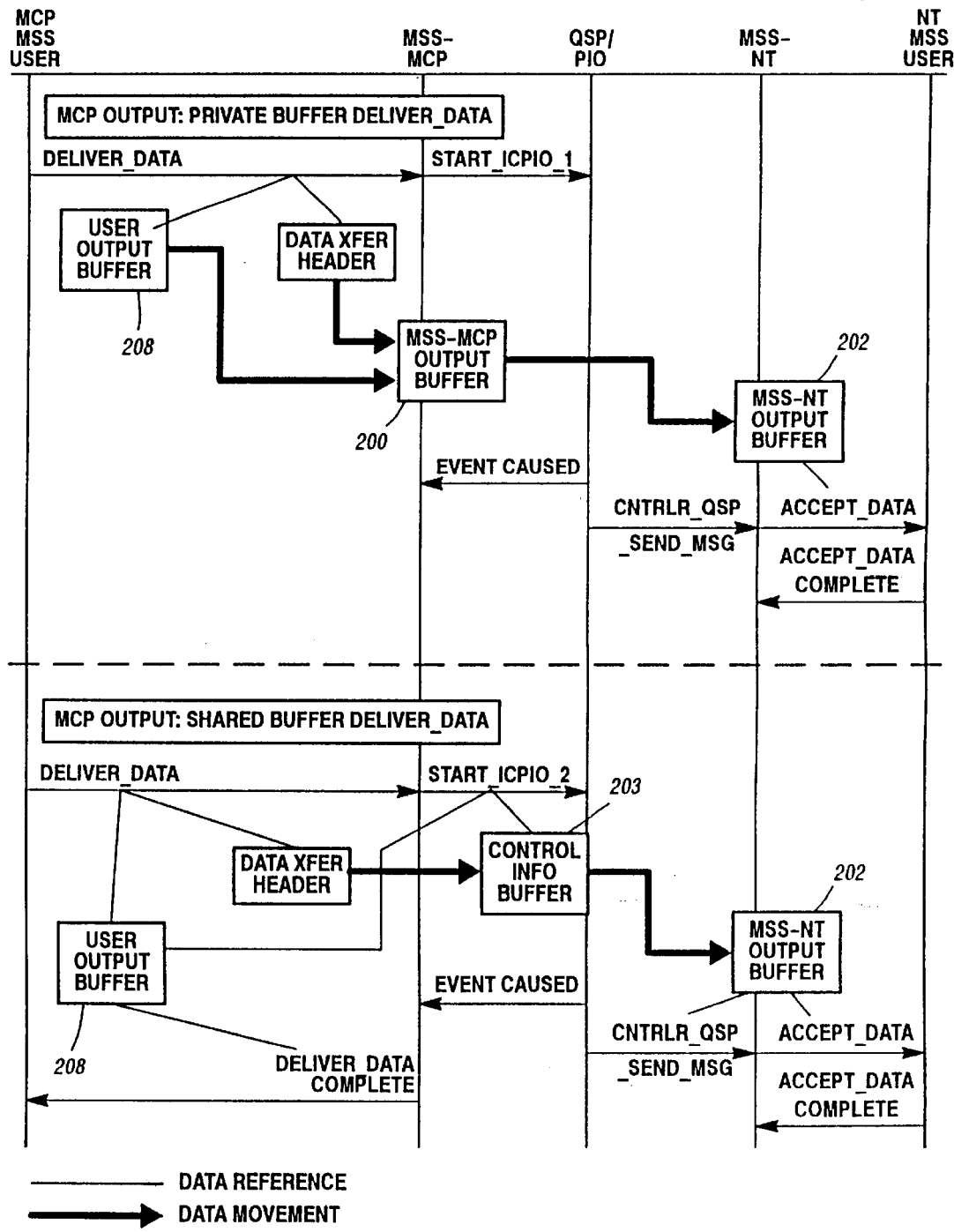
FIG. 12 illustrates the QSP-based output data transfer flow for MCP output using DTCM/MSS.

On the other hand, as illustrated in the bottom half of FIG. 12, upon processing a shared-buffer Deliver-Data request, the MCP MSS 92 builds a small 'Control Info Buffer' 203 containing information needed by MSS-NT 96 to complete the operation and the Data Transfer Header. The MCP MSS 92 then initiates a write for the two buffer areas (the Control Info buffer 203 and the Cooperative interface application's output buffer). QSP 76 completes the corresponding requests, and MSS-NT 96 provides the DTCM-Server 94 with an Accept-Data request. If the NT environment QSP receive request required multiple buffers, MSS-NT 96 issues an Accept-Data request for each buffer, using the control information contained in the first buffer. Finally, when notified by the DTCM-Server 94 that the Accept-Data has been completed, MSS-NT 96 returns the corresponding buffer 202 to its receive buffer pool.

Figure 13:
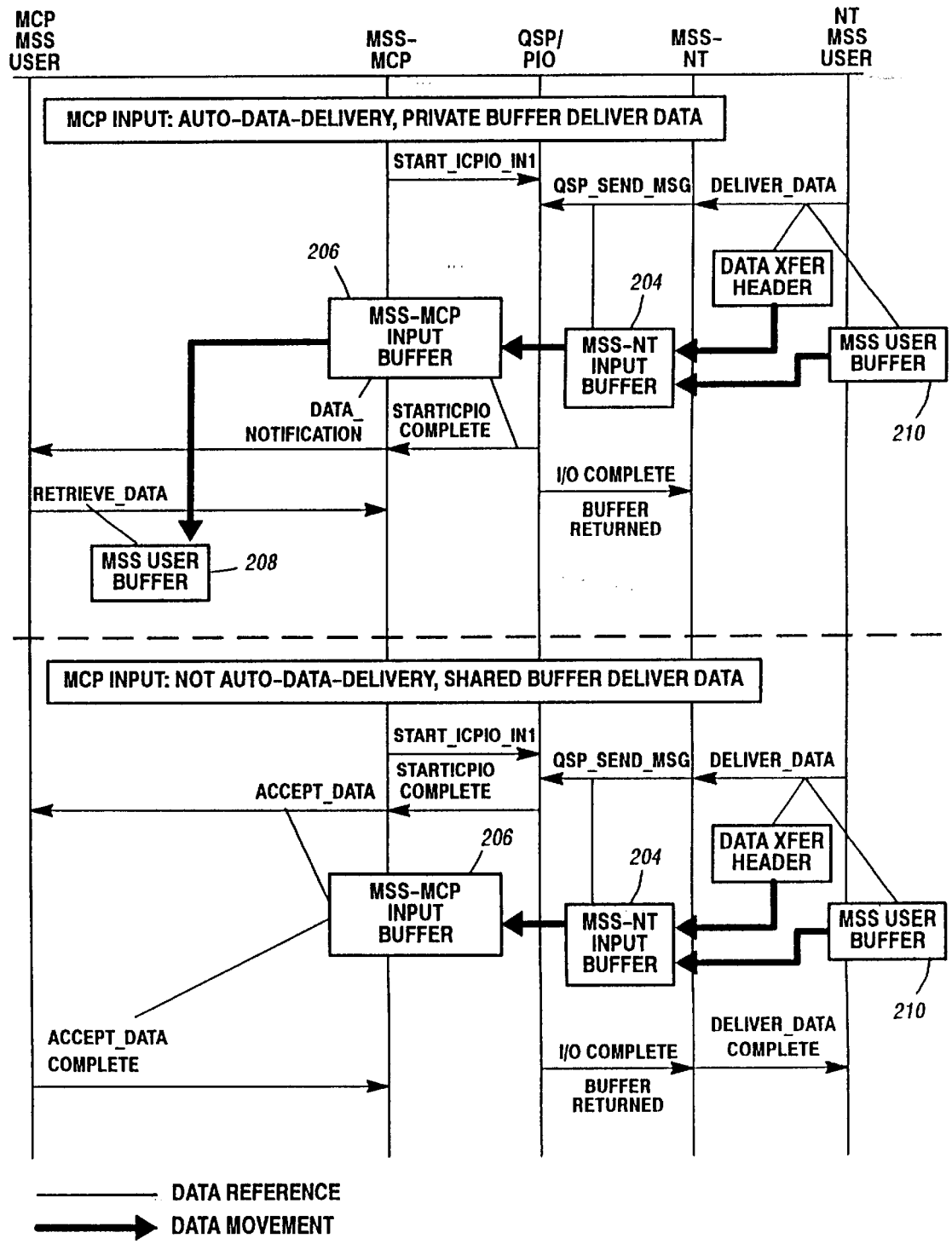
FIG. 13 illustrates the QSP-based input data transfer flow for MCP input using DTCM/MSS.

MCP input in this environment is illustrated in FIG. 13. As illustrated, under normal conditions, the MCP MSS 92 component has outstanding read operations in progress, using buffers from a buffer pool. As illustrated in FIG. 13, upon processing a private-buffer Deliver-Data request, MSS-NT 96 obtains an MSS NT input buffer 204 of the appropriate size (large sends may require multiple buffers). In this input buffer 204, MSS-NT 96 first places information needed by MCP MSS 92 to complete the operation and then copies the Data Transfer Header and application data in the buffer(s). MSS-NT 96 processing for a shared-buffer Deliver-Data request is exactly the same as the private-buffer case above except that a completion notification is returned. QSP 76 completes the corresponding MSS requests. The MCP MSS 92 provides the DTCM-Client 90 with a Data-Notification or Accept-Data request. If the QSP receive request required multiple buffers, MCP MSS 92 issues a Data-Notification or Accept-Data request for each buffer, using the control information contained in the first buffer. Since there is no implicit acknowledgment from QSP_Send_Msg( ) (all input under QSP 76 is asynchronous—data is queued onto a list awaiting read requests to be issued from the host and the data associated with an appropriately-sized read), the MCP MSS 92 will wait for the buffer 206 to be returned to its control (it will be released when the transfer is successful) and then use that event as a completion notification.

2. Emulation Interconnects

The emulation interconnect embodiment of FIG. 8 is based upon the capabilities provided by a K-mode interpreter. Via the K-mode interpreter, the MCP MSS 92 component makes direct procedure calls into the NT component. Any such procedure call must adhere to the limitations imposed by the K-mode interpreter, e.g., control must be returned without suspending the interpreter thread. A "Wakeup" event is used by the NT component to indicate to the MCP component that it has something to deliver to the MCP component. Delivery is accomplished by a call from the MCP component to the NT component. This is done so that all MCP MSS/MSS user processing occurs on an interpreter thread.

The MCP and NT components share control message and data buffer memory allocated out of the emulated MCP memory space. All management of this memory space must be handled by the MCP MSS 92 component. The NT component does have read/write access to this memory space. These buffers are used for both user data and control messages passed between the MCP components. The MSS-NT 96 component utilizes the interpreter's functions/macros for such functionality as converting between K-mode and NT data formats and converting data descriptors to virtual addresses and lengths.

MSS dialogs are maintained via simple data structures (Control Dialog Info Blocks and Endpoint Dialog Info Blocks) within the MCP MSS 92 and MSS-NT 96 components. There is a one-to-one correspondence between an MCP MSS Dialog Info Block and an MSS-NT Dialog Info Block. In addition, two MSS-NT routines are user callable by the MCP MSS via the interpreter:

1. MSS-NT-Rcv-Msg is used to deliver a message from the MCP environment to the NT environment. MCP MSS 92 assembles relevant fields into a "Control-info-Buffer" 203 which is passed in the procedure via the interpreter and is directly accessible to MSS-NT 96. Control messages may control descriptors to additional MCP memory areas. This mechanism is used in the data transfer control messages; these memory areas are accessible to MSS-NT 96 via the interpreter.

2. MSS_NT_Get_Msg is used by the MCP environment to retrieve messages from the NT environment. MSS_NT_Get_Msg is invoked as a result of the MCP environment's Wakeup event being set. MCP MSS 92 provides a Control-Info-Buffer 203 into which MSS-NT puts the message to be delivered.

Figure 14:
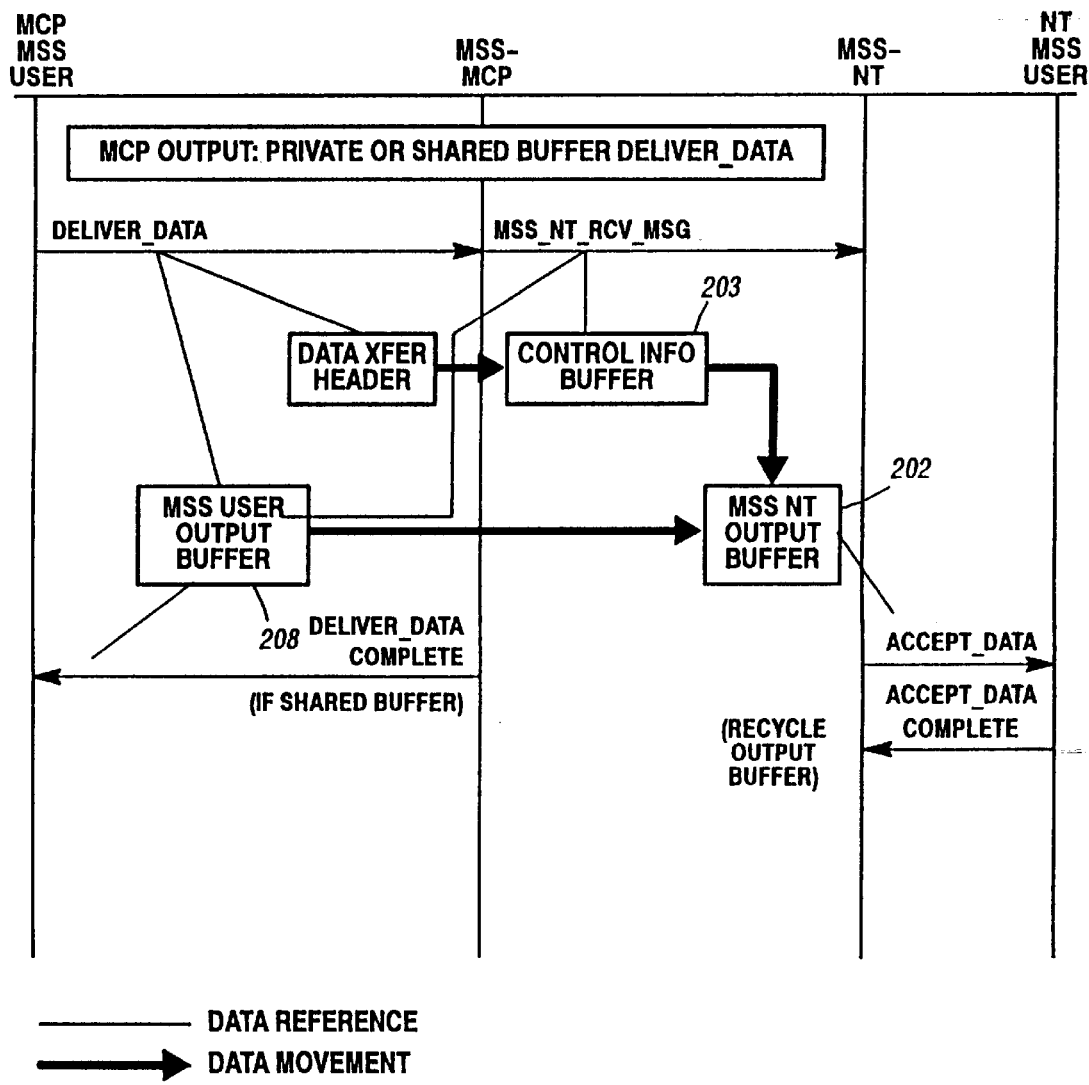
FIG. 14 illustrates MCP output data transfer flow using DTCM/MSS in an emulated interconnect embodiment.

MCP output in this environment is summarized in FIG. 14. Upon processing either variant (private-buffer, shared-buffer) of a Deliver-Data request, MCP MSS 92 builds a small 'Control Info Buffer" 203 containing information needed by MSS to complete the operation and the Data Transfer Header, and invokes MSS_NT_Rcv_Msg via the interpreter. Among the information provided is a descriptor the NT environment can use to access the Application output buffer. MSS-NT_Rcv_Msg processes the Deliver-Data message by copying from the Application Output Buffer into an available MSS NT output buffer(s) 202 (if no output buffer is available, a negative response is provided back to MSS-NT 96 in the routine's return result). Data is transformed from MCP layout to NT layout in the same operation as the data copy. MSS-NT 96 provides DTCM-Server 94 with an Accept-Data request. If the MSS-NT 96 required multiple buffers to copy/transform the MCP environment data, an Accept-Data request occurs for each buffer.

Figure 15:
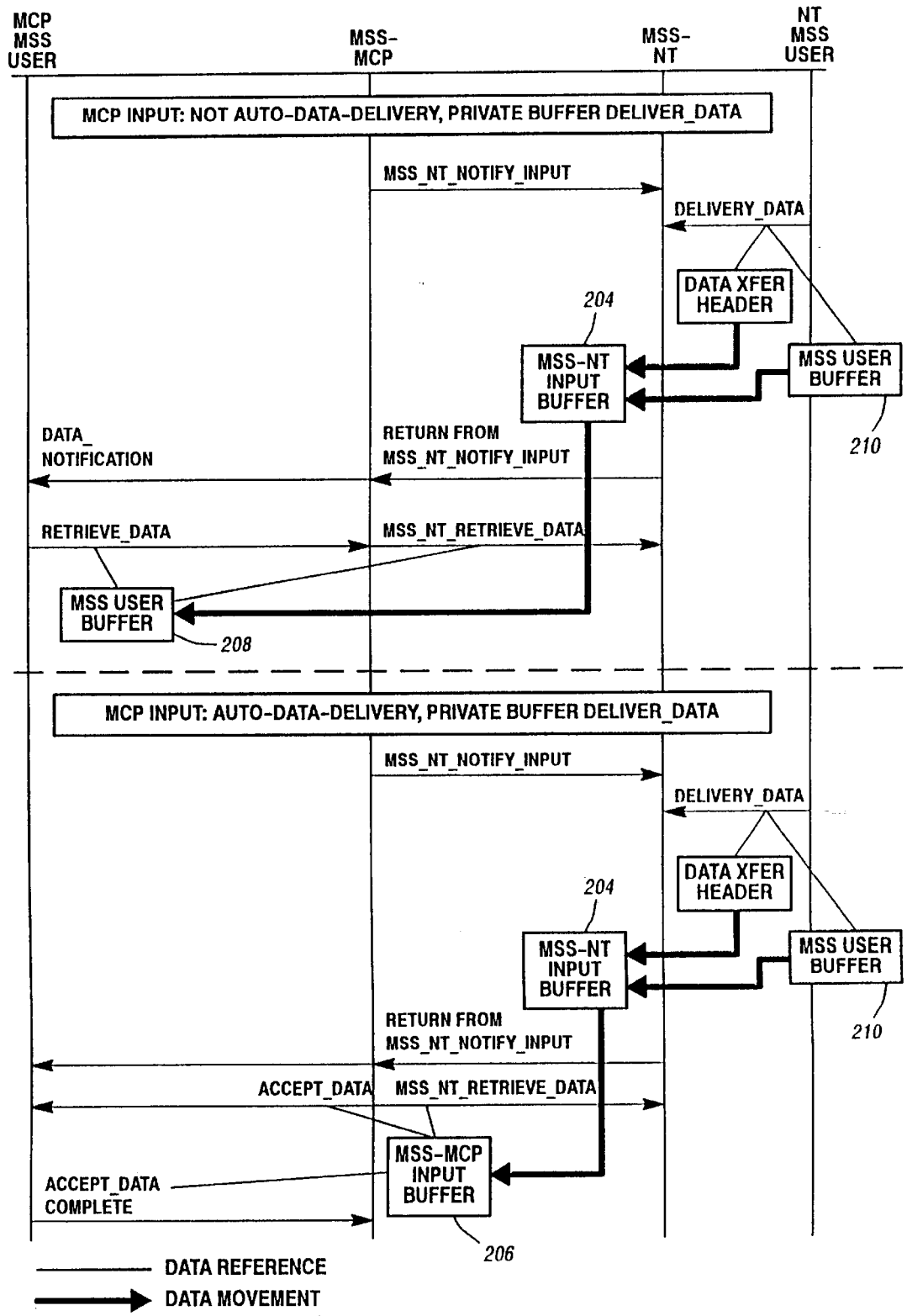
FIG. 15 illustrates MCP input data transfer flow using DTCM in an emulated interconnect embodiment.

MCP environment input in this environment is summarized in FIG. 15. Under normal conditions, the MSS-NT 96 component has available MCP environment buffers supplied by MCP MSS 92. Upon processing either variant (private-buffer or shared-buffer) of a Deliver-Data request, MSS-NT 96 copies data into an available MSS NT input buffer 204 (that data is transformed from NT layout to MCP layout in the same operation as the data copy), builds a small "Control Info Buffer" 203 containing information needed by MSS to complete the operation and the Data Transfer Header, and then invokes the interpreter to set the MCP environment's Wakeup event. Upon waking from a wait on its Wakeup event, MCP MSS 92 invokes MSS_NT_Get-Msg, providing a control input buffer for MSS-NT 96 to place its control message in. MSS_NT_Get_Msg returns and MCP MSS 92 and other components process the Data Notification or Accept-Data request. Upon processing a private-buffer Receive-Data request, MCP MSS 92 passes a corresponding Retrieve-Data request to MSS-NT 96 (via MSS_NT_Rcv_Msg). This request includes a descriptor to the application output buffer. MSS-NT 96 copies the requested data into the application output buffer. The Retrieve-Data request implies a Return-Buffer action for any buffer(s) emptied by that operation.

3. CIA Interconnects

As noted above, the interconnect may also be a CIA of the type described in the afore-mentioned related applications. The MSS of a CIA-based implementation uses one or more CIA dialogs for communication between each pair of nodes and is a non-shared memory model from the MSS perspective, regardless of the actual system environment. Thus, MSS input/output buffers exist in both the MCP and NT environments and the MSS utilizes CIA to move and transform memory content between these buffers. In the CIA environment, MSS is a CIA client (user) which will create buffer pools, pool managers, and dialogs between CIA nodes. It will present both a "pull model" and a "push model" for use by MSS users. MCP output in this environment is summarized in FIG. 16.

Figure 16:
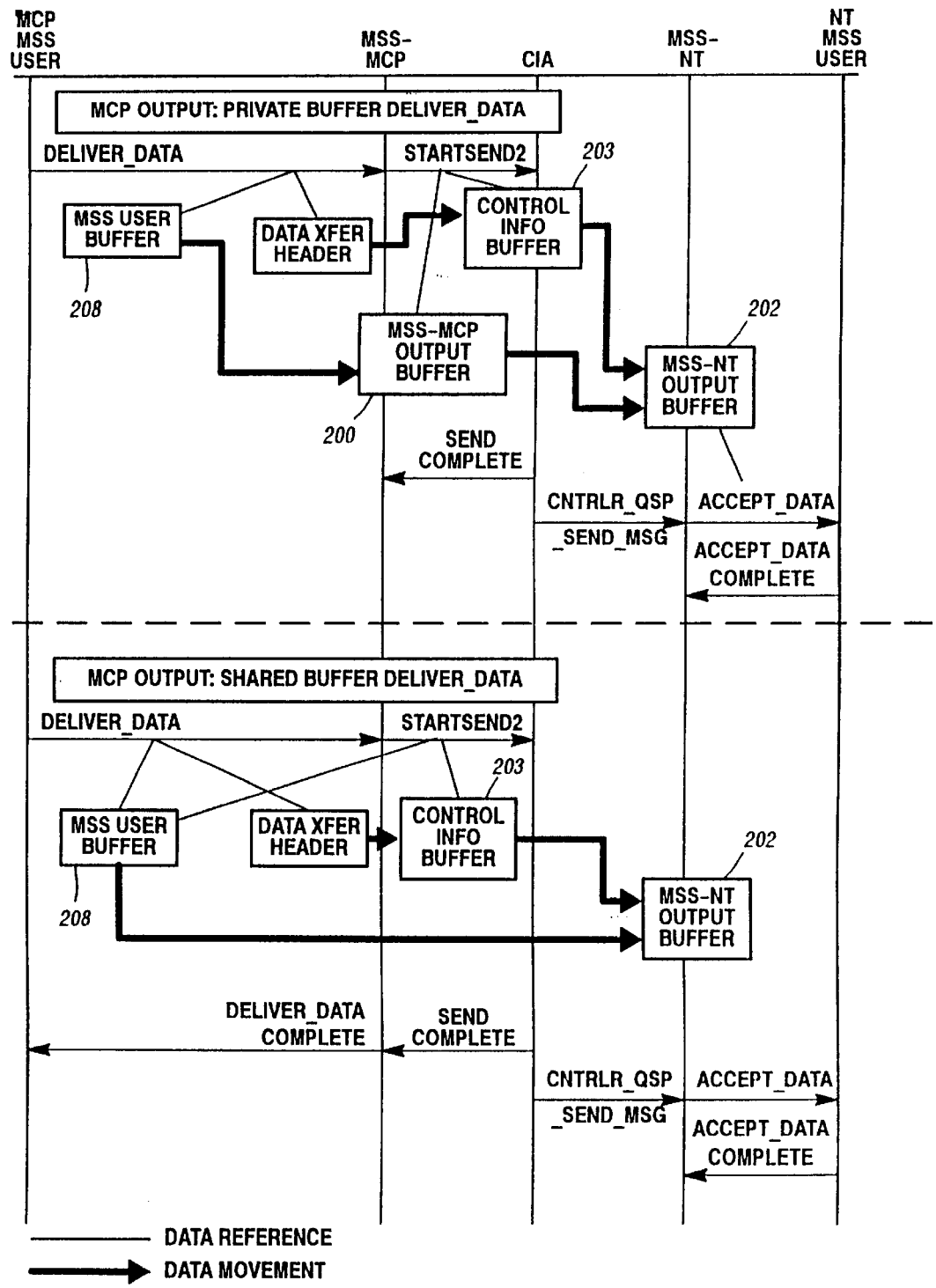
FIG. 16 illustrates MCP output data transfer flow using DTCM in a CIA interconnect embodiment.

As illustrated in FIG. 16, under normal conditions, both MSS components (MCP MSS 92 and MSS-NT 96) have outstanding CIA receive operations using a buffer pool. Upon processing a private-buffer Deliver-Data request, MCP MSS 92 copies data into an available output buffer 200, builds a small 'Control Info Buffer' 203 containing information needed by MSS to complete the operation and the Data Transfer Header, and then initiates a CIA send from the two buffer areas. MCP MSS 92 processing for a shared-buffer Deliver-Data request is similar except that the Cooperative Interface application's output buffer is used in the CIA send request. CIA completes the corresponding send/receive requests, while MSS-NT 96 provides the DTCM-Server 94 with an Accept-Data request. If the NT environment CIA receive request required multiple buffers, MSS-NT 96 issues an Accept-Data request for each buffer, using the control information contained in the first buffer. When notified by the DTCM-Server 94 that the Accept-Data has been completed, MSS-NT 96 returns the corresponding buffer 202 to its receive buffer pool.

Figure 17:
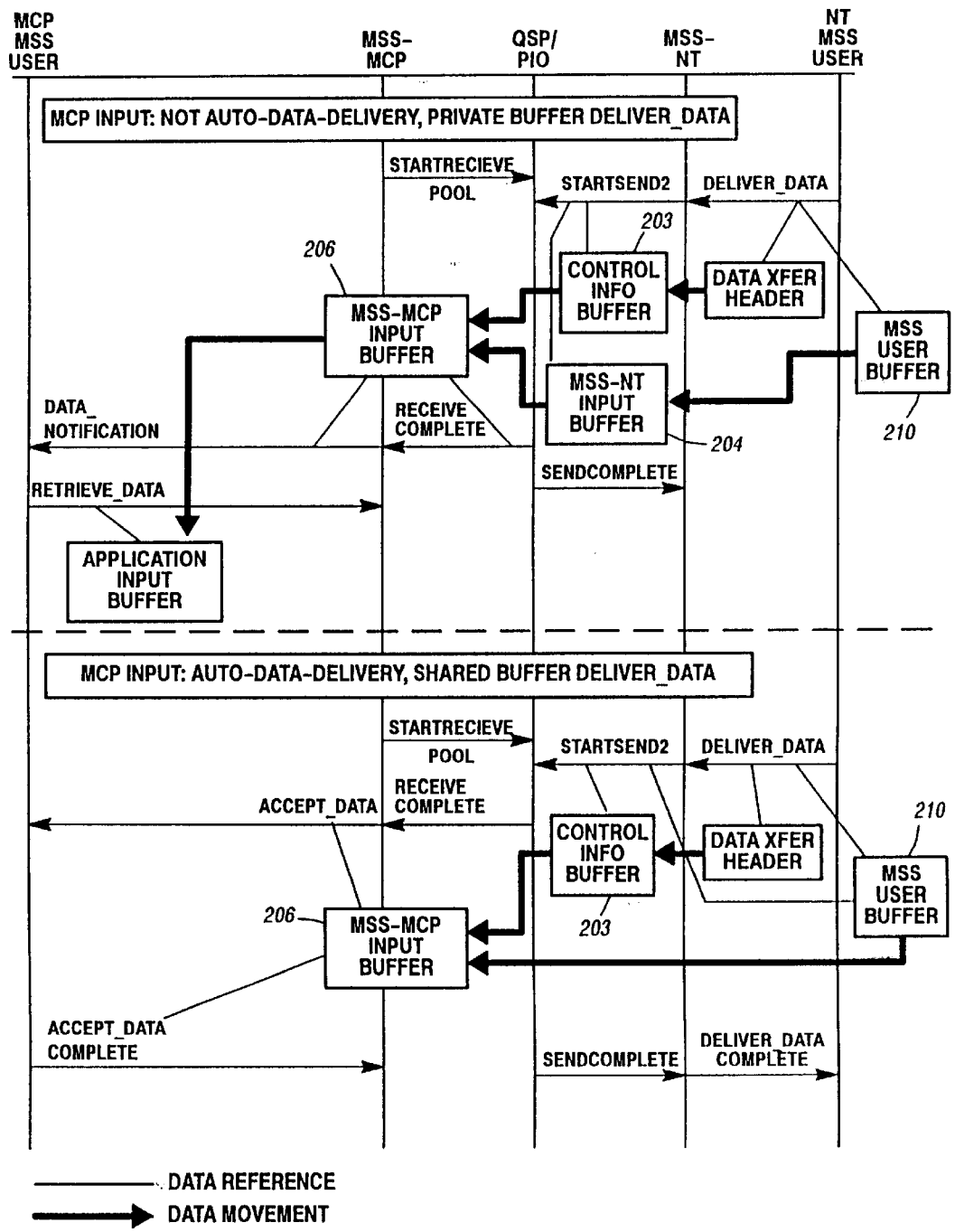
FIG. 17 illustrates MCP input data transfer flow using DTCM in a CIA interconnect embodiment.

MCP input in this environment is summarized in FIG. 17. As illustrated, under normal conditions, the MCP MSS 92 component has outstanding CIA receive operations using a buffer pool. Upon processing a private-buffer Deliver-Data request, MSS-NT 96 copies data into an available MSS NT input buffer 204, builds a small "Control Info Buffer" 203 containing information needed by MSS to complete the operation and the Data Transfer Header, and then initiates a CIA send from the two buffer areas. MSS-NT 96 processing for a shared-buffer Deliver-Data request is similar except that the TDI-Client's output buffer is used in the CIA send request. CIA completes the corresponding send/receive requests, while MCP MSS 92 provides the DTCM-Client 90 with a Data-Notification or Accept-Data request. If the CIA receive request required multiple buffers, MCP MSS 92 issues a Data-Notification or Accept-Data request for each buffer 206, using the control information contained in the first buffer.

F. MSS Initialization, Termination, and Recovery

1. Initialization

Figure 18:
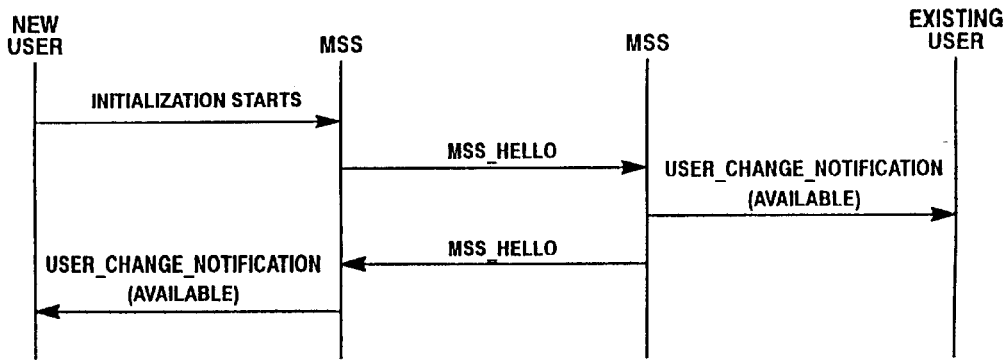
FIG. 18 illustrates MSS initialization in accordance with the invention.

As illustrated in FIG. 18, MSS initialization occurs in two steps. The first step occurs when the networking environment is started via a call to MSS_initialize( ). In the MCP environment, this is done from the TCPIPSUPPORT library upon initialization. In the NT environment this is done when the DTCM software is loaded and initialized (at NT boot time). The second step is the sending of an MSS_HELLO packet to all complementary MSSs. In the MCP environment, this occurs when the interface has become available and is started by the MCP environment. In the NT environment, the MSS waits until a MSS_HELLO is received and then responds with a corresponding MSS_HELLO packet. When the user is notified that a new user is available, its first responsibility is to greet with that new remote user.

2. Recovery

One of the benefits of the level of abstraction added by the MSS is that the MSS user does not have to worry about managing the recovery of any remote environments. The MSS handles the recovery and notifies its users of any change in the remote "user" environment. The MSS has different logic for each system interconnect, since each system interconnect provides different notifications and procedures in this area.

3. Termination

Figure 19:
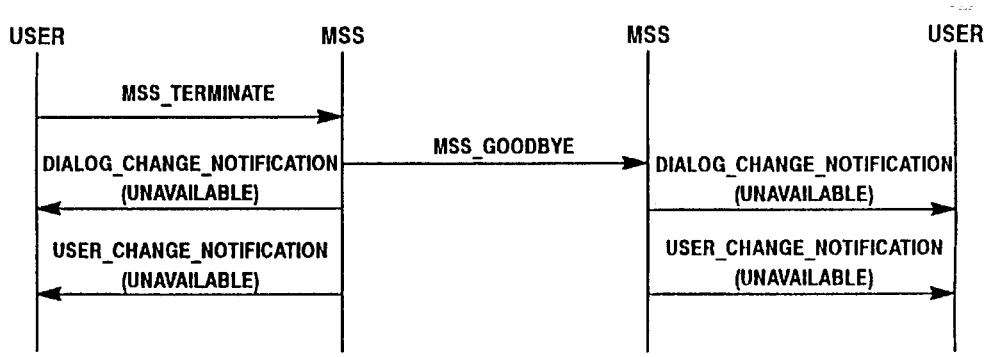
FIG. 19 illustrates MSS termination in accordance with the invention.

The MSS must terminate when the last user terminates its link with the MSS. This process does the reverse of MSS_initialize( ). As illustrated in FIG. 19, active MSS terminates activity when a dialog change notification is received for each MSS_Endpoint_Dialog terminated as a result of terminating the MSS. In the MCP environment, MSS termination is either started by the arrival of the MSS_GOODBYE message, by a call to MSS_Terminate( ), which brings down all dialogs with remote environments, or by a call to MSS_Reset_Remote_User( ). On the other hand, in the NT environment, MSS termination is started by the shutdown of networking services, which happens as a result of the shutdown of the Windows NT environment (a call to MSS_terminate( ) or a shutdown of the NX/Network Services). This does not handle abnormal terminations of the remote environment. In these cases, the local MSS may have other methods to determine that the other environment has terminated or faulted.

G. Data Transmission via MSS

The MSS provides both a bytestream and a reliable message-oriented interface for users to send information to remote environments and users. It also provides for different notification mechanisms in the receiving environment: either the MSS will notify the user that data is available to be read (a "pull" model), or the MSS will automatically call a user-defined procedure for acceptance of new data (a "push" model). This added layer of abstraction will relieve the network provider of worrying about the underlying I/O constraints and idiosyncrasies of the type present with the transport protocols. The information will be delivered to the remote environment in the correct order, but it may be fragmented across the system interconnect for performance reasons or system interconnect limitations.

Figure 20:
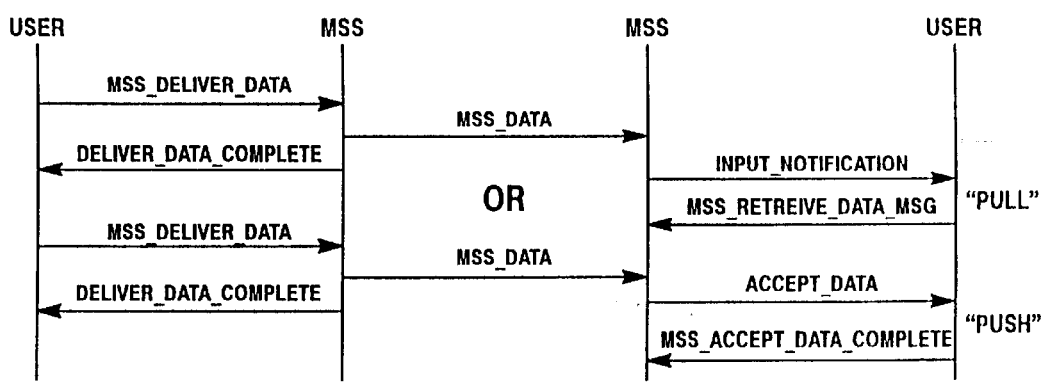
FIG. 20 illustrates MSS data transfer in accordance with the invention.

FIG. 20 shows both models of data delivery into a remote environment. The top half of FIG. 20 shows the "pull" model, in which the remote MSS user receives a notification that data is available on a MSS_Endpoint_Dialog, and the MSS user must retrieve the data from the MSS. The bottom half of FIG. 20 shows the "push" model in which the remote MSS calls a pre-defined user routine for delivery of the data to the MSS user. The remote MSS user is responsible for notifying the MSS when it is finished with the data buffer.

On non-message based dialogs, each buffer passed to MSS_Deliver_Data may be fragmented into several MSS_DATA packets for transfer over the system interconnect. This segmentation is up to the system interconnect module (HIF). The remote MSS will not reassemble the data; it is up to the MSS user to reassemble the data into one message. On the other hand, on message-based dialogs, the MSS cannot fragment the data and will return an error if the system interconnect cannot handle the size of the data message.

1. MSS Endpoint Dialogs

Figure 21:
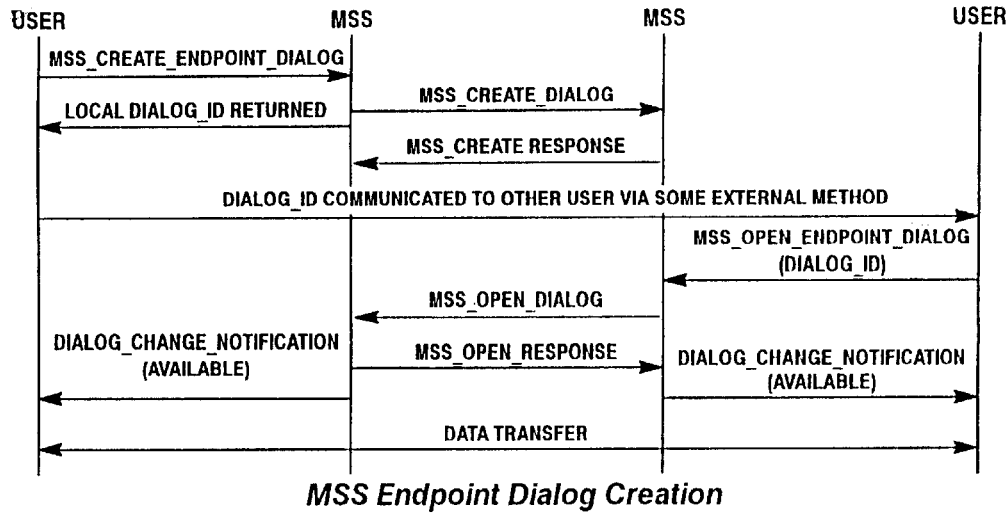
FIG. 21 illustrates the MSS Endpoint Dialog Creation process from the MSS's point of view.

MSS_Endpoint_Dialogs are created via a coordinated procedure between complementary users (one running in the MCP environment, one running in the NT environment). FIG. 21 illustrates the initiation process from the MSS's point of view. As shown in FIG. 21, user MSS_Endpoint_Dialogs are established in accordance with the following procedure:

1. A user of the MSS initiates an MSS_Create_Endpoint_Dialog call to its local MSS. The local MSS verifies the parameters, and if successful, creates an entry in the local dialog table and sends an MSS_CREATE_DIALOG packet to the remote MSS specified in the call. The newly created local dialog identifier is returned to the user.
2. The remote MSS verifies the parameters passed in the MSS_CREATE_DIALOG and, if valid, creates an entry in its local dialog table. The new dialog id is returned to the initiating MSS via an MSS_CREATE_RESPONSE packet. If there is a problem either with the parameters or the creation of the local entry, an MSS_ERROR packet is returned to the initiating MSS. This information is returned to the local user when it tries to open the dialog.
3. The newly created local dialog id is passed from the initiating user (the left line in the figure) to the remote user (the right line) via some external mechanism. One such mechanism is the MSS_Send_Control_Msg interface over the control dialog.
4. The user in the remote environment calls the MSS via MSS_Open_Endpoint_Dialog passing the dialog id it received from the initiating user. The local MSS verifies that this dialog is valid, and if no errors have occurred, sends an MSS_OPEN_DIALOG packet to the original initiating MSS (the one which performed the MSS_Create_Endpoint_Dialog). If an error had previously occurred on the dialog (or the dialog had not been created), this error is now returned to the calling user.
5. When the initiating MSS receives the MSS_OPEN_DIALOG, it opens the dialog and sends an MSS_OPEN_RESPONSE back. It notifies its local user that the dialog is now available for data via a Dialog_Change_Notification (AVAILABLE).
6. Upon receipt of the MSS_OPEN_RESPONSE, the remote MSS completes the open dialog scenario by notifying its local user via a Dialog_Change_Indication (AVAILABLE).
7. The dialog can now be used for data transfer.

Figure 22:
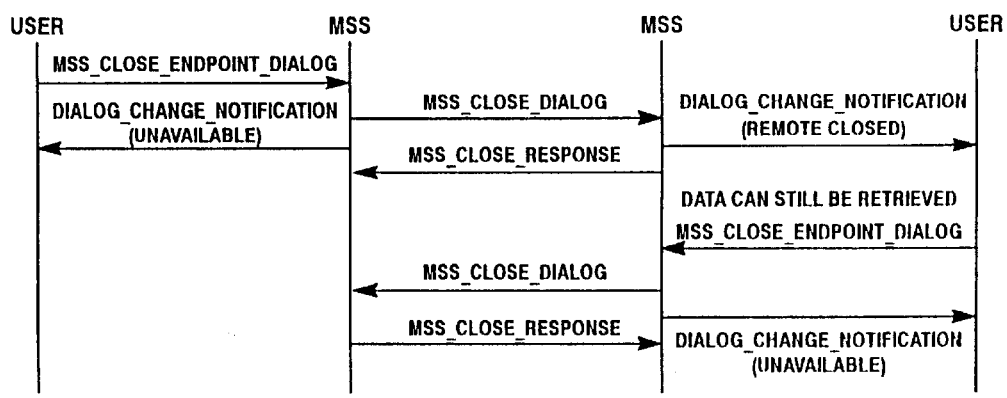
FIG. 22 illustrates the MSS Endpoint Dialog. Termination process for a normal close from the MSS's point of view.
Figure 23:
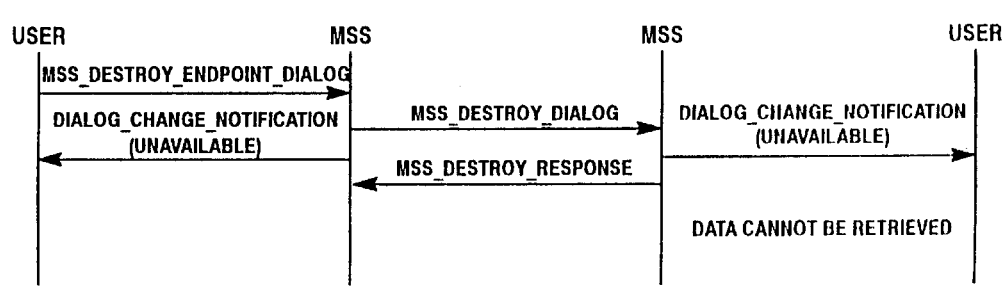
FIG. 23 illustrates the MSS Endpoint Dialog Termination process for a destructive close from the MSS's point of view.

MSS data dialogs are terminated via a coordinated procedure between complementary users. They may also be terminated as a result of an environment failure. FIG. 23 illustrates the termination process from the MSS's point of view. As illustrated in FIG. 22, the normal closing of an MSS_Endpoint_Dialog proceeds as follows:

1. A MSS user calls MSS_Close_Endpoint_Dialog for a certain MSS_Endpoint_Dialog. The local MSS creates an MSS_CLOSE_DIALOG packet to send to the remote MSS. The local MSS also notifies the local user that the dialog is now unavailable (through a Dialog_Change_Notification).
2. The remote MSS receives the MSS_CLOSE_DIALOG and notifies its local user that the remote user has closed the dialog via a call to Dialog_Change_Notification (REMOTE_CLOSED). Any data waiting to be read on the dialog is still available for the local user to retrieve. The local user, however, cannot send any more data on this dialog. The local MSS sends the MSS_CLOSE_RESPONSE packet to signify that it has processed the close packet.
3. At some later time, the local user calls MSS_Close_Endpoint_Dialog (any outstanding data which has not been read is discarded). The local MSS generates an MSS_CLOSE_DIALOG and sends it to the remote MSS (who responds). The local MSS also generates a Dialog_Change_Notification (UNAVAILABLE) to the local MSS.

An MSS_Endpoint_Dialog can also be destroyed by one of the users. FIG. 23 describes the abortive termination process, including the steps of:

1. An MSS user calls MSS_Destroy_Endpoint_Dialog. The local MSS discards any data waiting on the dialog and sends an MSS_DESTROY_DIALOG packet to the remote MSS. It also notifies the local user that the dialog is no longer available (via Dialog_Change_Notification (UNAVAILABLE).
2. The remote MSS receives the MSS_DESTROY_DIALOG packet and notifies its local user that the dialog is no longer available (via Dialog_Change_Notification (UNAVAILABLE), and discards any unread data). This is an implicit close on this side.

2. MSS Control Dialogs

The MSS also provides a path to the remote environments for delivery of control messages between complementary users. An MSS user may wish to send control messages over this control path (control dialog), or over any other MSS dialog. This path is similar to the data path described above, but certain dialog options are preset (data is automatically delivered to the user, the dialog is message oriented, and the destination MSS must copy this message to another buffer for presentation to the user).

H. MSS Data Structure

All variables which are declared in the MSS are global to all system interconnects, and therefore, the MSS does not have any internal data. The MSS communicates with other instances of the MSS executing in remote environments through exchange of MSS packets. These packets are used to transfer both control and user data between MSS environments as well as to transfer MSS control information. They consist of the MSS command header followed directly by the header and actual data. Each transfer between two MSSs contains at least the command portion.

```
struct mss_packet {
            MSSMSGPTR       p_msg_ptr;
            U16             p_version;
            U16             p_command;
            U32             p_seq_num;
            mss_dialog_id p_src_dialogid;
            mss_dialog_id p_dst_dialogid;
            char            *p_cmd_ptr;
            U16             p_cmd_len;
            U16             p_hdr_len;
            U32             p_data_len;
            U16             p_flags;
            U32             p_local_endpoint;
}MSSPACKET,*MSSPACKETPTR;
```

The fields are as follows:
  p_version: The version of the MSS interface.
  p_command: The MSS command.
  p_seq_num: The sequence number of this packet. This is unique between each pair of MSSs, starts at the number specified in the MSS_HELLO packet and is incremented by one for every packet sent.

p_src_dialogid: The source MSS dialog id for this packet.

p_dst_dialogid: The destination MSS dialog id for this packet.

The destination system interconnect address is in the system interconnect header which is present on the packet when received in the destination environment.

p_cmd_ptr A pointer to any command parameters present in this packet.

p_cmd_len Length of the MSS command parameter information present in this MSS packet.

p_hdr_len: Length of the user header information present in this MSS packet.

p_data_len: Length of the user data information present in this MSS packet.

p_flags: Bit information about the packet which contains packet-specific information (such as MESSAGE_ORIENTED).

p_local_endpoint: The local endpoint in the system interconnect address and is useful indistributing data. This field is only valid on MSS_DATA and MSS_CONTROL_DATA messages.

p_msg_ptr: Pointer to the actual data.

The data portion of these packets are kept as messages. The MSS_MESSAGE and data block structures have the following format:

```
struct mss_message {
        U16             m_hsize;        /* header size */
        boolean         m_hdrndata;     /* TRUE if hdr/data share
                                           the 1st buffer */
        U32             m_dsize;        /* total data size */
        char            *m_hptr;        /* pointer to header */
        MSSDBLKPTR      *m_dptr;        /* pointer to data */
        MSSMSGPTR       *m_next;        /* pointer to next msg */
} MSSMESSAGE, *MSSMSGPTR;
struct mss_data_block {
        U32             d_blksize;      /* total size of block */
        char            *d_blkptr;      /* ptr to start of data*/
        U32             d_sizeleft;     /* size of unread data */
        char            *d_ptr;         /* ptr to unread data */
        BOOLEAN         d_shared;       /* is buffer shared with
                                           user? */
        MSSDBLKPTR      *d_next         /* ptr to next dblk */
} MSSDBLK, *MSSDBLKPTR;
```

Some environments may enforce the restriction that each message has only one data block (this is especially true for outbound data). On inbound data, however, the MSS may have to segment the message into one or more data blocks because of a system-interconnect restriction.

I. MSS Command Set

The commands and packet structures which are used by the MSS to communicate and transfer data with other MSSs (operating in different environments) will now be described. Each command will only describe the fields of the MSS packet which it sets. All other fields are to be initialized to zero. Sequence numbers in the packets are the next valid sequence number, except for the MSS_HELLO command. In all cases, p_src_dialogid is set to the sending endpoint of the MSS and p_dst_dialogid is the destination dialog id.

In commands (e.g., MSS_CREATE_DIALOG), the local parameters (prefixed by local_) refer to the local environment (the environment in which the command was issued). The remote parameters (prefixed by remote_) refer to the remote environment (the corresponding environment for the dialog creation). In responses, the reverse is true. The local parameters refer to the remote environment (the environment from which the create was issued), and the remote parameters refer to the local environment (the environment creating the response). For example, when all responses are generated, the MSS fills in the remote attributes, not the local.

MSS_HELLO is used by the local MSS to greet with all remote MSSs when the local MSS finishes initialization. This passes local information about this environment's MSS to the remote environment. The remote MSSs respond with an MSS_HELLO packet with their information.

p_version=highest level this MSS supports.

p_command=MSS_HELLO;

p_seq_num=starting sequence number, usually 1.

p_cmd_len=sizeof (mss_hello_params)

```
struct mss_hello_params {
        mss_endpoint_id         local_ctl_address;
        U16                     version;
        mss_environment_type    environment;
        mss_user_type           user_type;
        mss_user_instance_type  user_instance;
};
```

The endpoints passed in this command specify the system interconnect addresses for the remote MSS to use for communication with this instance of the MSS. In the interconnect implementation of FIG. 6, for example, these correspond to the RQR (Remote Queue References) used in the QSP header. These are usually exchanged on a stub's initialization with its corresponding host process. When each remote environment's MSS_HELLO response is received, this causes a USER_DIALOG_NOTIFICATION to be sent to each user of the MSS signifying that this remote environment is now ready for use.

MSS_GOODBYE is used by the local MSS to inform all remote MSSs that it is terminating. The remote environment does not respond to this command. When the remote environment receives the MSS_GOODBYE command, all MSS_Endpoint_Dialogs with this remote environment are destroyed (the user is notified through a DIALOG_CHANGE_NOTIFICATION) and then the control dialog is destroyed. This causes a USER_CHANGE_NOTIFICATION to be sent to each user of the MSS signifying that this environment is no longer active.

MSS_CREATE_DIALOG is used to communicate the local create parameters (from MSS_Create_Endpoint_Dialog) to the remote MSS. The parameters are transferred through the use of the structure MSS_create_params.

p_command=MSS_CREATE_DIALOG;

p_cmd_len=sizeof (MSS_create_params);

```
struct mss_create_params {
        mss_dialog_id   local_dialog_id;
        mss_options     options;
        mss_endpoint_id local_address;
};
```

When the remote environment receives this command it creates a dialog endpoint based on the parameters passed and to the environment associated with the control dialog (ctl_dialog_id) from which it was received. The local_address is the system interconnect dependent address to be used for this dialog. If successful, it returns information about the newly created endpoint in the MSS_CREATE_RESPONSE. If not successful, it returns an MSS_ERROR.

MSS_CREATE_RESPONSE is used to respond to the MSS_CREATE_DIALOG primitive. It signifies that the endpoint was created successfully. This information is stored in the local dialog table.

p_command=MSS_CREATE_RESPONSE;
    p_cmd_len=sizeof (MSS_create_rsp_params);

```
struct mss_create_rsp_params {
        mss_dialog_id    local_dialog_id;
        mss_dialog_id    remote_dialog_id;
        mss_endpoint_id  remote_address;
};
```

In the response, remote_dialog_id is the newly created endpoint in the remote environment. Remote_address is the system interconnect dependent address used to communicate with the remote environment.

MSS_OPEN_DIALOG is used to open a previously created endpoint (the endpoint was created in the remote environment and the dialog id was passed by some other means, such as the control dialog, into this environment).

p_command=MSS_OPEN_DIALOG;
    p_cmd_len=sizeof (mss_dialog_pair);

```
struct mss_dialog_pair {
        mss_dialog_id    local_dialog_id;
        mss_dialog_id    remote_dialog_id;
};
```

When the remote environment receives this command it opens the dialog. If successful, it returns an MSS_OPEN_RESPONSE; if there was an error, it returns MSS_ERROR.

MSS_OPEN_RESPONSE is used to respond to the MSS_OPEN_DIALOG command. It returns the status of the open.

p_command=MSS_OPEN_RESPONSE;
    p_cmd_len=sizeof (mss_dialog_pair);

MSS_CLOSE_DIALOG is used to close a dialog (as a result of a user calling MSS_Close_Endpoint_Dialog). If successful, it returns an MSS_CLOSE_RESPONSE; if there was an error, it returns MSS_ERROR.

p_command=MSS_CLOSE_DIALOG;
    p_cmd_len=sizeof (mss_dialog_pair);

MSS_CLOSE_RESPONSE is used to respond to the MSS_CLOSE_DIALOG command. It returns the status of the close.

p_command=MSS_CLOSE_RESPONSE
    p_cmd_len=sizeof (mss_dialog_pair);

MSS_DESTROY_DIALOG is used to close a dialog and destroy the data (as a result of a user calling MSS_Destroy_Endpoint_Dialog). If successful, it returns an MSS_DESTROY_RESPONSE; if there was an error, it returns MSS_ERROR.

p_command=MSS_DESTROY_DIALOG;
    p_cmd_len=sizeof (mss_dialog_pair);

MSS_DESTROY_RESPONSE is used to respond to the MSS_DESTROY_DIALOG command. It returns the status of the destroy.

p_command=MSS_DESTROY_RESPONSE;
    p_cmd_len=sizeof (mss_dialog_pair);

MSS_ERROR is used to note an error response from one MSS environment back to the originating MSS environment. The response includes an mss_result error code along with the offending command.

p_command=MSS_ERROR;
    p_cmd_len=sizeof (mss_error_packet);
    p_hdr_len=offending_packet->p_hdr_len;
    p_data_len=offending_packet->p_data_len;

```
struct mss_error_packet {
        mss_result   error_code;
        MSS_PACKET   offending_packet;
};
```

The MSS can use this to determine which outstanding command failed and propagate the error_code back to the calling user.

MSS_DATA is used to transfer bytestream data from one MSS environment to another. The data portion of the message is user data to be queued onto the dialog id specified in the command header.

p_command=MSS_DATA;
    p_hdr_len=sizeof (user_header_data);
    p_data_len=sizeof (user_data);

The data follows the MSS_DATA packet header. Upon receipt, the MSS will queue the data to the dialog specified in the packet.

MSS_CONTROL_DATA is used to transfer control information from one MSS environment to another. It is identical to the MSS_DATA packet, except that it contains control information instead of user data. The user sends the control information as a user header.

p_command=MSS_CONTROL_DATA;
    p_hdr_len=sizeof (user_header_data);

MSS_HEARTBEAT is used to check the status of any remote environments/MSSs. Heartbeats are sent of no new message has been sent from the remote MSS in a predetermined period of time (e.g., 10 seconds). If heartbeats have not been received in a long period of time (e.g., 5 minutes), the control dialog is then marked as UNAVAILABLE and all dialogs through that control dialog are terminated. If a MSS_HEARTBEAT is received on an AVAILABLE control dialog, the remote environment/MSS is still communicating, and any inactivity time is reset. On the other hand, if a MSS_HEARTBEAT is received on an UNAVAILABLE control dialog, it is ignored.

J. MSS User Procedures

Procedures which can be called by a user of the MSS for establishing communications dialog and the like with a remote MSS are described in this section. As will be described in the next section, DTCM is a MSS user in the preferred embodiment of the invention.

MSS_Initialize is a routine which initializes the interface between the MSS and its user. It is called from a platform-specific initialization routine and is responsible for initializing all structures (table space, headers).

```
mss_result MSS_initialize (user_type, user_instance)
mss_user_type mss_user;
mss_user_instance user_instance;
```

```
{
    /*
     * First verify the parameters passed from the user.
     */
    if      (NOT valid_user_type (user_type))
            return (INVALID_USER_TYPE);
    if      instance_already_used (user_type, user_instance))
            return (INSTANCE_ALREADY_USED);
    /*
     *  Check to see if this is the first user of this
     *  environment. If so, initialize the environment.
     */
    if (mss_users == 0) {
            Allocate table space for dialog tables
            Initialize any locks used by the MSS.
            Allocate memory for MSS internal structures.
            }
    mss_users++;
    return (SUCCESS);
}
```

MSS_Terminate is a procedure which terminates the interface between the user and the MSS. This procedure will destroy all dialogs (abortive close) and notify the remote environments. The MSS_Endpoint_Dialogs are done first, followed by the control dialogs. If this is the last user of the MSS, the MSS will also terminate and deallocate any structures.

```
mss_result MSS_terminate (user_type, user_instance)
mss_user_type mss_user;
mss_user_instance user_instance;
```

```
{
    /*
    *First verify the parameters passed from the user.
    */
``` if (NOT valid_user_type (user_type))
  return (INVALID_USER_TYPE))
if (instance_already_used (user_type, user_instance))
  return(INSTANCE_ALREADY_USED);
Search MSS_Control_Dialog_Table for any control dialogs from this user and instance.
If none, capture debug information and return MSS_UNAVAILABLE.
For each control dialog,
  Search MSS_Data_Dialog_Table for any data dialogs from this control dialog. For each one found, close the data dialog by sending MSS_DESTROY_DIALOG to other side and DIALOG_NOTIFICATION (Unavailable) to local user.
  Close the control dialog by sending MSS_GOODBYE to other side and USER_NOTIFICATION (unavailable) to the local user. Endfor

```
        if ( --mss_users ==0) {
                deallocate any MSS_structures.
                Destroy any spinlocks.
                [The reverse of MSS_initialize]
        }
        return (SUCCESS);
};
```

MSS_RESET_REMOTE_USER is a procedure which terminates the interface between the user and the MSS of a remote user. If any dialogs are still not closed, this procedure will destroy all such dialogs (abortive close) and notify the remote environment. The MSS_Endpoint_Dialogs are done first, followed by the control dialog. The control dialog is then reestablished (via automatic reinitialization or from this procedure). This is equivalent to an MSS_terminate( ) and an MSS_initialize( ) for one user.

```
mss_result MSS_Reset_Remote_User( )
mss_dialog_id control_dialog_id;
```

```
{
    Validate control_dialog_id. If not valid, return
    INVALID_DIALOG_ID. If not AVAILABLE, return
    DIALOG_NOT_OPEN.
    Search MSS_Data_Dialog_Table for any data dialogs from this
    control dialog. For each one found, close the data dialog by sending
    MSS_DESTROY_DIALOG to other side and
    DIALOG_NOTIFICATION (unavailable) to local user.
    Close the control dialog by sending MSS_GOODBYE to other side
    and USER_NOTIFICATION (unavailable) to the local user.
    If the interface won't automatically reinitialize itself, start
    MSS_HELLO sequence.
    return (SUCCESS);
}
```

MSS_Create_Endpoint_Dialog is a procedure which creates an MSS_Endpoint_Dialog endpoint in the local environment and returns a dialog ID which can be used from a remote environment to open this dialog. The MSS will return the parameter local_user_reference with any operation over this dialog. The parameter message_offset specifies how much room in reserve in the beginning of each buffer. If successful, this procedure starts the process of opening an MSS_Endpoint_Dialog. The just-created MSS_Endpoint_Dialog is in the PENDING-OPEN state, and the open will be completed when the remote environment performs an MSS_Open_Endpoint_Dialog with the Dialog_ID returned. When this happens, this user will be notified through an MSS_Endpoint_Dialog change notification.

```
mss_result MSS_Create_Endpoint_Dialog( )
mss_dialog_id control_dialog_id;
user_token local_user_reference;
WORD options;
ULONG message_offset,
mss_dialog_id *pDialogID;
```

```
{
    Validate local parameters (control_dialog) and options. Return an
    appropriate error code if an error is found.
    Create data dialog from control dialog information. If data dialog
    table is full, return OUT_OF_RESOURCES. Send
```

-continued

```
MSS_CREATE_DIALOG command
over the control dialog to the other side.
Mark dialog as PENDING_OPEN.
*pDialogID = newly created dialog id.
return (SUCCESS);
}
```

MSS_Open_Endpoint_Dialog is a procedure which opens a previously created MSS_Endpoint_Dialog (from a remote environment). Local_user_reference, options, and message_offset have the same meaning as in MSS_Create_Endpoint_Dialog( ). Upon successful completion, the dialog is still PENDING_OPEN. When the other side confirms the open, an MSS_Endpoint_Dialog change notification will be sent to the user.

mss_result MSS_OPEN_ENDPOINT_DIALOG( )
mss_dialog_id remote_dialog_id;
user_token local_user_reference;
WORD options;
ULONG message_offset;
mss_dialog_id *pDialogID;

```
{
    Verify options (return UNKNOWN_OPTIONS if any found). Check
    MSS_Data_Dialog_Table for a match. If no match, return
    INVALID_DIALOG_ID. If dialog already open, return
    DIALOG_ALREADY_OPEN.
    Send MSS_OPEN_DIALOG to remote environment with dialog_id
    pair and options.
    *pDialogID = newly created dialog id.
    return (SUCCESS);
}
```

MSS_Close_Endpoint_Dialog is a procedure which starts the close of an MSS_Endpoint_Dialog. Any inbound data received from the remote environment which is still queued to the dialog is flushed. Any outbound data queued in a remote environment may still be retrieved in the remote environment (until NO_DATA_AVAILABLE is returned by MSS). The local dialog is immediately closed and all subsequent operations return with DIALOG_NOT_OPEN. The remote dialog cannot send any more data once closed and receives DIALOG_CHANGE_INDICATION with a status of REMOTE_CLOSED. Once the remote dialog closes, the data is removed.

mss_result MSS_Close_Endpoint_Dialog( )
mss_dialog_id dialog_id;

```
{
    Lookup dialog_id in local MSS_Data_Dialog_Table.
    If not found, return INVALID_DIALOG_ID.
    If not open, return DIALOG_NOT_OPEN.
    Flush local_dialog (any queued data).
    Send MSS_CLOSE_DIALOG to other environment.
    Set dialog status to CLOSED.
    return (SUCCESS);
}
```

MSS_Destroy_Endpoint_Dialog is a procedure which closes and destroys an MSS_Endpoint_Dialog. Any data queued in both environments is automatically flushed (NO_DATA_AVAILABLE is returned by MSS any subsequent data retrievals). The local dialog is immediately closed and all subsequent operations return with DIALOG_NOT_OPEN. The remote dialog receives a DIALOG_CHANGE_INDICATION with a status of CLOSED. The remote dialog cannot send any more data once closed.

mss_result MSS_Destroy_Endpoint_Dialog( )
mss_dialog_id dialog_id;

```
{
    Lookup dialog id in local MSS_Data_Dialog_Table.
    If not found, return INVALID_DIALOG_ID.
    If not open, return DIALOG_NOT_OPEN.
    Flush local and remote dialog (any waiting data).
    Send MSS-DESTROY-DIALOG to other environment.
    Set dialog status to CLOSED.
    return (SUCCESS);
}
```

MSS_Send_Control_Msg is a procedure which sends a control message from one MSS user to another MSS user across a dialog. Control messages can be sent over either a control dialog or an MSS_Endpoint_Dialog. If OUT_OF_RESOURCES is returned, this signifies that the platform is in very serious condition and is being flow controlled (control messages have priority over data messages). If MSS_UNAVAILABLE is returned, this indicates that the remote environment is no longer communicating with the system interconnect. If SUCCESS is returned, this indicates that the dialog is active and data can be sent and received over this control dialog. It also indicates that the remote user is active and MSS_Endpoint_Dialogs may be created with the remote environment.

mss_result MSS_Send_Control_Msg( )
mss_dialog_id dialog_id;
buffer_ptr message_ptr;
ULONG message_len;

```
{
    Verify dialog_id and get entry into either
    MSS_Control_Dialog_Table or MSS_Data_Dialog_Table. If
    I can't find it, return INVALID_DIALOG_ID or
    MSS_UNAVAILABLE.
    Verify that this dialog is open. If not, return DIALOG_NOT_OPEN.
    Get a buffer for the message. If I can't, return
    OUT_OF_RESOURCES.
    Copy message into local buffer.
    Send MSS_CONTROL_DATA message to remote environment via
    system interconnect specific routine which returns retval.
    return (retval);
}
```

MSS_Deliver_Data is a procedure which sends a data message over an MSS_Endpoint_Dialog. If the option SHARED_BUFFER is set, this buffer becomes property of the MSS until delivery is complete. Otherwise (private), the MSS must copy the buffer into an MSS-allocated buffer for the transfer. This option is only for the data portion of the data, the header is always copied into an MSS control buffer for the transfer to the remote environment. The options passed to MSS_Deliver_Data have precedence over the options specified at dialog creation.

If OUT_OF_RESOURCES is returned to the caller, this is an implicit NOT_READY on this dialog. A DIALOG_CHANGE_INDICATION will be sent on this dialog when the dialog subsequently becomes available. In this case, this message has not been sent to the remote user. When complete, the MSS will signify this by either returning ALREADY_COMPLETED or by calling Deliver_Data_Complete( ) at some later time.

mss_result MSS_Deliver_Data( )
    mss_dialog_id dialog_id;
    user_token user_local_reference;
    buffer_ptr message_ptr;
    buffer_id message_bid;
    ULONG message_len;
    buffer_ptr header_ptr;
    USHORT header_len;
    WORD options;

{
    Validate dialog_id to make sure that it is a valid dialog id and it is OPEN. If
    not found, return INVALID_DIALOG_ID. If not OPEN,
    return DIALOG_NOT_OPEN.
    Check options. Set local options between deliver options and dialog options.
    If options are invalid, return INVALID_BUFFER_OPTION.
    If shared, check buffer id. If not valid, return INVALID_BUFFER_ID.
    If private then
        Allocate buffer for MSS_Input_Size + Header_len + message_len; if
        no buffer, return OUT_OF_RESOURCES.
        Copy header and data into buffer.
        buffer1 = new buffer id; buffer2 = NULL;
        d_shared = FALSE;
    else /* shared */
        Allocate buffer for MSS_Input_Size + Header_len; if no buffer, return
        OUT_OF_RESOURCES.
        Copy header into buffer.
        buffer1 = new buffer id ; buffer2 = message_bid;
        d_shared = TRUE;
    Build MSS_Data header in buffer1;
    put message on in_progress list of dialog
    send (buffer1, buffer2) [via HIF]
    Return send result to caller (either SUCCESS or ALREADY_COMPLETED).
}

MSS_Retrieve_Data_Msg is a procedure which is called by a user to retrieve a message from MSS. There is only a private version of this command (the data is copied into the user's buffer). Upon return, the MSS returns the length of the data copied to the user's pointer. The pointer is set to the beginning of the data (left unchanged). If MESSAGE_ORIENTED is set and all of the data of the message at the head of the queue could not be transferred into the user's buffer, the data is truncated and MESSAGE_TRUNCATED is returned. If MSS_Header_Length=0, then this procedure will only copy the data, and the header will be discarded. If Max_Data_Length=0, then this procedure will only copy the header, and the data will be kept for a subsequent call. Message_Offset (from the Create/Open of this dialog), does not apply because the user is passing a pointer to the place in a buffer where it wants the data to be copied. It is assumed that the user has already adjusted this pointer for message_offset.

mss_result MSS_Retrieve_Data_Msg( )
    mss_dialog_id dialog_id;
    user_token user_local_reference;
    buffer_ptr message_ptr;
    ULONG message_maxlen;
    buffer_ptr header_ptr;
    USHORT header_maxlen;
    ULONG *data_length;
    USHORT *header_length;
    boolean *end_of_message;

{
    Validate dialog id and make sure that it is valid and OPEN.
    If not, return INVALID_DIALOG_ID or DIALOG_NOT_OPEN.
    If no data is available on this dialog id, return
    NO_DATA_AVAILABLE.

-continued

If the dialog is message_oriented begin
        dequeue first message off of data awaiting on
        data dialog.
        if(header_maxlen != 0) && (m_hptr != NULL)
            copy min(header_maxlen, m_hsize) of header to user's
            header_ptr.
            *header_length = amount copied.
        endif
        if (data_maxlen != 0) && (m_dptr != NULL)
            copy min(message_maxlen, m_dsize) of data
            to user's message_ptr.
            if message_length > message_maxlen, retval
            = MESSAGE_TRUNCATED.
            *data_length = amount copied.
        endif
        end_of_message = TRUE;
        release message.
    Else /* not message oriented */
        peek at first message on data dialog queue.
        assume end_of_message = FALSE;
        if(header_maxlen != 0) && (m_hptr != NULL)
            copy min(header_maxlen, m_hsize) of
            header to user's header_ptr.
            *header_length = amount copied.
        endif

```
-continued
        throw away header if non-null.
        if(data_maxlen != 0) && (m_dptr != NULL)
            copy min (data_maxlen, m_dsize) of data
            to user's message pointer.
            *data_length = amount copied.
            if *data_length == m_dsize then
            release message.
                end_of_message = TRUE;
            endif
        endif
    endif
}
```

MSS_Receive_Message is a routine which is called by a system interconnect dependent module when an MSS packet which has successfully arrived from the system interconnect. The MSS packet is to be delivered to an MSS user. The system interconnect has already transformed the I/O buffer into the MSS_MESSAGE structure described above.

The MSS packet becomes owned by the MSS. This routine may also change the structure of the message depending on content [break out header from data].

mss_result MSS_Receive_Message( )
    MSSMSGPTR *m_ptr;
    mss_dialog m_dialog_id;
    mss_bufferid m_buffer_id;
    ULONG *user_return_value;

```
{
    if dialog_id = my_control_endpoint then
        MSS_control_msg_handler(m_ptr, user_return_value);
        return (ALREADY_COMPLETED);
    Lookup dialog_id in control and data dialog table. If not found,
    return INVALID_DIALOG_ID (the system interconnect will log
    this).
    If MSS_CONTROL_DATA then
        allocate buffer for message and copy into it.
        retval = Receive_Control_Msg (m_dialog_id,
            table->user_reference, &buffer, m_ptr->h_size
            + m_ptr->d_size, &user_return_value);
        if retval != SUCCESS or ALREADY_COMPLETED check
        retval.
        return (retval);
    else if MSS_DATA then
        If auto-data-delivery is set then
            retval = Accept_Data (m_dialog_id,
                table->user_reference, m_ptr->d_ptr,
                m_buffer_id, m_ptr->d_size,
                m_ptr->h_ptr, m_ptr->h_size,
                user_return_value);
            if retval != SUCCESS or ALREADY_COMPLETED
            check retval.
        else
            queue data to the end of data_ptr queue on that dialog.
            retval = Data_Notification (m_dialog_id,
                table->user_reference, m_ptr->d_size,
                m_ptr->h_ptr, m_ptr->h_size,
                user_return_value);
            if retval != SUCCESS or ALREADY_COMPLETED
            check retval.
    else if MSS_ERROR then
        log error and decode error packet.
    else
        log error about unknown packet received.
    return (retval);
}
```

MSS_Accept_Data_Complete is a procedure which is called by the MSS user to acknowledge that it has finished processing the data successfully. Ownership of the buffer is returned to the MSS. The buffer is always returned.

mss_result MSS_Accep_Data_Complete( )
    mss_dialog_id dialog_id;
    mss_buffer_id buffer_bid;
    user_token user_local_reference;
        Verify that the dialog is a data dialog. If not, release the buffer anyway and return INVALID_DIALOG_ID.
        Check to see if the buffer_bid is on the dialog's data queue. If not, release the buffer and return INVALID_BUFFER_ID.
        Remove the buffer from the dialog's data queue and release the buffer. return (SUCCESS);

MSS_Event_Handler is a routine which is called by a system interconnect dependent module to inform the MSS that an event has occurred in the system environment.

mss_result MSS_Event_Handler( )
    mss_event_type what_happened;
    INTEGER path_index;

```
{
    switch (what happened) {
    MSS_AVAILABLE:
        /* A new control dialog has come up */
        Allocate entry in control dialog table and
        fill in. /*This creates control/data endpoints
        for this environment.*/
        Send MSS_HELLO across system interconnect, if appropriate.
    MSS_UNAVAILABLE:
        /* A local control dialog is going away.*/
        Take path_index, lookup in control for
        environment.
        Destroy data dialogs and inform users.
        Destroy control dialog and inform user.
    }
}
```

MSS_Control_Msg_Handler is a routine which is called by MSS_Receive_Message( ) to handle any MSS to MSS control information such as dialog management and flow control primitives.

mss_result MSS_Control_Msg_handler( )
    MSSPACKETPTR *p_ptr;
    ULONG *user_return_value;
    {
        mss_result errorcode;
        switch (p_ptr->p_command) {
        MSS_HELLO:
            take dialog_id out of command, and index into MSS_CTL_Dialog_Table.
            If entry is not valid, create entry and make available (& notify users via USER_CHANGE_NOTIFICATION).
            If entry is valid, and it was unavailable, make it available (& notify users via USER_CHANGE_NOTIFICATION).
            If entry is valid and available, do nothing.
            If I made it available, send MSS_HELLO back with my endpoint ids.
        MSS_GOODBYE:
            retrieve dialog_id out of command, and check MSS_CTL_Dialog_Table for a match.
            If no match, log an error.
            If a match and available, kill all data dialogs with this environment and notify users (via DIALOG_CHANGE_NOTIFICATION)

if a match and available, mark unavailable and notify users (via USER_CHANGE_NOTIFICATION).
If a match and unavailable, ignore (already there).
MSS_CREATE_DIALOG:
  Create entry in MSS_Data_Dialog_Table and fill in from control dialog endpoint specified in command.
  If I can't create, return OUT_OF_RESOURCES in MSS_ERROR.
  Return newly created dialog id in MSS_CREATE_RESPONSE response packet.
MSS_CREATE_RESPONSE:
  Lookup entry in MSS_Data_Dialog_Table. If not found, return MSS_ERROR with INVALID_DIALOG_ID.
  Fill in remote dialog id and remote address from response.
MSS_OPEN_DIALOG:
  Lookup entry in MSS_Data_Dialog_Table and verify both the addresses in the dialog pair. If I find a match, then return MSS_OPEN_RESPONSE, issue dialog_change_indication to user, and mark dialog_status as open.
  Otherwise, return MSS_ERROR with INVALID_DIALOG_ID.
MSS_OPEN_RESPONSE:
  Lookup entry in MSS_Data_Dialog_Table a If not found, return INVALID_DIALOG_ID.
  Mark local dialog id as OPEN.
  dialog_change_indication (m_dialog_id, table->user_reference, dialog->status, user_return_value);
MSS_CLOSE_DIALOG:
MSS_DESTROY_DIALOG:
  Lookup dialog id in MSS_Data_Dialog_Table. If not found, send back MSS_ERROR with errorcode=INVALID_DIALOG_ID.
  If not open, MSS_ERROR errorcode=DIALOG_NOT_OPEN.
  IF close,
    Mark dialog as REMOTE_CLOSED.
  IF destroy,
    Throw away in_progress list.
    Throw away any pending data.
    Mark dialog as CLOSED.
  dialog_change_indication (m_dialog_id, table->user_reference, dialog->status, user_return_value);
MSS_CLOSE_RESPONSE:
MSS_DESTROY_RESPONSE:
  Lookup dialog id in MSS_Data_Dialog_Table, if not found, return MSS_ERROR with INVALID_DIALOG_ID.
  Remove entry from table.
MSS_ERROR:
  Log error from offending command in a environment specific manner.
  Check offending command and handle (e.g.)
  if on a CREATE, deallocate entry from table.
  if on an OPEN, set dialog state to ERROR.
}
return (errorcode);

K. MSS Dialog Establishment

As noted above, the MSS uses an interface over the QSP-based CNP platform, the emulated interface, or the CIA interface described in the afore-mentioned related applications. The NT MSS interface is a driver loaded on the NT server 102 which is responsible for any NT-specific functionality needed to implement the MSS in the NT environment. This is represented in FIGS. 6–8. Generally, the MSS-NT interface has to define all the structures needed to communicate with the CNP QSP 76 and to LDM 82. It performs the complementary actions to the MCP MSS interface described above.

Figure 24A:
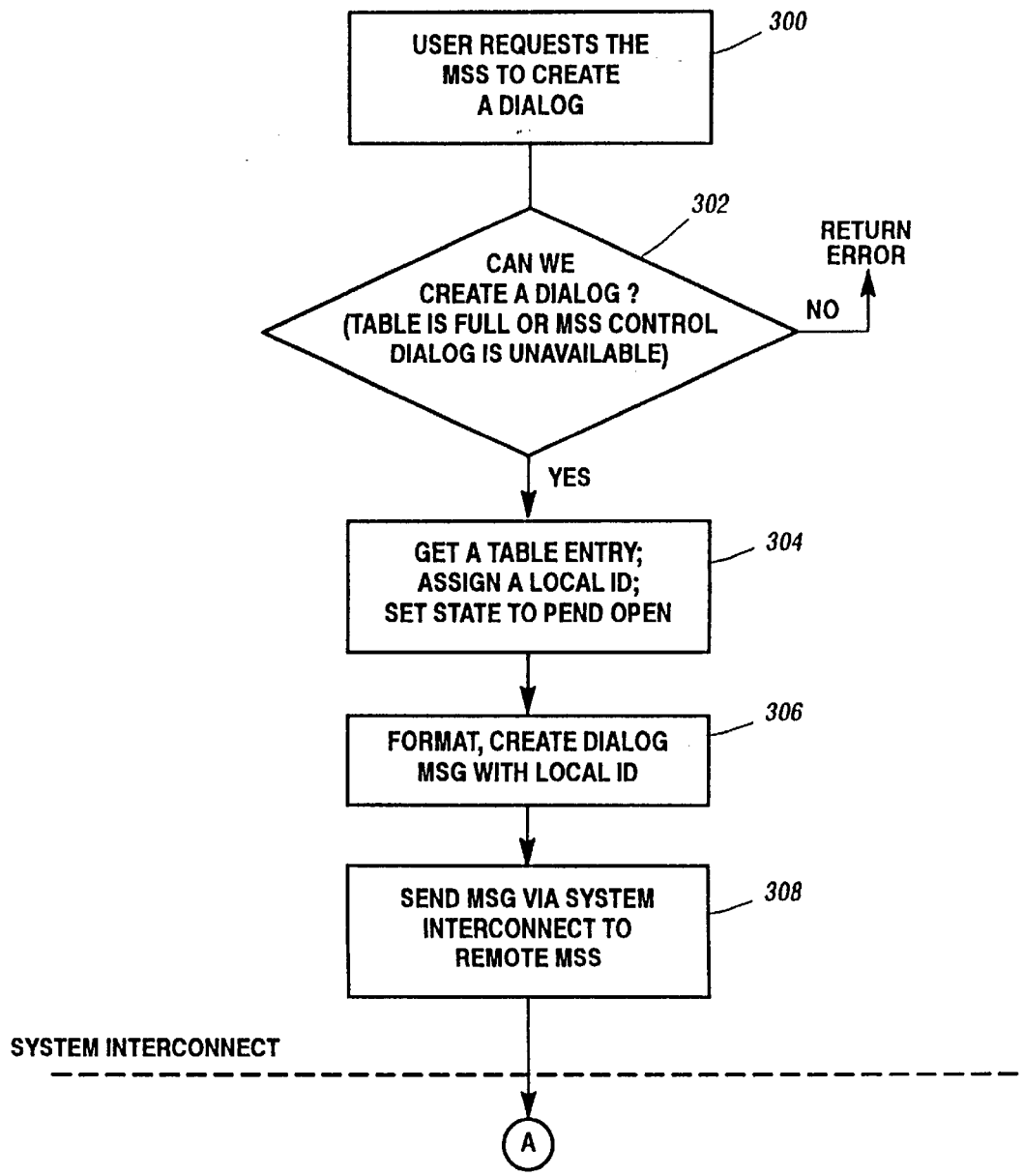
FIGS. 24(a)–24(f) illustrate MSS dialog establishment in accordance with the invention.

FIGS. 24(a)–24(f) illustrate MSS dialog establishment in accordance with the invention. As illustrated in FIG. 24(a), the user's application requests that a dialog be created. At step 300, the MSS user passes this request to the MSS to create a dialog. At step 302, it is determined whether a dialog may be created, which requires an entry in the dialog table and availability of the MSS control dialog. If it is determined at step 302 that a dialog cannot be created, an MSS_ERROR message is returned. However, if a dialog can be created at step 302, the dialog table entry is obtained, a local ID is assigned, and the dialog state is set to PENDING_OPEN at step 304. Next, at step 306, the MSS_CREATE_DIALOG message is formatted with the local ID, and the resulting message is sent to the remote MSS via the system interconnect at step 308.

Figure 24B:
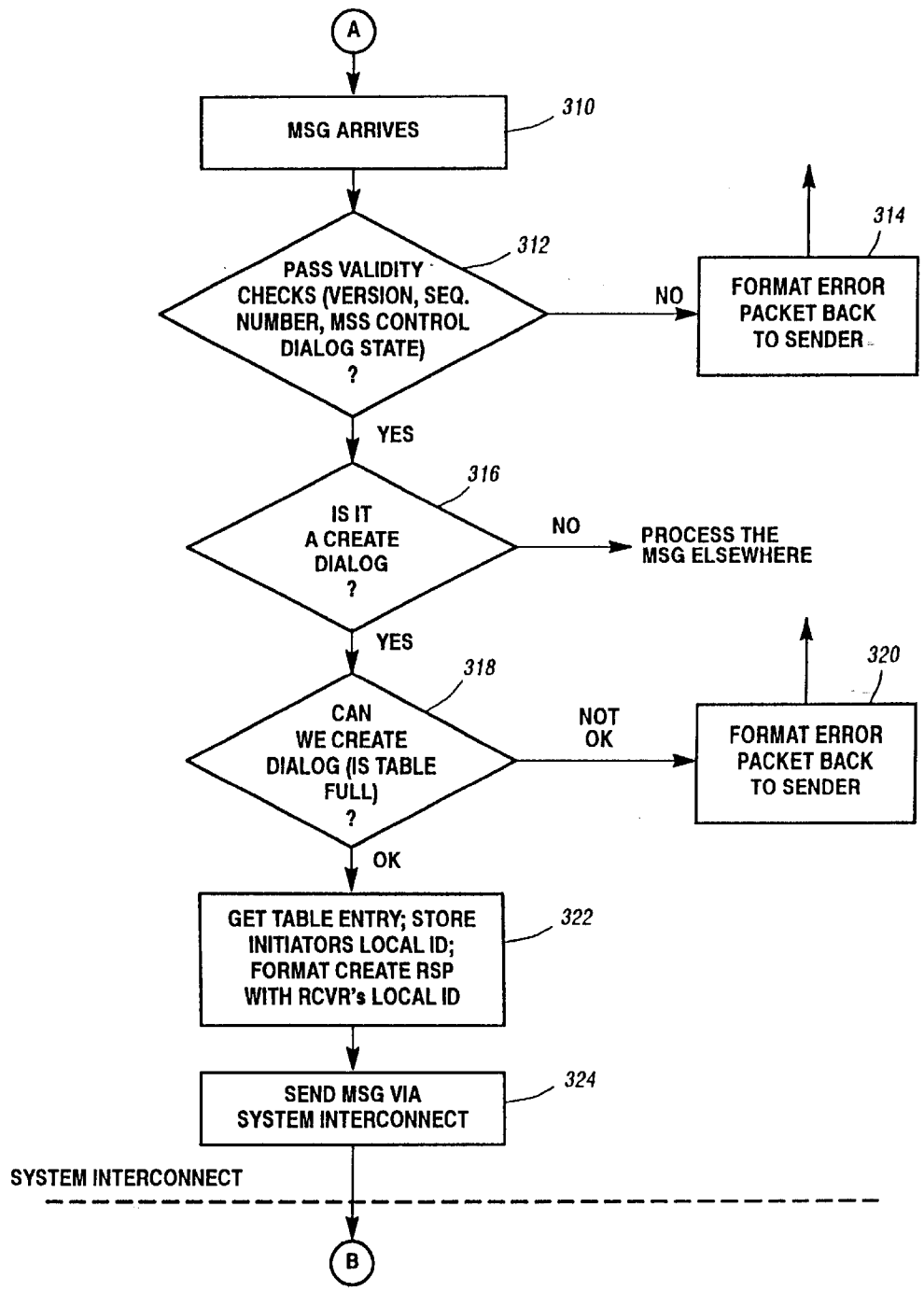

As illustrated in FIG. 24(b), when the dialog message arrives at the remote MSS, at step 310, its validity is checked at step 312. If the dialog message does not pass the reliability checks at step 312, a MSS_ERROR packet is returned to the sender at step 314. However, if the dialog message is reliable, it is determined at step 316 whether the dialog message includes a MSS_CREATE_DIALOG request. If not, the dialog message is processed elsewhere. However, if the dialog message is a MSS_CREATE_DIALOG request, then the local dialog table is checked at step 318 to determine whether a dialog may be created between the MCP MSS 92 and the MSS-NT 96. If not, a MSS_ERROR packet is returned to the sender at step 320. Otherwise, the MSS gets the dialog table entry, stores the initiator's local ID (from the dialog message), and formats a response message with the receiving system's local ID at step 322. The response message is then returned to the initiating system via the interconnect at step 324.

Figure 24C:
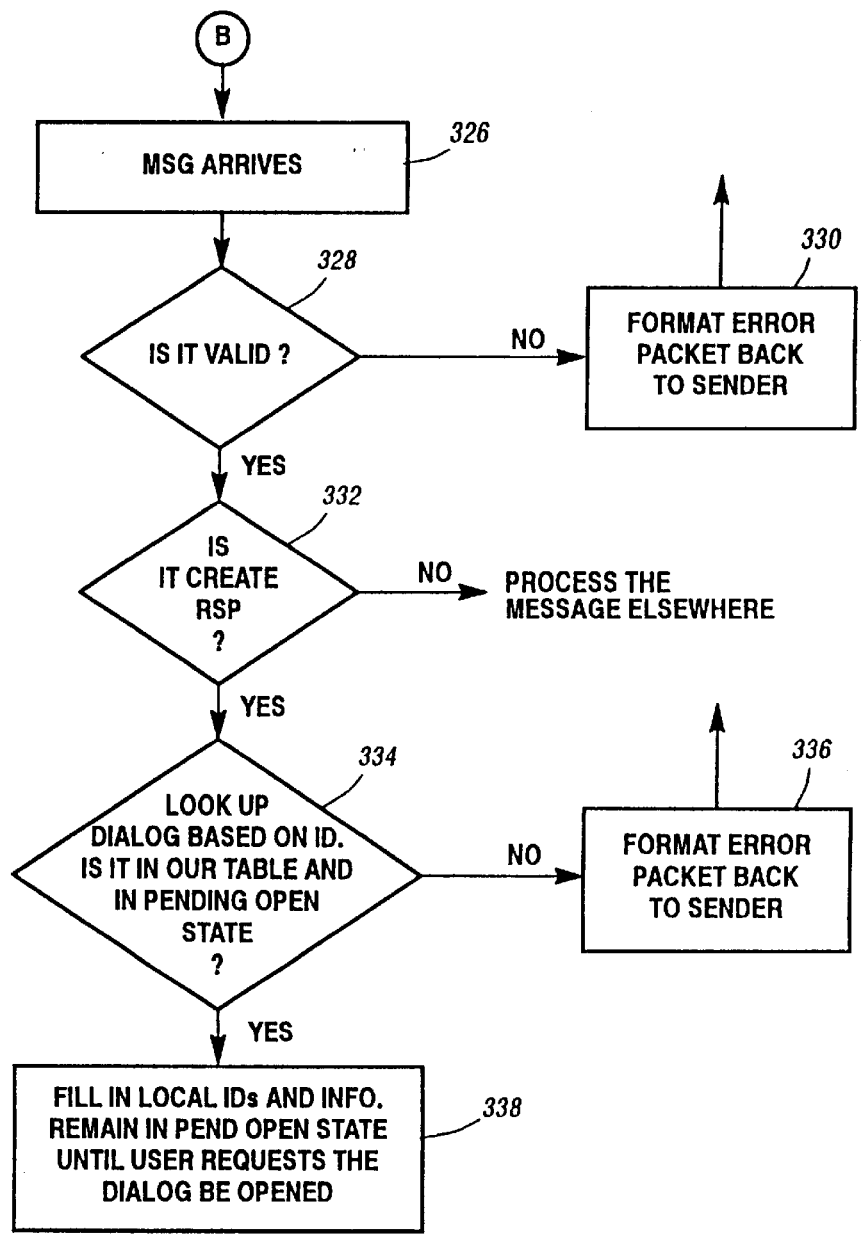

As illustrated in FIG. 24(c), the response message arrives at step 326, and its validity is evaluated at step 328. If the response message is invalid, a MSS_ERROR packet is returned to the sender at step 330. If the response message is valid, it is determined at step 332 whether the response message is a MSS_CREATE_RESPONSE message. If not, the message is processed elsewhere; if so, the dialog is looked up at step 334 based on the return ID to determine if the requested dialog is available and in a PENDING_OPEN state. If the dialog is unavailable or not in a good state, a MSS_ERROR packet is returned to the sender at step 336. Otherwise, the local IDs and information are provided to the dialog, and the MSS remains in the PENDING_OPEN state at step 338 until the MSS user requests at step 340 (FIG. 24(d)) that the dialog be opened.

Figure 24D:
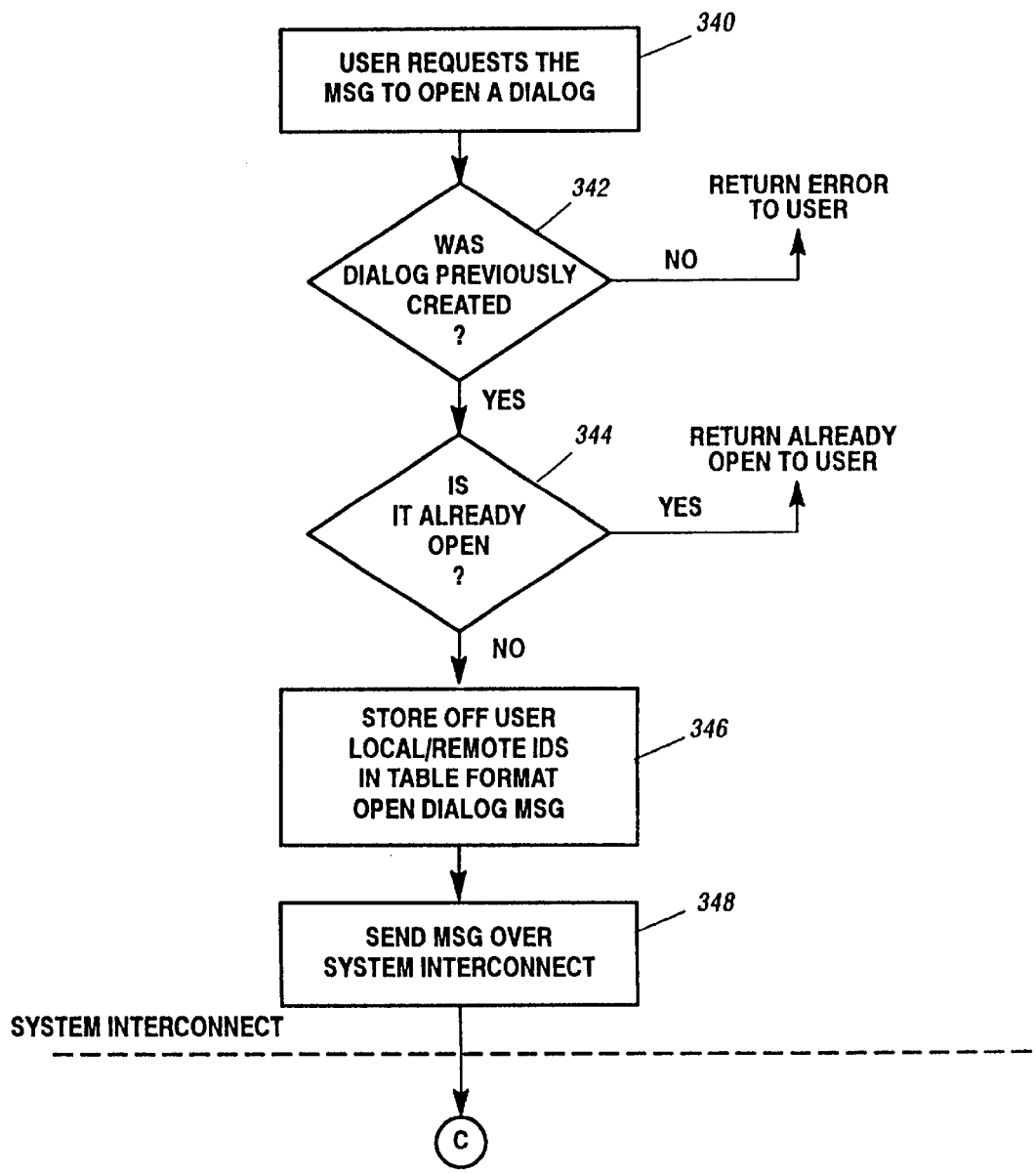

As illustrated in FIG. 24(d), when the MSS user requests to open a dialog at step 340, it is determined at step 342 whether the dialog in the message has previously been created. If not, an error code is returned. Otherwise, it is determined at step 344 whether the dialog has already been opened. If so, an error code is returned to the MSS user indicating that the requested dialog is already open. Otherwise, the local and remote IDs in the dialog table are stored and the MSS_OPEN_DIALOG message is formatted at step 346 and sent over the interconnect at step 348.

Figure 24E:
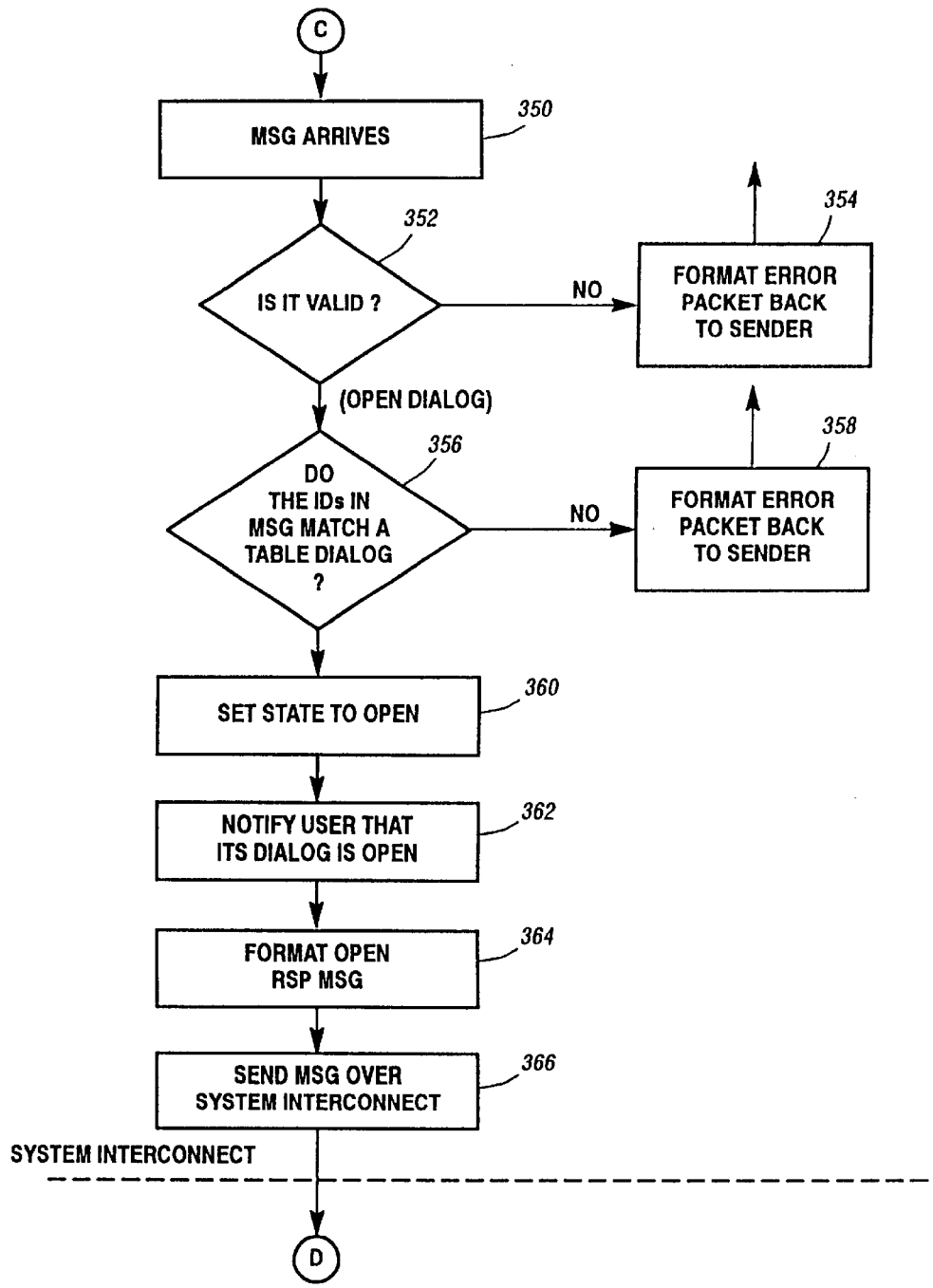
Figure 24F:
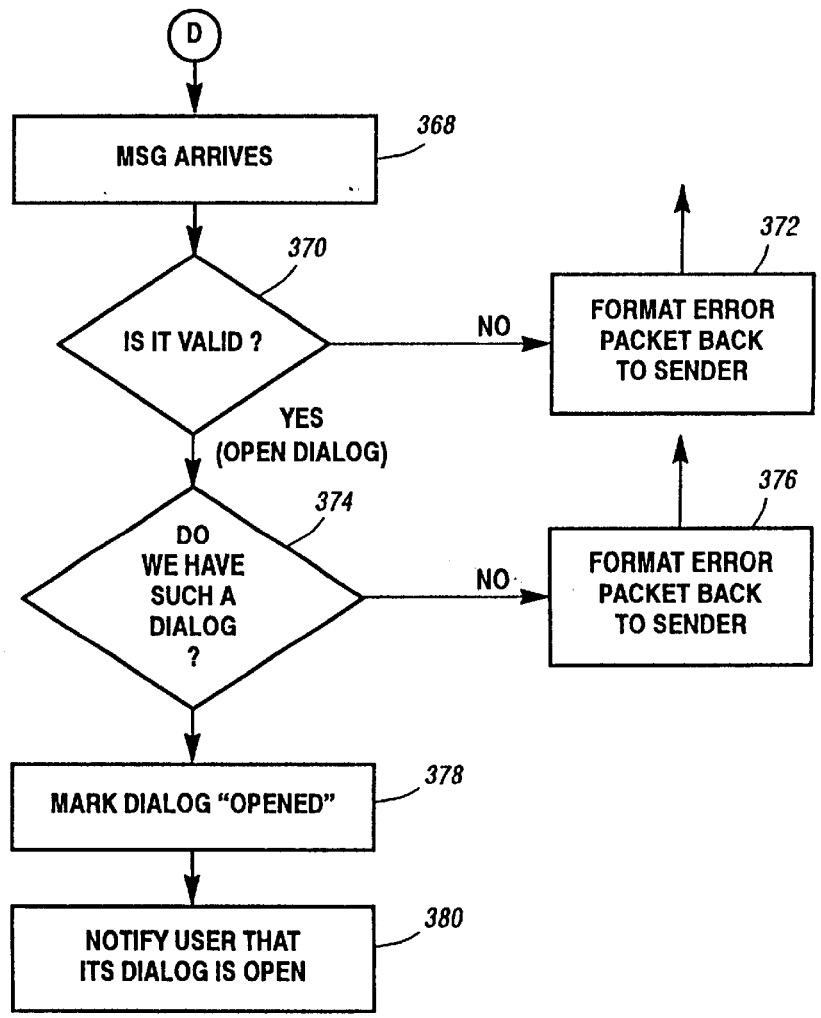

As illustrated in FIG. 24(e), when the MSS_OPEN_DIALOG message is received at step 350, its validity is checked at step 352, and, if invalid, a MSS_ERROR packet is returned to the sender at step 354. If the MSS_OPEN_DIALOG message is valid, it is determined at step 356 whether the IDs in the MSS_OPEN_DIALOG message match entries in the local dialog table. If not, a MSS_ERROR packet is returned to the sender at step 358. Otherwise, the MSS state is set to "OPEN" at step 360 and the MSS user is notified at step 362 that the requested dialog is open. An MSS_OPEN_RESPONSE message is formatted at step 364 and transmitted over the interconnect to the other closely coupled system at step 366.

As illustrated in FIG. 24(*f*), when the MSS_OPEN_RESPONSE message is received at step 368, its validity is checked at step 370, and, if invalid, a MSS_ERROR packet is returned to the sender at step 372. If the requested dialog is not found in the dialog table at step 374, a MSS_ERROR packet is returned to the sender at step 376. Otherwise, the dialog is marked as "OPEN" at step 378, and the MSS user is notified at step 380 that the requested dialog is opened. The MSS is now ready for data transfer.

Figure 25A:
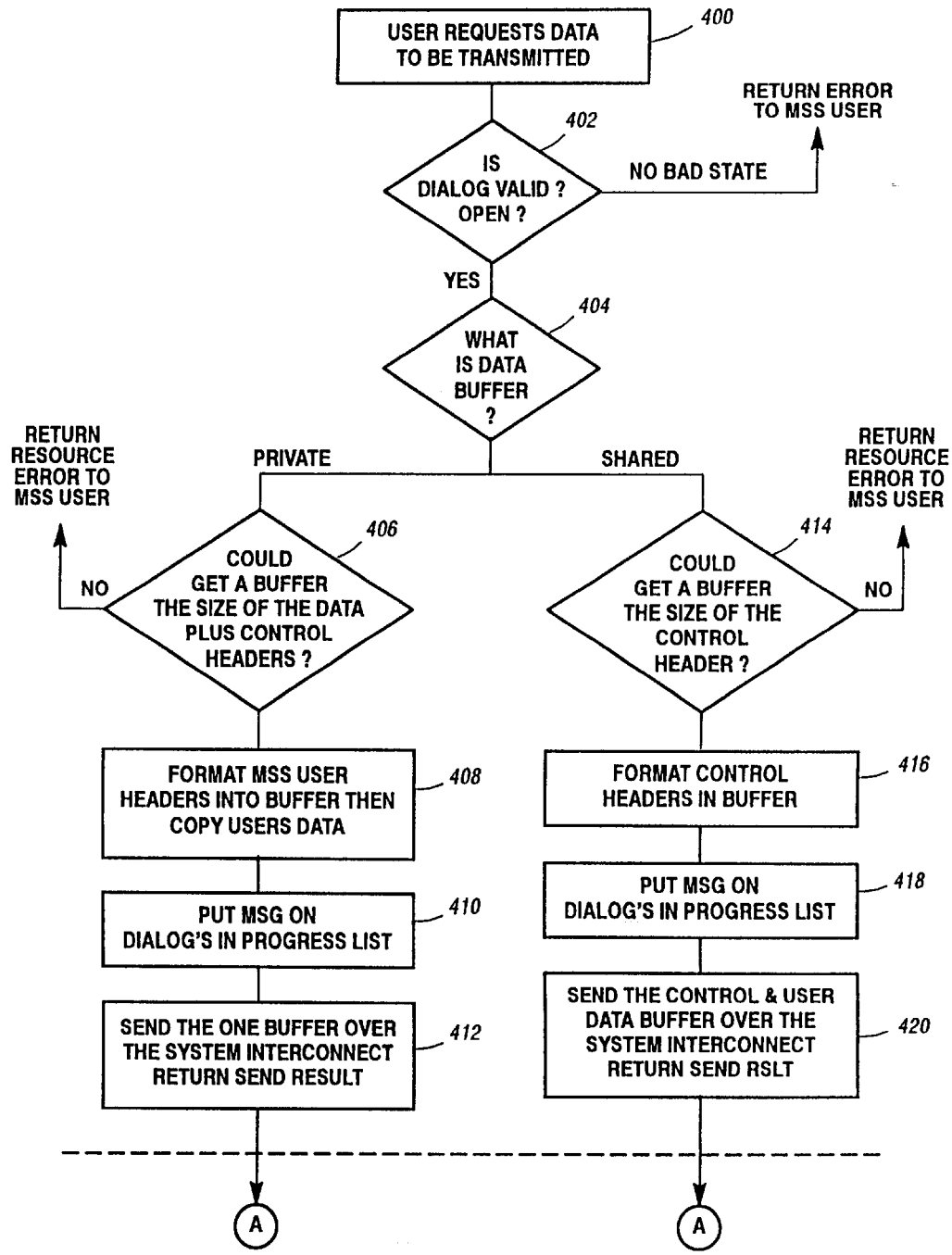
FIGS. 25(a)–25(b) illustrate the procedure for outputting data from the MSS user over the interconnect using the MSS of the invention.
Figure 25B:
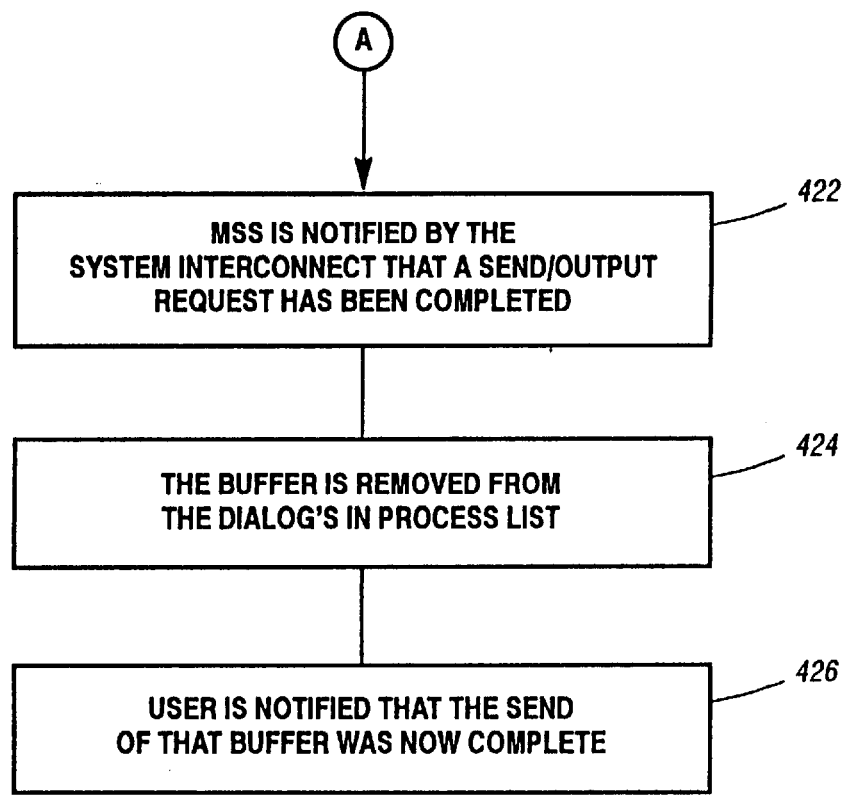

FIGS. 25(*a*)–25(*b*) illustrate the procedure for outputting data from the MSS user over the interconnect using the MSS dialog of the invention. As illustrated in FIG. 25(*a*), the MSS user first requests that data be transmitted at step 400. It is then determined at step 402 whether the requested dialog is valid and open. If not, an error code is returned. Otherwise, it is determined at step 404 whether the opened dialog has a private or a shared data buffer. If the data buffer is private, it is determined at step 406 whether a buffer may be obtained which is the size of the data to be transmitted along with is control headers. If no such buffer is available, a resource error is returned to the MSS user. Otherwise, the user and MSS headers are formatted into the private data buffer along with the user data at step 408. An appropriate message is then added to the dialog's "in-progress" list at step 410 prior to sending the one buffer over the interconnect at step 412. On the other hand, if the data buffer is shared, it is determined at step 414 whether a buffer may be obtained which is the size of the control headers. If no such buffer is available, a resource error is returned to the MSS user. Otherwise, the control headers are formatted into the shared data buffer at step 416. An appropriate message is then added to the dialog's "in-progress" list at step 418 prior to sending the control data and user data buffer over the interconnect at step 420.

Whether the data buffers are public or private, the MSS is notified at step 422 (FIG. 25(*b*)) by the interconnect that a send/output request has been completed, and the data buffer is removed from the dialog's in-progress list at step 424 once the user data has been sent. The MSS user is then notified at step 426 that the send of that buffer is now completed.

Figure 26A:
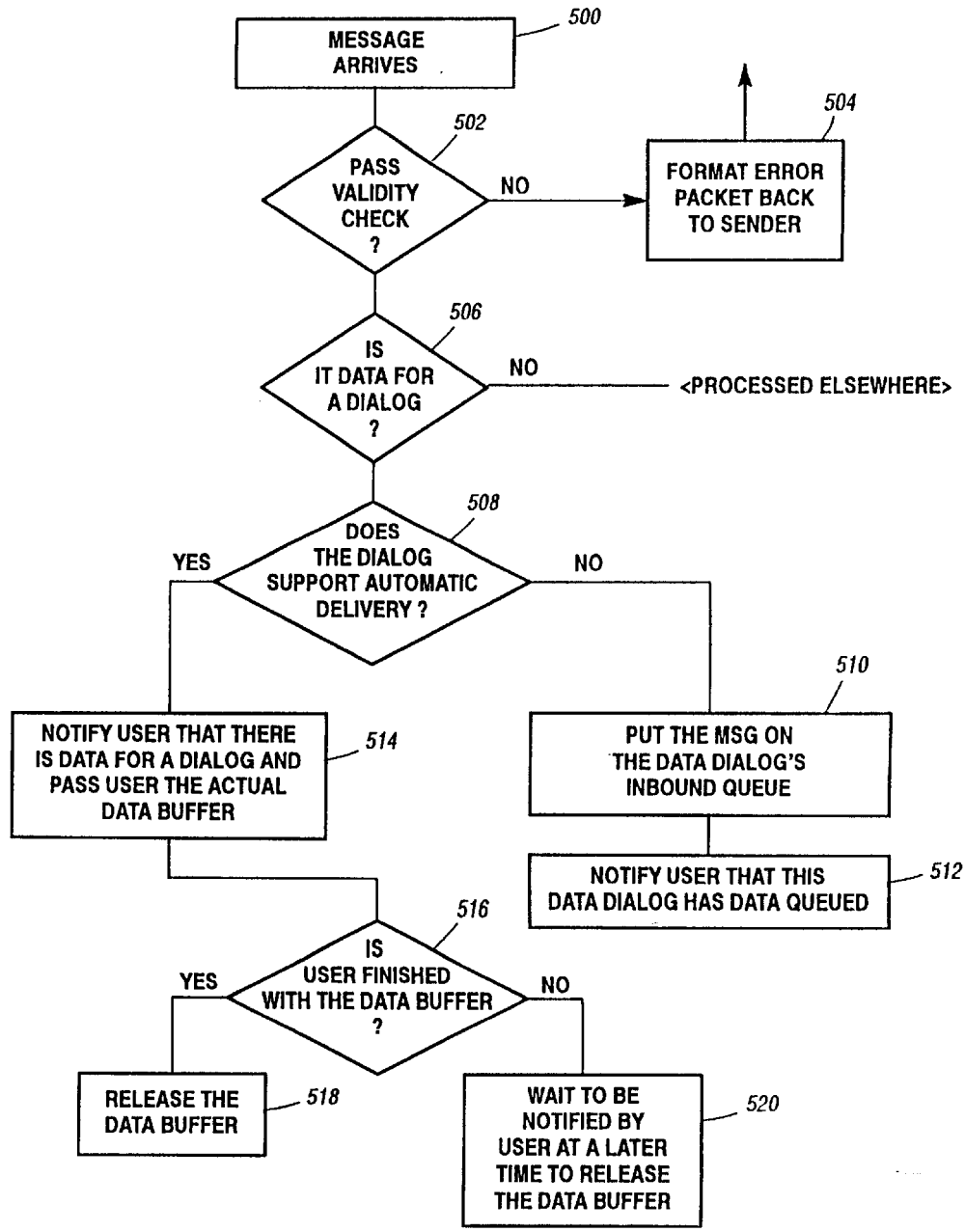
FIGS. 26(a)–26(b) illustrate the procedure for inputting data to the MSS user from the interconnect using the MSS of the invention.
Figure 26B:
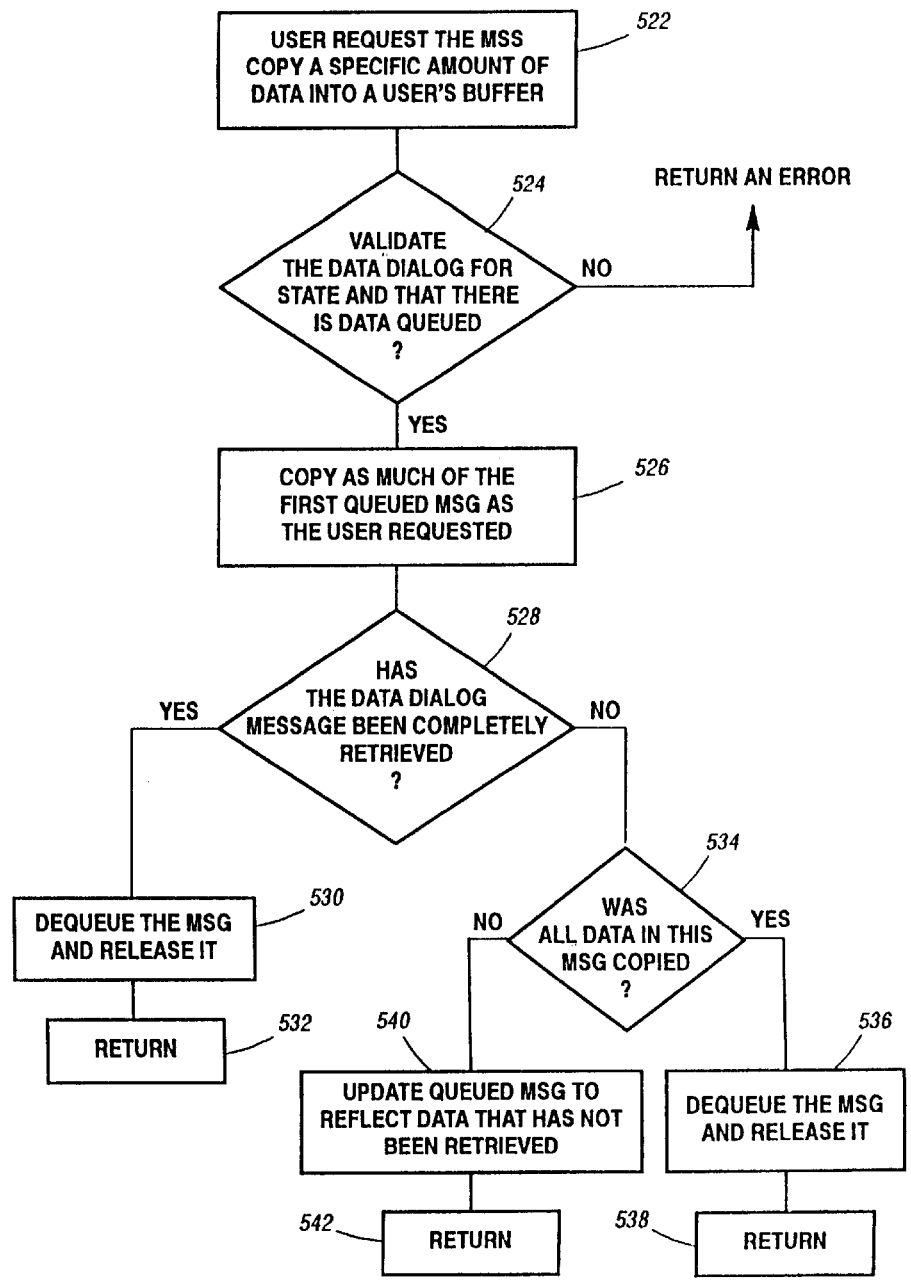

FIGS. 26(*a*)–26(*b*) illustrate the procedure for inputting data to the MSS user from the interconnect using the MSS of the invention. As illustrated in FIG. 26(*a*), when a message arrives at the MCP from the interconnect at step 500, the message is given a validity check at step 502. If the message does not pass the validity check, a MSS_ERROR packet is returned to the sender at step 504; otherwise, it is determined at step 506 whether the input data is for a dialog. If not, the data is processed elsewhere. If the data is for an MSS_Endpoint_Dialog, it is determined at step 508 whether the selected dialog supports automatic delivery. If not, the received message is put on the MSS_Endpoint_Dialog's inbound queue at step 510, and the MSS user is notified at step 512 that the data message has been queued. However, if the dialog supports automatic delivery, the MSS user is notified at step 514 that there is input data for a dialog, and the MSS user is passed the actual buffer containing the data message. When it is determined at step 516 that the MSS user is finished with the data buffer, the data buffer is released at step 518; otherwise, the system waits at step 520 for an indication that the MSS user is finished with the data buffer so that the data buffer may be released.

FIG. 26(*b*) illustrates the processing performed by the MSS in order to provide the input data to a user. As shown at step 522, the user requests that the MSS copy a specific amount of data into a data buffer accessible by the user's destination application. At step 524, the MSS_Endpoint_Dialog is validated and it is verified that data is queued for transfer (FIG. 26(*a*)). If the validation fails, an error code is returned; otherwise, at step 526 as much of the first queued message as requested by the user is copied to the user's data buffer. If it is determined at step 528 that the MSS_Endpoint_Dialog message has been completely retrieved, then at step 530 the message is dequeued and released and processing ends at step 532. On the other hand, if there is more input data to receive, it is determined at step 534 whether all data in the current message has been copied. If so, the message is dequeued and released at step 536, and processing ends at step 538. However, if there is more data in the input message to be copied, the queued message is updated at step 540 to reflect that data has not been retrieved. The processing then ends at step 542.

Figure 27A:
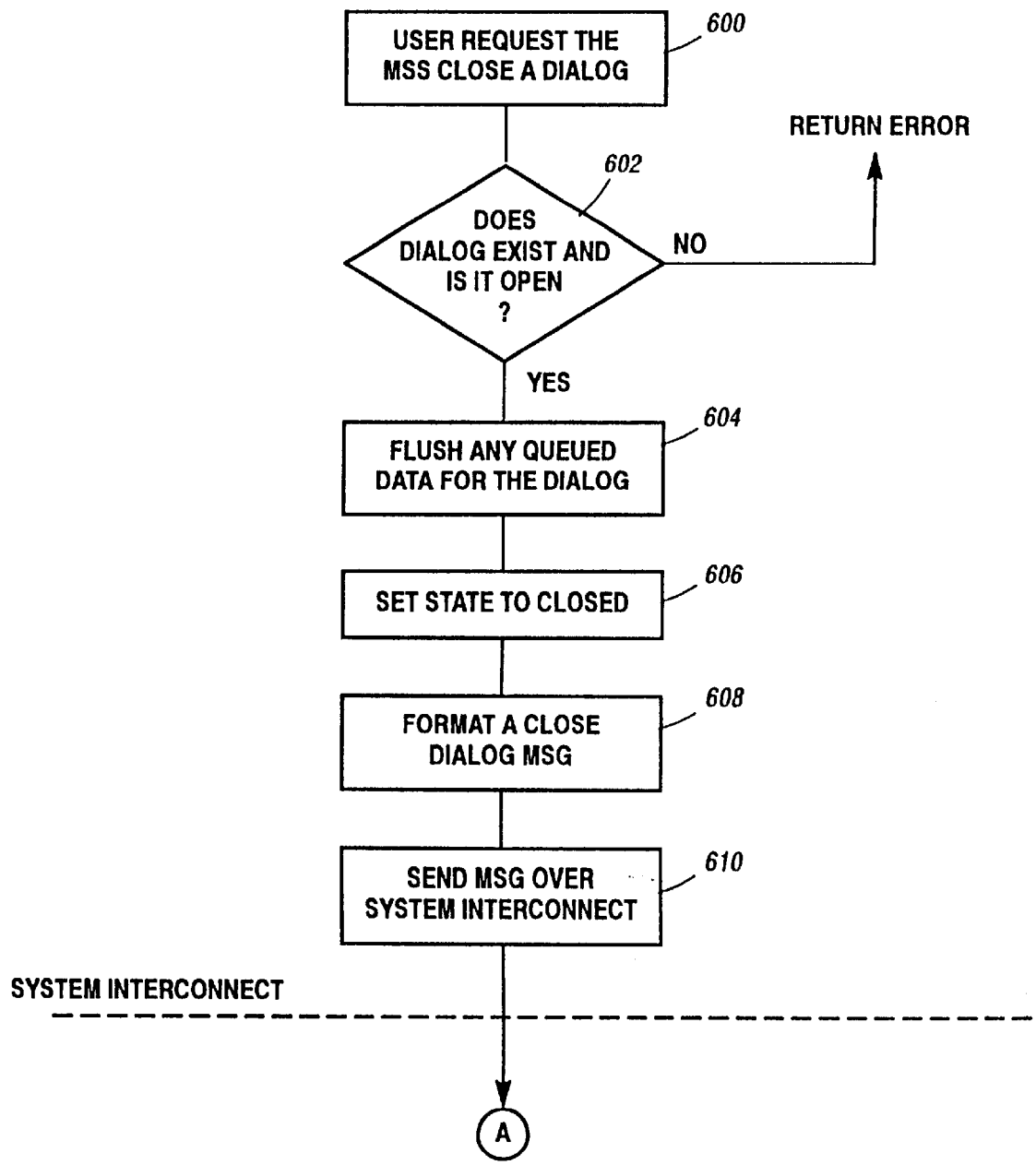
FIGS. 27(a)–27(c) illustrate dialog termination of the MSS_Endpoint_Dialog created in accordance with the invention.
Figure 27B:
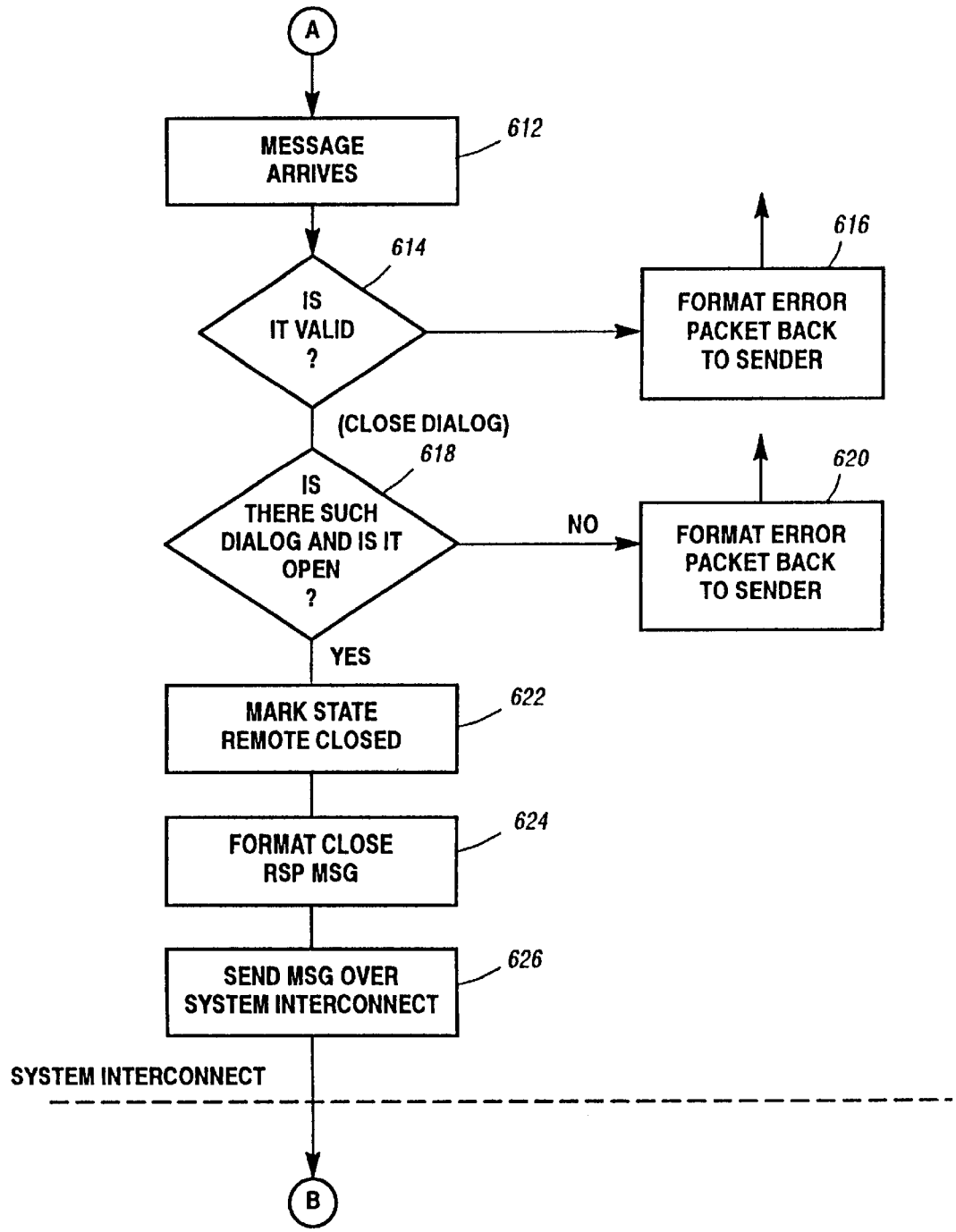
Figure 27C:
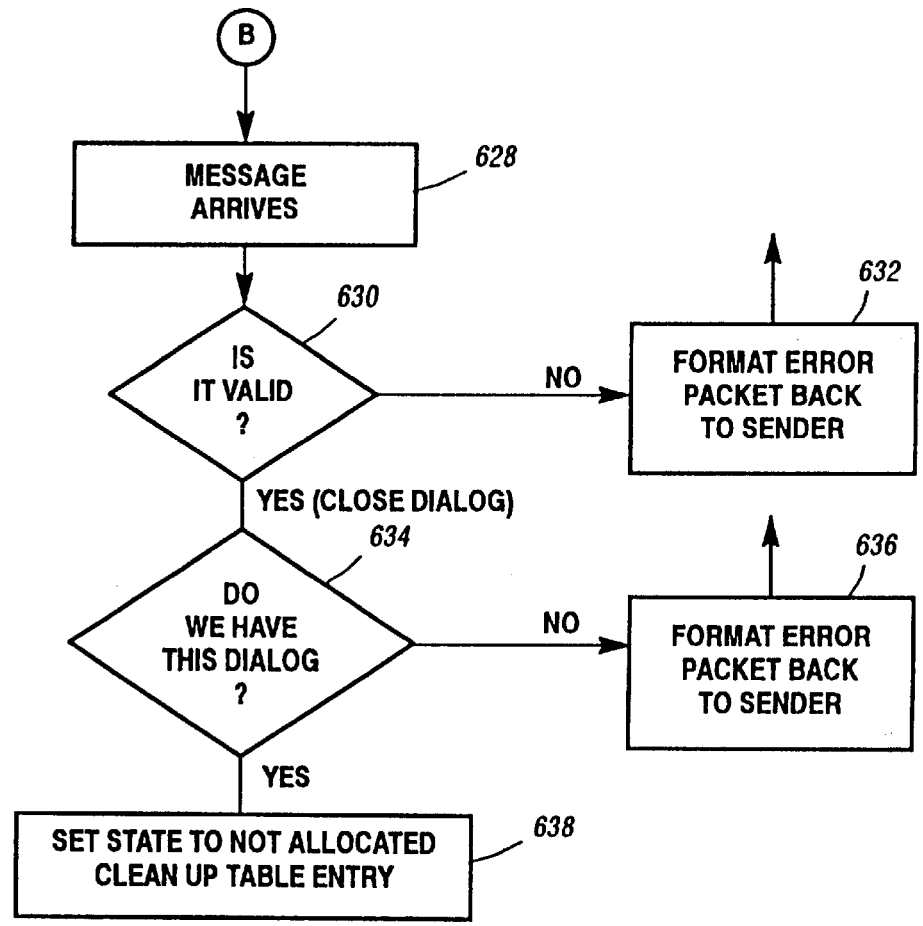

FIGS. 27(*a*)–27(*c*) illustrate dialog termination of the MSS_Endpoint_Dialog created in accordance with the invention. As illustrated in FIG. 27(*a*), termination begins at step 600 when the MSS user requests that MSS close a dialog. If it is determined at step 602 that the dialog to be closed does not exist or is not opened, an error code is returned; otherwise, any queued data for the dialog to be closed is flushed at step 604, and the MSS state is set to "closed" at step 606. A MSS_CLOSE_DIALOG message is then formatted at step 608 and sent over the interconnect at step 610. The MSS_CLOSE_DIALOG message is received at step 612 (FIG. 27(*b*)) and its validity is checked at step 614. If the message is invalid, a MSS_ERROR packet is returned to the sender at step 616; otherwise, it is determined at step 618 whether the dialog identified in the MSS_CLOSE_DIALOG message exists and is open. If the dialog does not exist or is closed, a MSS_ERROR packet is returned at step 620. If the dialog is present and open, at step 622 the MSS state is marked "REMOTE_CLOSED," and a MSS_CLOSE_RESPONSE message is formatted at step 624 and sent over the interconnect at step 626.

Finally, as illustrated in FIG. 27(*c*), when the MSS_CLOSE_RESPONSE message is received at step 628, its validity is checked at step 630, and, if invalid, a MSS_ERROR packet is returned to the sender at step 632. If the requested dialog is not found in the dialog table at step 634, a MSS_ERROR packet is returned to the sender at step 636. Otherwise, the dialog table entry is cleaned up at step 638.

Those skilled in the art will appreciate that the MSS dialog of the invention may be utilized by a number of MSS users in the transport layer. However, in a preferred embodiment of the invention, the MSS is invoked by a Distributed Transport Communications Manager ("DTCM") protocol of the type described in the next section, as in the examples illustrated in the figures.

II. DISTRIBUTED TRANSPORT COMMUNICATIONS MANAGER ("DTCM")

This section describes the functionality and operation of the DTCM and its interaction with the user and the MSS, which is, in turn, described in detail in section I above. Description of the DTCM will be provided in three major areas: (1) Dialog Establishment, (2) Data Transfer, and (3) Dialog Termination. All interaction between the MSS and its user is accomplished through procedure calls—the MSS invokes the MSS user procedures described above and vice-versa.

In the following description, DTCM is described in terms of the MCP/NT coupled systems where the MCP is the Application Environment, NT is the Protocol Environment, and TCP/IP is the target transport protocol. However, applications of the techniques of the invention in other processing environments will be apparent from the following description.

A. Initialization, Recovery, and Shutdown of DTCM

Conceptually, each DTCM environment may initialize, shutdown (in an orderly fashion) or fail independent of any other environment. However, on certain platforms, it may be impossible for all actions to be independent. For example, in a platform in which the Application Environment is emulated on the platform of the Protocol Environment, DTCM-Server 94 cannot fail without DTCM-Client 90 failing since a DTCM-Server 94 failure brings down the whole platform.

1. Initialization

As noted above, it is the MSS's responsibility to establish communication with its counterpart in remote environments and to inform its local users about availability of remote MSS users and environments. When informed of availability of a DTCM-Server 94, DTCM-Client 90 is responsible for initiating a handshake with DTCM-Server 94 in order to allow further processing to occur. The handshake between Client/Server verifies compatibility between the two components and accomplishes exchange of critical initialization data. In its handshake response, DTCM-Server 94 provides a list of available addresses in the Protocol Environment. If additional IP addresses become available in the Protocol Environment after this handshake, DTCM-Server 94 informs DTCM-Client 90 as this occurs. Likewise, DTCM-Client 90 is informed if an IP address becomes unavailable while Server/Client communication is active.

2. Recovery

"Recovery" is the processing performed when communication with a remote environment is lost unexpectedly. MSS is responsible for detecting unavailability of a remote MSS user and informing the local MSS user of any such occurrence (via the User-Change-Notification procedure). On receiving this notification, DTCM-Client/Server perform appropriate processing on the loss of a remote environment. DTCM-Client 90 handles loss of a DTCM-Server 94 by cleaning up any transport connections residing in the subject environment. TCP connections which are in an opened or closing state are closed; the application may continue to READ any previously received data. TCP open requests utilizing the failed DTCM-Server 94 are aborted. On the other hand, DTCM-Server 94 handles loss of a DTCM-Client 90 by performing abortive disconnects for all opened or pend-open TCP TDI connections, allowing these operations to complete without participation of DTCM-Client 90.

3. Shutdown (Orderly)

No special processing is performed by either DTCM-Client 90 or DTCM-Server 94 upon shutdown of the Protocol Environment. DTCM-Server 94 does not, for example, inform DTCM-Client 90 that it is shutting down. Instead, each relies on the other's recovery processing to accomplish desired results. Via previously discussed MSS capabilities, when one DTCM component shuts down, its peers are notified that each applicable MSS dialog has become unavailable, causing recovery processing as discussed earlier.

The decision to perform no special shutdown processing is based upon the fact that no appreciable benefit would be achieved by doing so and that recovery processing must be implemented. When DTCM-Client 90 shuts down, the best it could do would be to have DTCM-Server 94 cleanup all TCP dialogs created on its behalf. Since DTCM-Client 90 does this when recovering from a Server failure, no benefit is seen with such an approach. A similar argument applies to DTCM-Server 94 shutdown.

B. TCP Dialog Establishment

The following subsections describe TCP dialog establishment based on which type of open operation (passive versus directed) is initiated in the MCP environment. Each section first discusses typical establishment scenarios; these are followed by sections which describe atypical open scenarios, e.g. aborted opens and coincident opens.

1. MCP Environment Passive Opens

Figure 28:
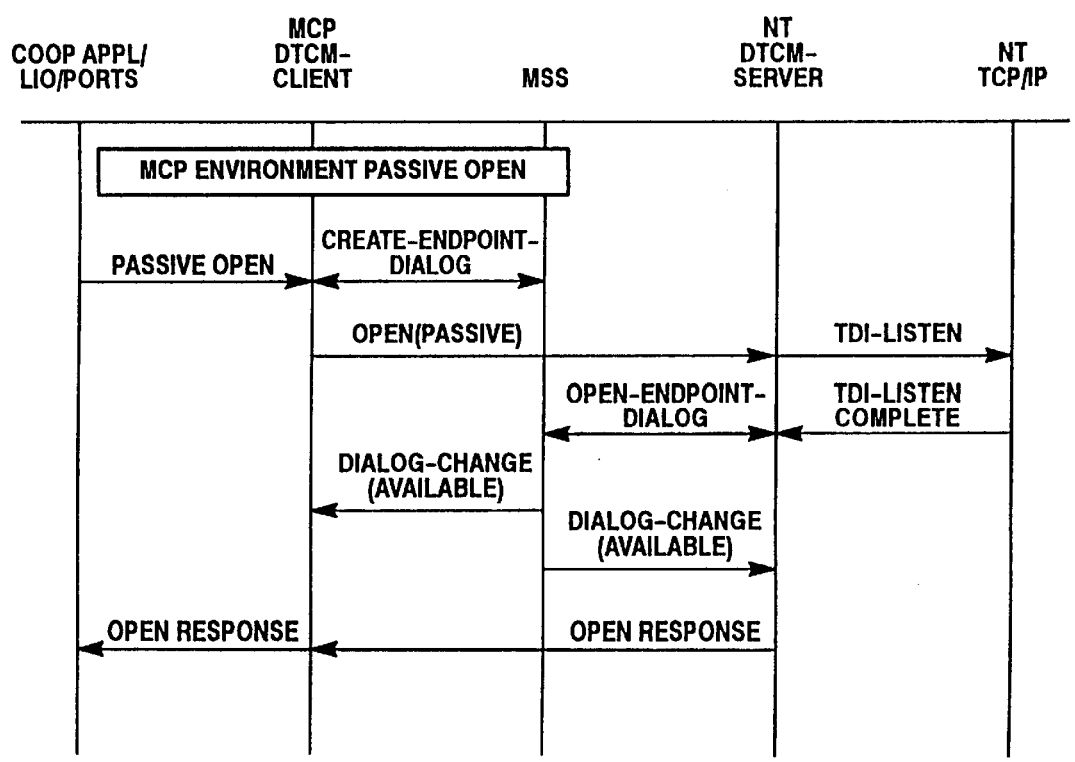
FIG. 28 illustrates the normal flow of TCP dialog establishment for Passive Opens from the MCP environment in accordance with the invention.

FIG. 28 illustrates the normal flow of TCP dialog establishment for passive opens from the MCP environment in accordance with the invention. Processing for an MCP Application Environment Passive-Open is shown in FIG. 28 and can be summarized as follows:

1. The MCP environment application initiates processing by performing a Passive-Open operation via one of the existing APIs.
2. MCP DTCM-Client 90 creates its side of a new MSS Endpoint-Dialog by invoking the MSS (Create-Endpoint-Dialog) and issues an Open(Passive) request to DTCM-Server 94 on the MSS control dialog.
3. On processing the Open(Passive) request, DTCM-Server 94 performs a corresponding TDI-Listen operation (additional processing required to allocate TDI objects is not shown here). The TDI-Listen does not specify the "Query-Accept" option in order to allow NT TCP/IP to automatically accept an incoming connection on DTCM-Server's behalf.
4. NT TCP/IP 58 indicates that the TDI-Listen operation has been completed when a corresponding incoming request is received. When told that the TDI-Listen has completed, DTCM-Server 94 opens its side of the MSS Endpoint-Dialog by invoking the MSS (Open_Endpoint_Dialog). On completing its processing, the MSS component in each environment informs the DTCM component that the Endpoint-Dialog is available. Note that these indications occur independently in each environment.
5. When its MSS Endpoint-Dialog is available, DTCM-Server 94 responds to the original Open(Passive) request on the Endpoint-Dialog. DTCM-Client 90 completes the open operation on receiving the Open response.

2. MCP Environment Directed Opens

Figure 29:
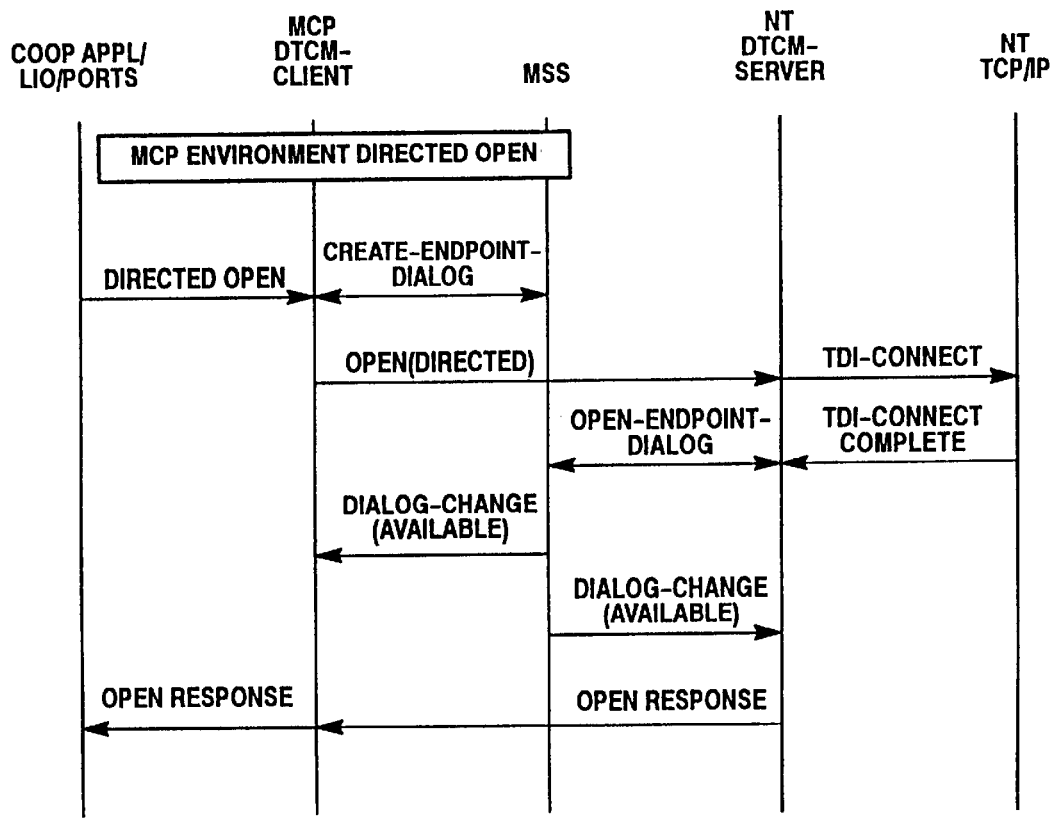
FIG. 29 illustrates the normal flow of TCP dialog establishment for Directed Opens from the MCP environment in accordance with the invention.

FIG. 29 illustrates the normal flow of TCP dialog establishment for directed opens from the MCP environment. Processing is summarized as follows:

1. The MCP environment application initiates processing by performing a Directed-Open operation via one of the existing APIs.
2. MCP DTCM-Client 90 creates its side of a new MSS Endpoint-dialog by invoking the MSS (Create-Endpoint-Dialog) and issues an Open(Directed) request to the DTCM-Server 94.
3. On processing the Open(Directed) request, DTCM-Server 94 performs a corresponding TDI-Connect operation (additional processing required to allocate TDI objects is not shown here).

4. NT TCP/IP 58 indicates that the TDI-Connect operation has been completed when its processing with the remote system is completed.

5. On receiving the TDI-Connect-Complete indication, DTCM-Server 94 opens its side of the MSS Endpoint-Dialog by invoking the MSS (Open_Endpoint_Dialog). On completing its processing, the MSS component in each environment informs the DTCM component that the Endpoint-Dialog is available. Note that these indications occur independently in each environment.

6. When its MSS Endpoint-Dialog is available, DTCM-Server 94 responds to the original Open(Directed) request on the Endpoint-Dialog. DTCM-Client 94 completes the open operation on receiving the Open response.

3. MCP Environment Rescinded Opens

Figure 30:
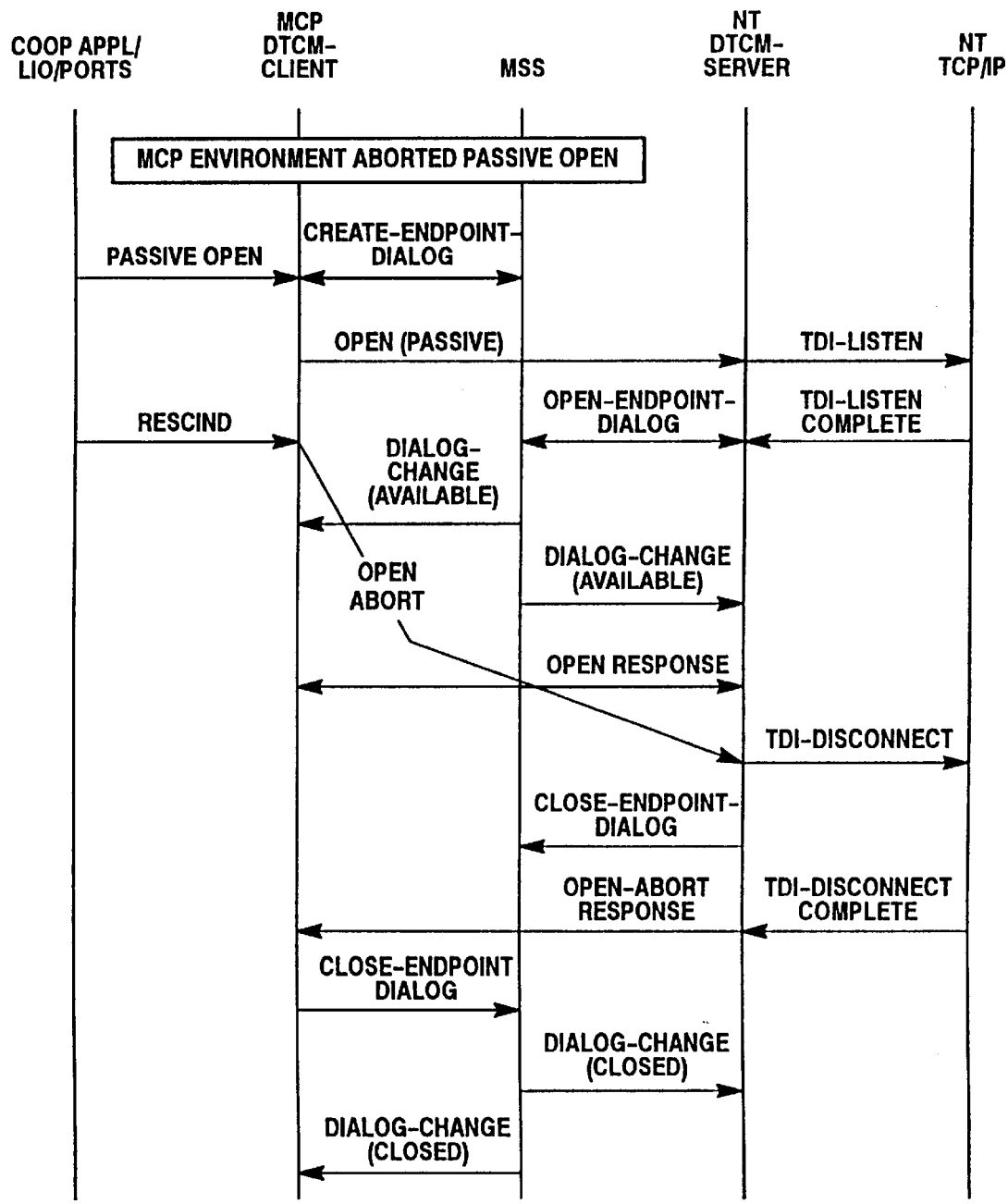
FIG. 30 illustrates an example of an aborted dialog establishment for a passive open in accordance with the invention.
Figure 31:
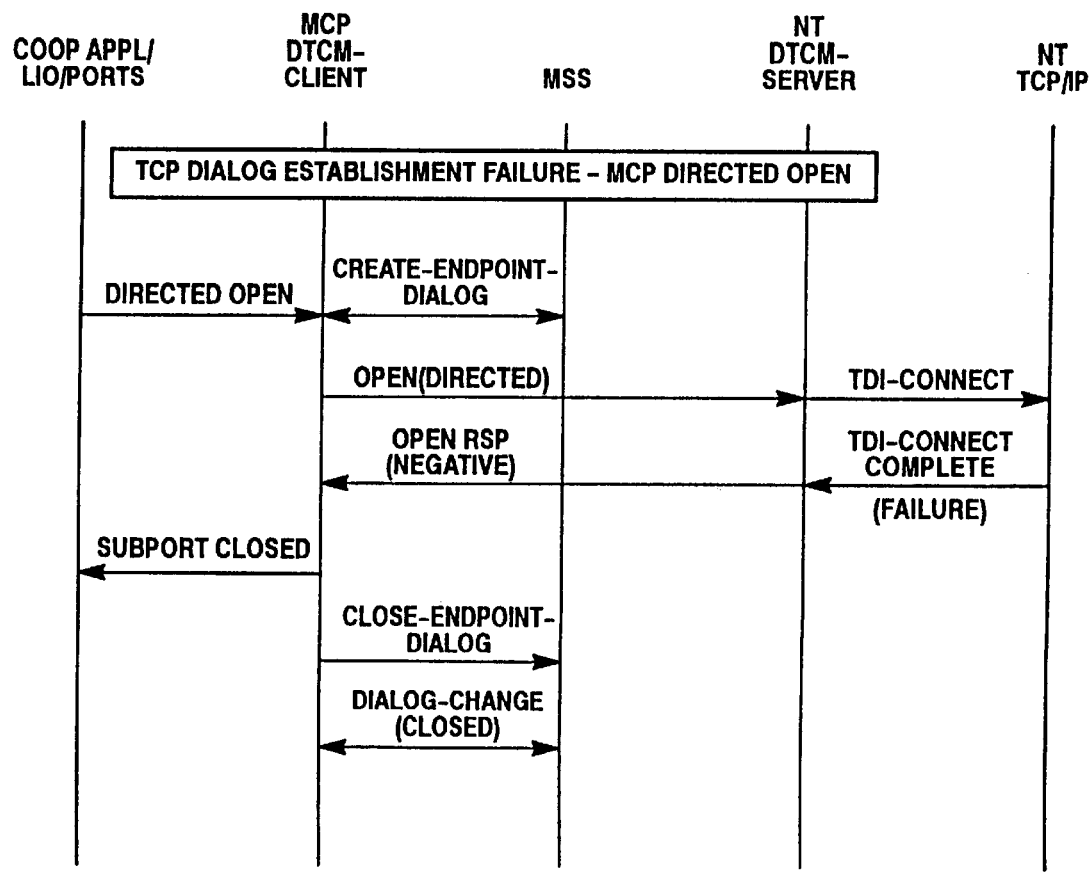
FIG. 31 illustrates an MCP initiated directed open failure caused by the absence of a corresponding passive request in accordance with the invention.

The following section summarizes the possible scenarios in which the MCP TCP application aborts dialog establishment. FIG. 30 shows one example of an aborted dialog establishment for a passive open. Processing is summarized as follows:

1. The TCP application in the MCP environment initiates open processing as described above.

2. At some subsequent point prior to the completion of the open, the MCP environment application issues a Close, either abortive or orderly. This is transformed into a Rescind by LIO-Ports. DTCM-Client 90 sends an Open-Endpoint-Abort request to the DTCM-Server 94, puts the connection in Closed state, and returns a positive response to the application.

3. When the DTCM-Server 94 receives the Open-Endpoint-Abort, it must immediately abort the connection regardless of the current state of the connection. DTCM-Server 94 will issue an abortive TDI-Disconnect request, send the Open-Endpoint-Abort response, and call the MSS with Close_Endpoint_Dialog if necessary.

4. When DTCM-Client's Dialog_Change(Available) is invoked after the Abort request is issued, it is ignored.

5. When the Open_Response is received after the Abort request is issued, it is ignored.

6. When the Open-Endpoint-Abort response is received from the DTCM-Server 94, DTCM-Client 90 will invoke MSS_Close_Endpoint_Dialog.

4. TCP Dialog Establishment Failures

This section summarizes the possible scenarios in which an MCP initiated open fails. DTCM-Server 94 may, at any point prior to issuing a positive response, issue a negative response to an outstanding open request. This occurs, for instance, when an MCP initiated directed open fails because there is no corresponding passive request. This particular case is illustrated FIG. 31. As in FIG. 31, any failure initiating in the NT environment after DTCM-Server 94 has issued a positive Open response is a dialog termination case.

C. Data Transfer

By way of background, it should be noted that for input to MCP environment applications using Unisys Proprietary API models such as the LIO/Ports interface, all application data must be placed into an application-supplied buffer. Output is presented to networking software in an application-supplied buffer which cannot be referenced after returning control to the application. In the preferred MCP environment TCP/IP implementation, this requires copying all input and output application messages between application buffers and networking software controlled buffers. It should be further noted that one of the key aspects provided by the Unisys Proprietary API model cooperative (Coop) service interface is sharing of buffers between the application and network transport. This capability avoids data copies necessary when using the LIO/Ports interface of the type mentioned above.

Also by way of background, is should be noted that TDI output works in a manner similar to the Coop interface; the TDI-client-supplied buffer area is owned by the transport until the TDI-Client 99 is notified that the output (send) operation is completed. This completion notification is accomplished by a direct call from the NT I/O SubSystem into a client-supplied procedure when the NT transport completes the I/O operation. On TDI, TCP input may occur in any of the following ways (under control of the TDI-Client 99):

1. The TDI-Client 99 can be notified that input is available. This notification is accomplished by a procedure call from the TDI-Provider into the TDI-Client 99. On receiving notification, the TDI-Client 99 may do one of the following: a) accept the input, including copying it if necessary; b) provide the TDI-Provider with a TDI-Client buffer into which the TDI-Provider will copy the appropriate amount of data; or c) neither of the above. The TDI-Client's actions are indicated via return parameter values. For TCP data, if the client indicates action c), it must invoke one of the other mechanisms at some point.

2. The TDI-Client 99 can invoke an asynchronous receive operation, providing a buffer into which the transport copies input data. The TDI-Client 99 is notified when the receive operation is complete. Although a 'non-blocking' receive operation is defined in TDI, the implementation for TCP/IP does not appear to support the 'non-blocking' semantics (that is, to immediately complete the receive with an appropriate result if no data is present when the receive is invoked).

Figure 32:
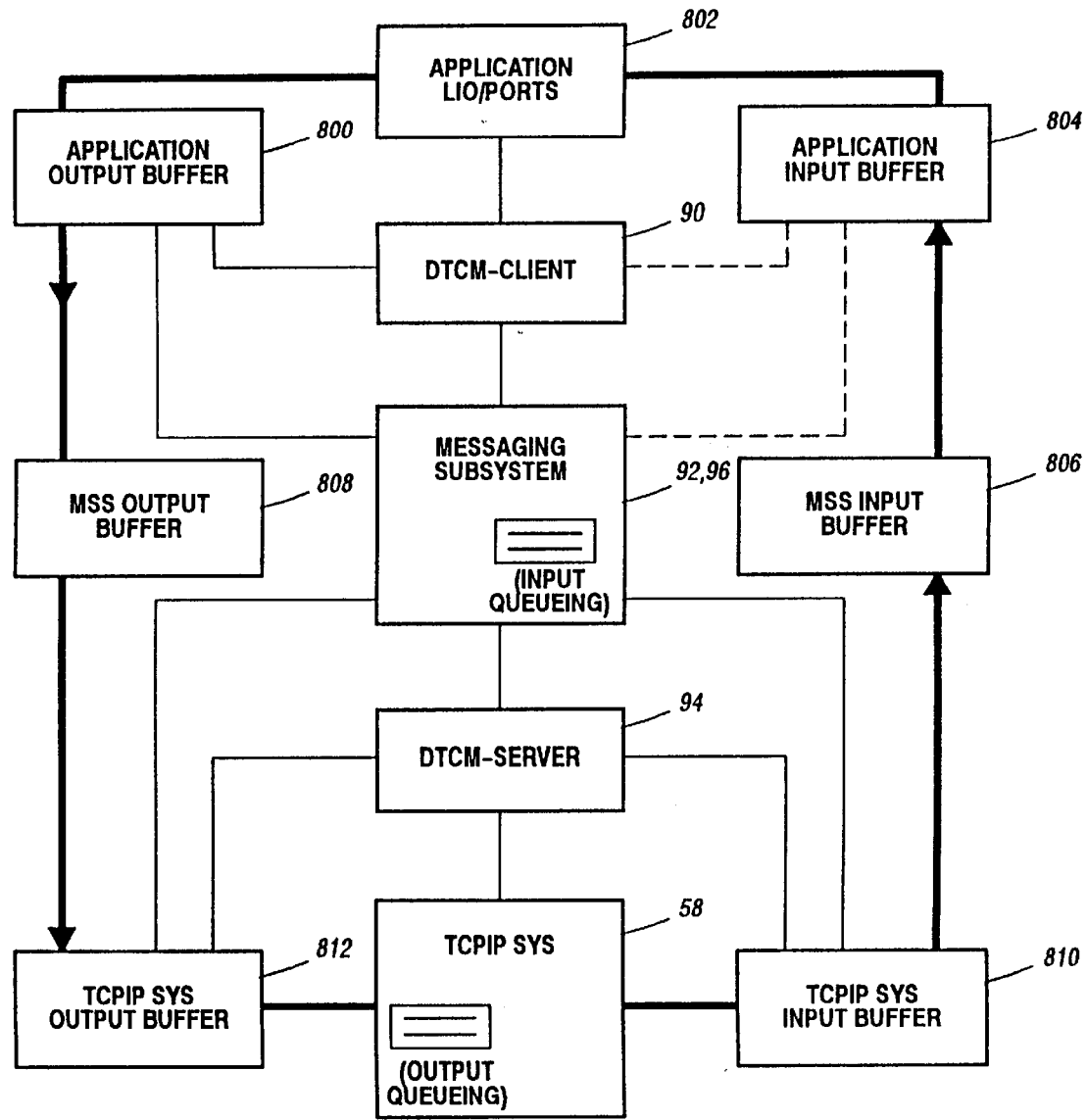
FIG. 32 illustrates DTCM data transfer in accordance with the invention.

FIG. 32 depicts DTCM data transfer in accordance with the invention. Output is shown on the left of FIG. 32, while input is shown on the right of FIG. 32. For simplicity, FIG. 32 shows only usage of the LIO/Ports API. Consideration of the Cooperative Interface API involves sharing the application output buffers 800 which can be used as MSS output buffers 808 and sharing the MSS input buffers 806 which can be passed directly to Cooperative Interface applications.

As illustrated in FIG. 32, application output buffers 800 may be buffers passed to the DTCM-Client 90 on the Cooperative Interface or buffers from the LIO/Ports interface 802, while application input buffers 804 are the buffers presented to DTCM-Client 90 for application reads and are applicable only on the LIO/Ports interface 802. MSS input buffers 806 and MSS output buffers 808 are owned and maintained by the MSS, with sharing capability with other components, including Cooperative Interface applications and TCPIP.Sys 58. In an MSS capable of sharing memory space between its NT and MCP environments, no data movement within the MSS is necessary and input/output buffers may be shared among the NT and MCP environments. It is also possible that sharing may be uni-directional (e.g., MSS output buffers 808 are shared but not MSS input buffers 806). When buffer sharing is not possible or practical, unique MSS input buffers 806 and MSS output buffers 808 may reside in both the MCP and NT environments with MSS (through its underlying interconnect) facilitating movement of data between the environments. While the MSS is responsible for management of buffers used for data storage, DTCM-Client 90 and DTCM-Server 94 are responsible for flow control functions and manage movement of data to other components.

Figure 33:
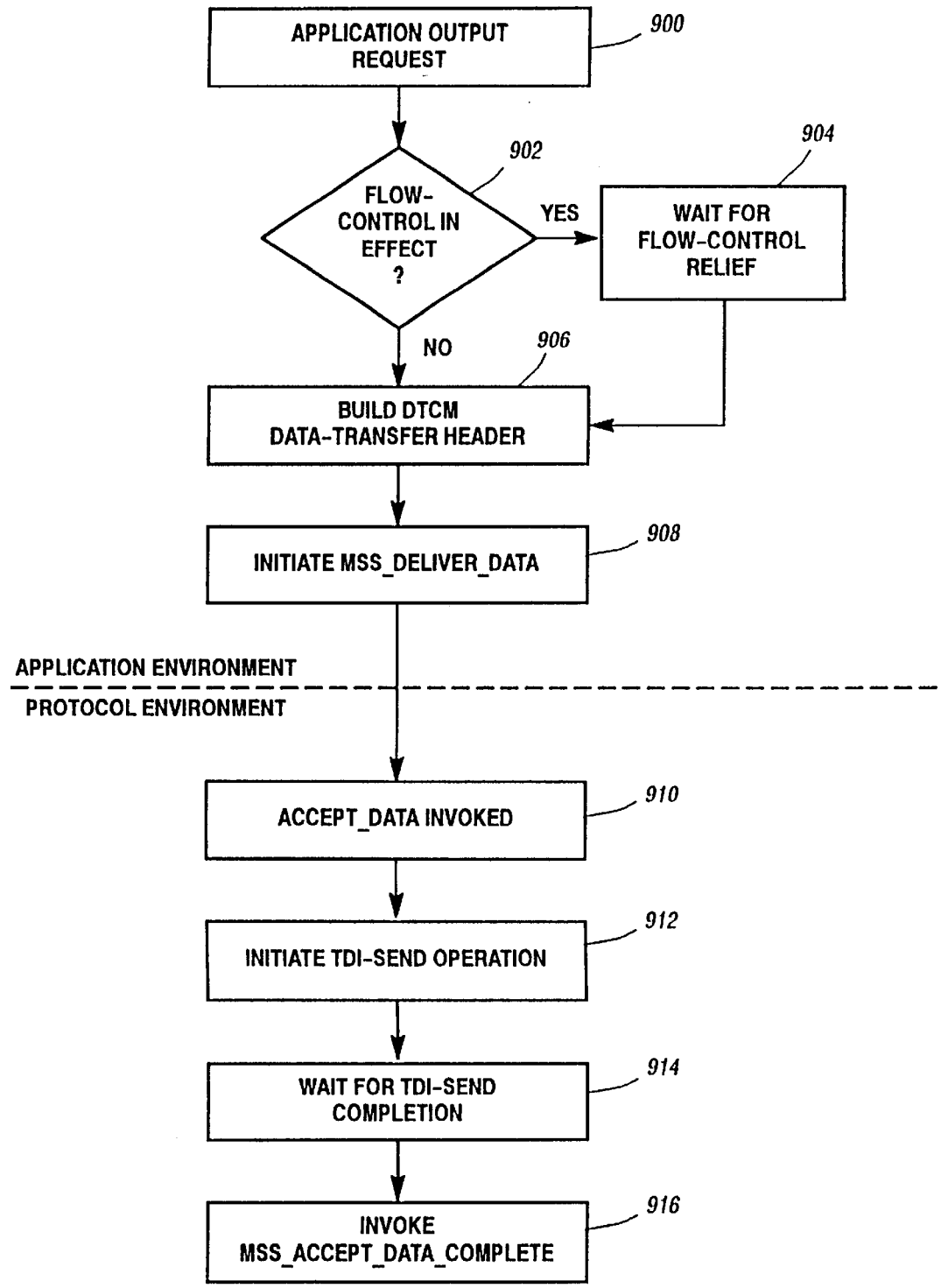
FIG. 33 illustrates DTCM-Client output data transfer processing in accordance with the invention.

FIG. 33 illustrates DTCM-Client 90 output data transfer processing in accordance with the invention. As illustrated in FIG. 33, an application initiates a DTCM data transfer request at step 900, and it is determined at step 902 whether flow-control is in effect. If so, the system waits for flow-control relief at step 904. At step 906, the DTCM protocol header is built, and at step 908, the MSS Deliver Data request is initiated. Because Auto-Data-Delivery is always set in the protocol environment, the receiving system invokes Accept-Data at step 910, and DTCM-Server 94 initiates a TDI-Send operation at step 912. At some later time, the TDI-Send request is completed at step 914, and DTCM-Server 94 invokes MSS_Accept_Data_Complete in step 916.

Figure 34:
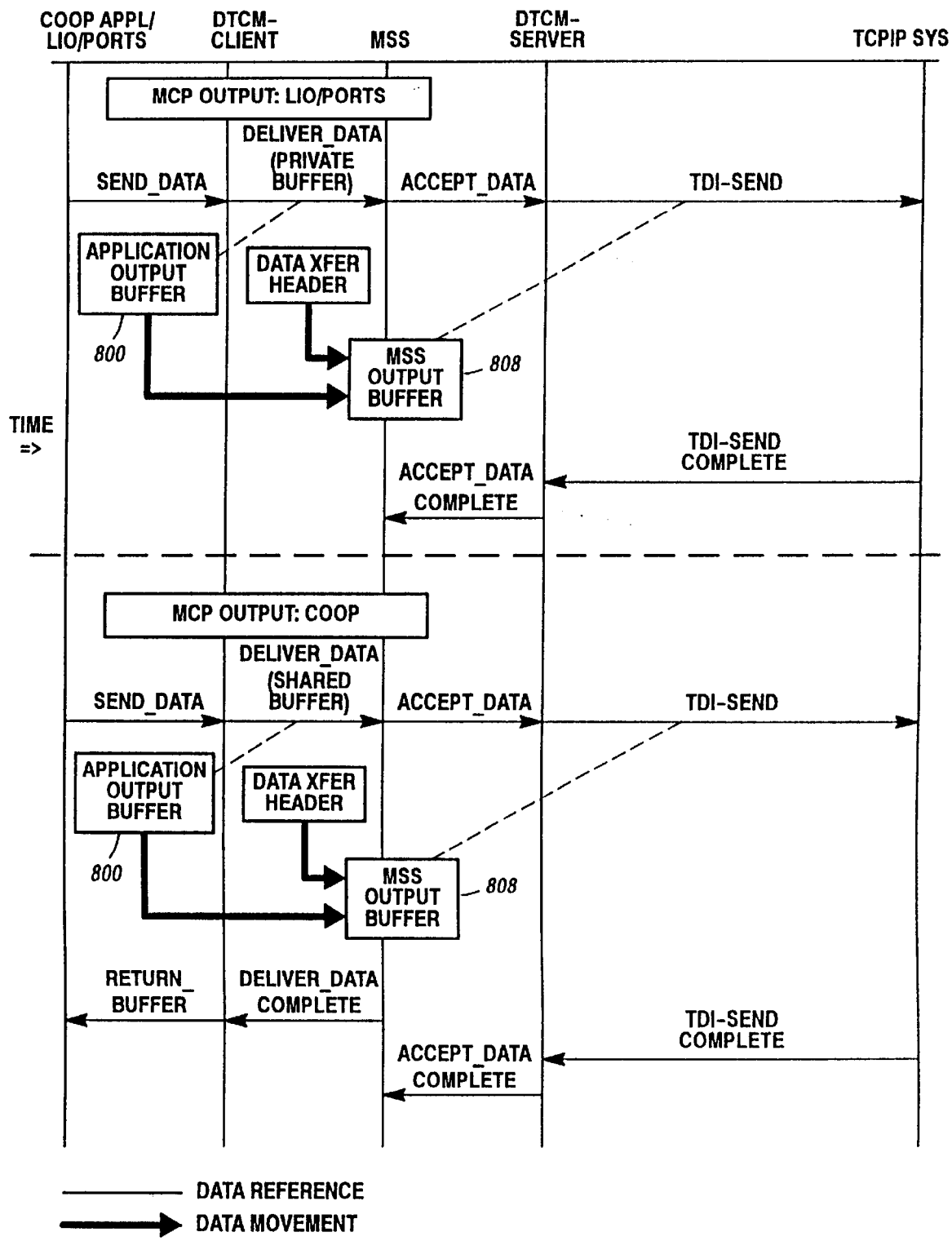
FIG. 34 illustrates normal DTCM data transfer processing for output data from the application environment in accordance with the invention.

FIG. 34 illustrates normal DTCM data transfer processing for output data from the application environment. The upper portion shows MCP environment output using the LIO/Ports API while the lower portion shows output using the Cooperative Interface. NT environment DTCM-Server 94 processing is independent of the MCP environment API in use.

For LIO/Ports applications 802, MCP DTCM-Client 90 is invoked with a length indicator and an application output buffer 800; Cooperative Interface applications also invoke DTCM-Client 90 with a length indicator and an application output buffer 800, passing ownership of the buffer to DTCM-Client 90. In either case, DTCM-Client 90 first checks flow control conditions. If output is disallowed because of flow control conditions, the request is rejected without any further processing. If flow control conditions allow output, a Deliver-Data request is issued to MCP MSS 92, using the appropriate variant depending on which API is in use. MCP DTCM-Client 90 includes a Data-Transfer-Header in the Deliver-Data request. The Data-Transfer-Header contains information needed by the NT DTCM-Server 94 to properly process the data. If MCP MSS 92 rejects this request with a 'no resources' condition, the application request is rejected with no further processing. Otherwise (MCP MSS 92 does not reject the request), the Deliver-Data request is completed in an MSS implementation dependent manner. If the shared-buffer variant was requested, MCP MSS 92 provides DTCM-Client 90 with a Deliver-Data-Complete notification at an appropriate time. On receipt of the Deliver-Data-Complete, DTCM-Client 90 returns ownership of the output buffer 800 to the Cooperative Interface application.

As a result of processing the Deliver-Data request from the MCP environment, NT MSS 96 issues one or more Accept-Data requests to the NT DTCM-Server 94. The number of Accept-Data requests is dependent on the number of buffers MSS 96 required to receive the original data. Each Accept-Data request requires a corresponding Accept-Data-Complete notification from DTCM-Server 94, as described below.

DTCM-Server 94 processing of an Accept-Data request results in initiation of a TDI-Send operation for processing by TCPIP.Sys 58. At some later point, TCPIP.Sys 58 informs DTCM-Server 94 that the TDI-Send operation has been completed. On receiving notification that a TDI-Send operation has been completed, DTCM-Server 94 invokes the MSS Accept_Data_Complete routine. On receipt of the Accept-Data-Complete notification, NT MSS 96 performs implementation dependent actions, including recycling the buffer.

Figure 35:
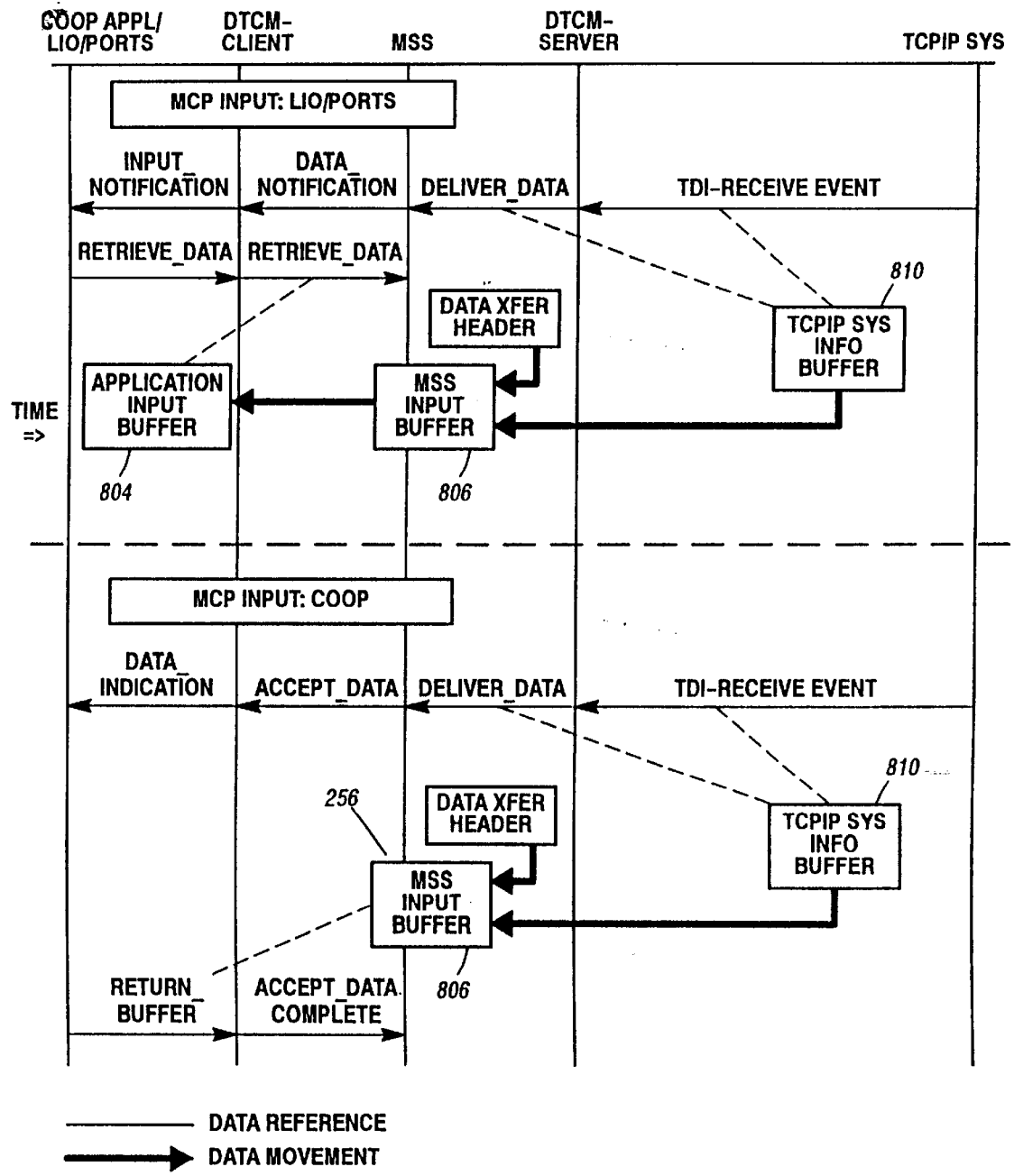
FIG. 35 illustrates DTCM-Client data input using the LIO/Ports API (upper) and the Cooperative Interface (lower)

DTCM-Client Data input is summarized in the flow diagram of FIG. 35. The upper portion shows MCP environment input using the LIO/Ports API 802 while the lower portion shows input using the Cooperative Interface. NT environment processing is independent of the MCP environment API in use.

As illustrated in FIG. 35, MCP environment input begins with a TDI-Receive Event to DTCM-Server 94. TDI-Receive Event semantics are such that the TDI-Client may only access the TCPIP.Sys input buffer 810 directly in its TDI-Receive Event handler. During normal processing, the DTCM-Server 94 component's event handler initiates a private-memory MSS Deliver-Data operation. The NT MSS component 96 copies data from the TCPIP.Sys Input Buffer 810 to an MSS Input Buffer 806 and initiates inter-connect dependent mechanisms to complete the Deliver-Data request. DTCM-Server 94, upon returning from MSS-Deliver-Data, indicates to TCPIP.Sys 58 that it has consumed the data presented to its TDI-Receive Event handler.

As a result of processing the Deliver-Data request from the NT environment, MCP MSS 92 issues one or more Accept-Data or Data-Notifications to MCP DTCM-Client 90, depending on the number of buffers NT MSS 96 required to receive the original data.

Processing for a Data-Notification from NT MSS 96 results in an Input-Notification being issued to LIO/Ports. For processing of LIO/Ports, input continues when the application performs a corresponding read (or LIO/Port resumes a waiting read). An application read, when data is present, results in a Retrieve-Data request being issued by LIO/Ports to MCP DTCM-Client 90. This Retrieve-Data request contains a user buffer and length indication and results in a corresponding private-buffer Retrieve-Data request being issued to the MCP MSS 92. MCP MSS 92 copies the appropriate amount of queued input data into the application's input buffer 804 and returns to MCP DTCM-Client 90. MCP DTCM-Client 90, in turn, performs its own completion processing and returns to LIO/Ports.

On receiving an Accept-Data request, MCP DTCM-Client 90 forwards the input data to the Cooperative Interface application via a Data-Indication. The Cooperative Interface application, at some later point, invokes MCP DTCM-Client 90 to return buffer ownership. MCP DTCM-Client 90, in turn, notifies MCP MSS 92 that the Accept-Data operation has completed.

D. Flow Control

This section provides an overview of flow control in the architecture of the invention. Flow control mechanisms are employed at the following points:

1. In both directions between the DTCM-Server 94 and the DTCM-Client 90 to manage the flow of data between the Protocol and Application Environments on a per transport dialog basis.
2. Within the MSS to control usage of MSS Input Buffers and MSS Output Buffers at a system environment level. Flow control may also occur within the underlying inter-connect employed by an MSS implementation but is not relevant to the present description.
3. At the MCP API level, MCP DTCM-Client 90 has the ability to disallow output from an application (applicable to both Cooperative Interface and LIO/Ports API).

Relative to the NT TCP/IP stack, the following points are relevant to this flow control discussion:

1. In the NT environment's TDI level, there are no explicit flow control mechanisms. Network input pacing is controlled by the client's acceptance of data and the normal TCP/IP receive window mechanism. NT TCP/IP 58 buffers an amount of input based on the receive window size of a connection. Once input is accepted by the TDI-Client, the receive window is opened and additional input may be buffered by the transport. Any input accepted by DTCM and not yet delivered to the MCP application creates another buffering point, i.e., the total amount of buffered input would be the amount buffered by both the NT TCP/IP 58 and by DTCM. TDI does not provide any mechanism for a TDI-Client 99 to accept input from the transport without opening the receive window. However, TDI does provide a mechanism to set the TCP/IP receive window size.

2. NT TCP/IP 58 accepts send requests from the user without any apparent limitations. This is reasonable when considering that the TDI-Client 99 provides the resources (most noticeably the output buffer). Send requests which cannot be immediately satisfied due to send window limits or other restrictions are held by NT TCP/IP 58 and completed later.

DTCM-Client 90 and DTCM-Server 94 use a per-dialog, credit-based flow control scheme. Credits are granted to the sending environment by the receiving environment—the sending environment may transfer data only as long as it has available credits. Credits are measured in units of bytes of data. In order to accommodate large data transfers without the necessity of breaking data transfers into pieces, the sending environment may complete a single data transfer even if its size exceeds available credit. The sending environment cannot assume that it will ever be granted enough credits to handle a large data transfer without exceeding its credit limit. Once credits are exhausted the sender may not initiate another transfer until a positive credit balance is achieved.

The sending environment may deduct credits at any time. This action may be performed, for instance, by DTCM-Client 90 when an application requests input flow control. Note that deducting credits may result in a zero or negative credit balance at the sender.

The credit container size is 32-bits, with one bit indicating sign. Normal credit limits are expected to be such that little protocol overhead is encountered in normal scenarios. A default credit of 64k bytes is planned in both the MCP and NT environments. Actual defaults will be determined by testing effects of various values.

Initial credits are granted during the dialog establishment process. Zero credits may be initially granted. Credit grants (or deductions) may be piggy-backed with data transfers. Interfaces also exist to allow explicit credit grants or deductions.

E. Handling Urgent Data

In order to maintain existing semantics for urgent data at the MCP APIs, applicable MSS Data Transfer operations carry information relative to urgent data. Note that on TDI, urgent data is referred to as "expedited" data.

On output from the MCP environment, the Data-Transfer-Header carries an AUrgent-Data" flag. For remote TCP connections, resultant TDI-Send operations are performed using the TDI-SEND-EXPEDITED option. If a Deliver-Data operation is completed in multiple parts, only the TDI-Send for the last portion uses TDI-SEND-EXPEDITED.

For input to the DTCM-Client 90 environment, the Urgent-Data flag approach described above enables DTCM-Client 90 to maintain its Urgent-Data semantics by considering the last byte of data in an Urgent-Data flagged Deliver-Data request as its urgent data pointer.

F. TCP Dialog Termination
1. Orderly TCP Dialog Termination

Figure 36:
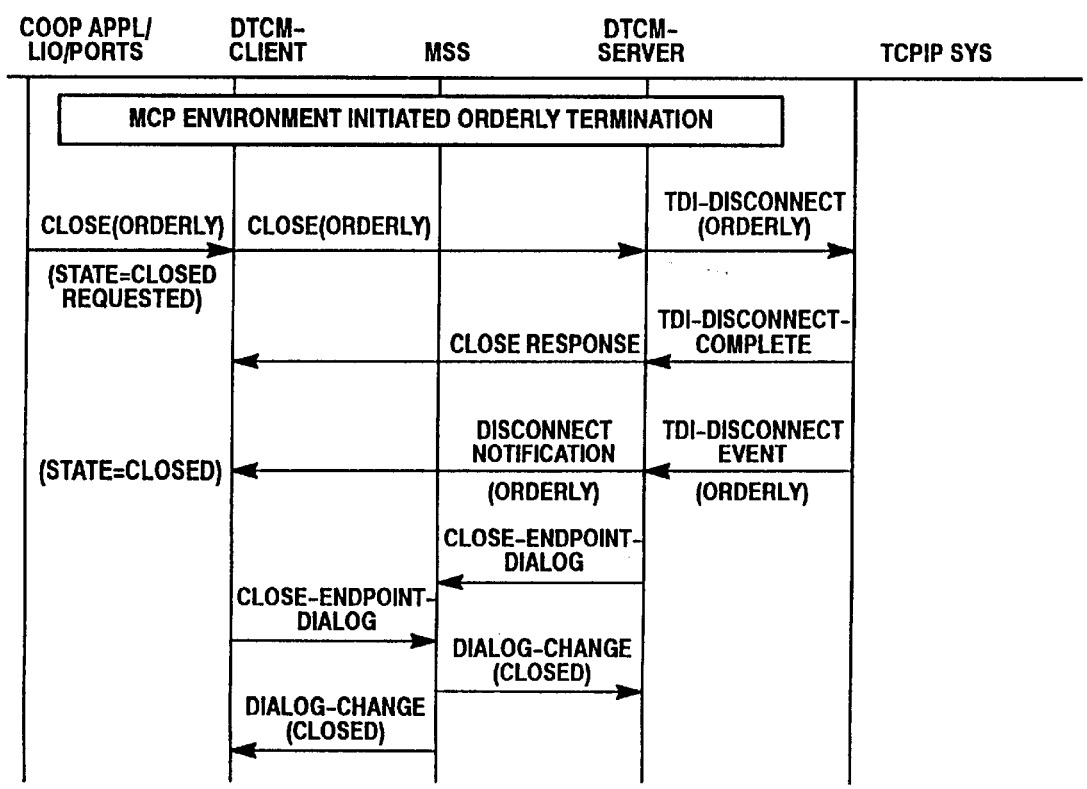
FIG. 36 illustrates normal processing for orderly DTCM dialog termination initiated by the MCP environment in accordance with, the invention.

Normal processing for orderly dialog termination initiated by the MCP environment is shown in FIG. 36. Processing is summarized below:

1. The MCP environment application initiates processing by performing an orderly Close operation via one of the existing APIs.
2. DTCM-Client 90 moves the target connection's state to CloseRequested and issues a Close(Orderly) request to DTCM-Server 94. The Close request must be issued on the MSS Endpoint dialog used for data to ensure that any outstanding output is processed by DTCM-Server 94 prior to receipt of the Close request. Note that the MCP environment application can no longer perform WRITE operations but that any input received will be delivered to the application which can continue to perform READs.
3. On processing the Close request, DTCM-Server 94 initiates an orderly TDI-Disconnect request. Like the MCP environment, send operations are not valid after the TDI-Disconnect but input can still be received.
4. On being told that the orderly TDI-Disconnect has been completed, DTCM-Server 94 responds to the Close (Orderly) request. Note that neither the TDI-Disconnect completion nor the Close response indicate completion of processing. Also, input may still be received at this point.
5. After completing processing with the remote endpoint, including an orderly close operation by the peer application, NT TCP/IP 58 provides a TDI-Disconnect Event to DTCM-Server 94 who, in turn, issues a corresponding Disconnect Notification to MCP DTCM-Client 90. Note that input may no longer be received at this point. Also note that the Disconnect Notification must be sent on the MSS Endpoint dialog used for data to ensure that all MCP environment input has been received. After initiating the Disconnect Notification send, DTCM-Server 94 invokes the MSS to close the corresponding Endpoint-Dialog.
6. On receiving the orderly Disconnect Notification, MCP DTCM-Client 90 moves the file state to CLOSED if no remaining input is pending. If input is pending, the file state moves to ClosePending-InputPending to allow remaining input to be read. When the connection goes to the closed state, MCP DTCM-Client 90 invokes the MSS to close its side of the MSS dialog.
7. Each DTCM component is notified independently that the MSS Endpoint-Dialog is closed. This notification triggers final processing, including deallocation of resources. Depending on actual timing, MSS may inform the DTCM components that the MSS Endpoint-Dialog has been closed by the remote side prior to the local side requesting a close.

Figure 37:
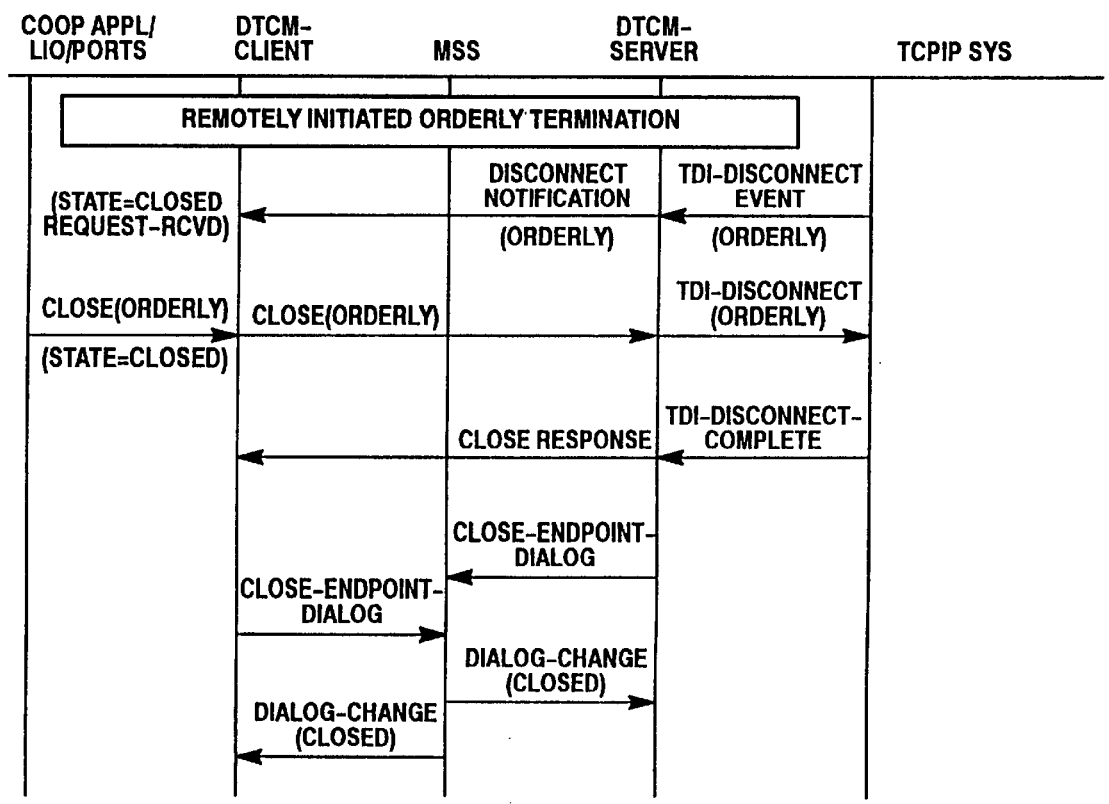
FIG. 37 illustrates normal processing for orderly dialog termination by the remote application in accordance with the invention.

Processing for orderly dialog termination initiated by the remote application is shown in FIG. 37 and is summarized below:

1. NT TCP/IP 58 provides DTCM-Server 94 with an orderly TDI-Disconnect event for the MCP environment side of the TCP dialog. A corresponding orderly Disconnect Notification is issued to DTCM-Client 90 (on the data path).
2. On processing the Disconnect Notification, MCP DTCM-Client 90 moves the connection's state to CLOSEREQUESTRECEIVED. Note that any previously queued input is still READable by the MCP environment application and WRITE operations are still permissible.
3. At the MCP environment application's discretion, it at some later point initiates a Close operation on its side of the TCP Dialog. MCP DTCM-Client 90 moves the connection's state to ClosePending-InputPending. Note that WRITE operations are no longer valid. If or when all of the data has been read by the application, the connection's state goes to closed, and MCP DTCM-Client 90 issues a Close(Orderly) request to DTCM-Server 94.

4. On processing the Close request, DTCM-Server 94 initiates an orderly TDI-Disconnect request. Like the MCP environment, send operations are not valid after the TDI-Disconnect.
5. On being told that the TDI-Disconnect has been completed, DTCM-Server 94 performs its data structure updates and responds to the Close(Orderly) request.
6. Cleanup for the MSS Endpoint-Dialog occurs as described in the MCP environment initiated case described above.

In addition to the normal termination cases described in this section and "abnormal" case described elsewhere, detailed design in each component must handle several additional scenarios as follows:
1. Abortive dialog termination (see section II.F.2).
2. Cases in which close initiation may occur roughly simultaneously in each environment. For example, MCP DTCM-Client 90 may receive a Disconnect Notification after having issued a Close Request but before receiving the corresponding response.
3. Cases in which a pending orderly close is overridden by an abortive close and likewise when an abortive disconnect notification follows an orderly disconnect notification.
4. Close operations that must be initiated and/or completed without the presence of the peer DTCM environment. For example, DTCM-Server 94 must close all dialogs existing on behalf of the MCP environment dialogs when contact with the MCP environment is lost.

2. Abortive TCP Dialog Termination

Figure 38:
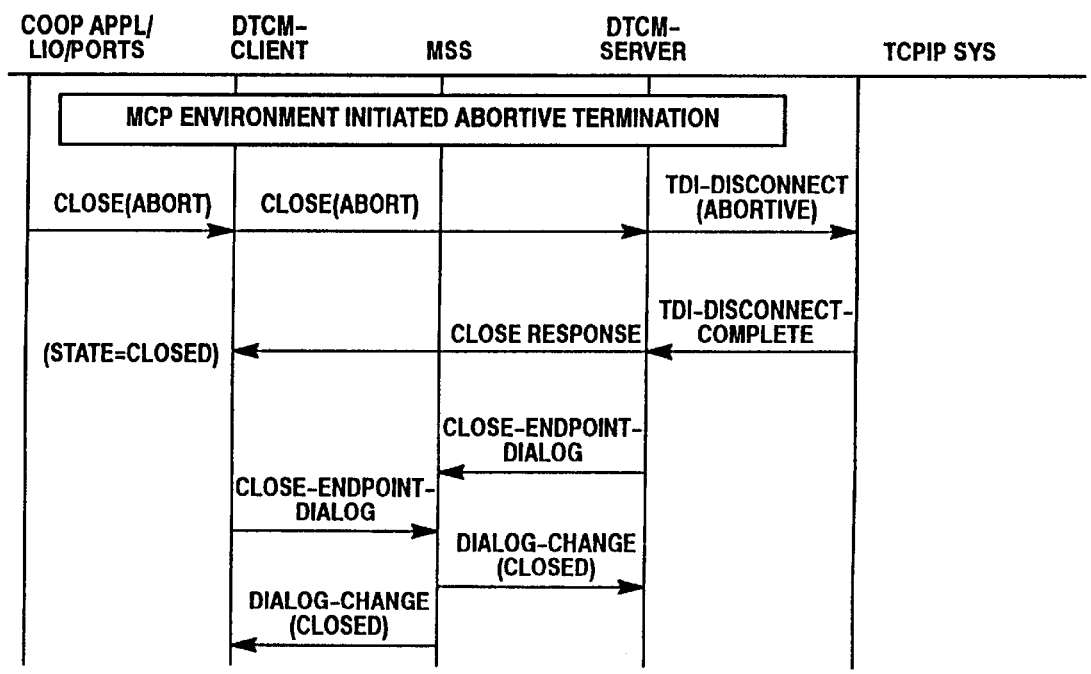
FIG. 38 illustrates normal processing for DTCM abortive dialog termination initiated by the MCP environment in accordance with the invention.

Normal processing for abortive dialog termination initiated by the MCP environment is shown in FIG. 38 and is summarized below:
1. The MCP environment application initiates processing by performing an abortive Close operation via one of the existing APIs.
2. MCP DTCM-Client 90 moves the target connection's state to either Closed or ClosedInputPending. Note that the MCP environment application can no longer perform WRITE operations, but can continue to perform READs, so any input received at this point will be delivered to the application. MCP DTCM-Client 90 issues a Close request to DTCM-Server 94, specifying the abortive option. Unlike an orderly close request, this close request is issued on the MSS control dialog instead on the endpoint dialog because there is no need to ensure delivery of outstanding data.
3. On processing the abortive Close request, DTCM-Server 94 initiates a TDI-Disconnect request, specifying the abortive option. Both send and receive operations are not valid after the abortive TDI-Disconnect has been initiated.
4. On being told that the TDI-Disconnect has been completed, DTCM-Server 94 responds to the Close (Abort) request (like the Close request, this response is issued on the MSS Control Dialog). Note that, unlike the orderly close scenario, this Close response does complete processing between DTCM-Client 90 and DTCM-Server 94 (there is no Disconnect Notification in this case). DTCM-Server 94 invokes the MSS to close the corresponding Endpoint-Dialog.
5. When the connection goes to the closed state, MCP DTCM-Client 90 invokes the MSS to close its side of the MSS dialog.
6. Each DTCM component is notified independently when that the MSS Endpoint-Dialog is Closed. This notification triggers final processing, including deallocation of resources. Depending on actual timing, MSS may inform the DTCM components that the MSS Endpoint-Dialog has been closed by the remote side prior it the local side requesting a close.

Figure 39:
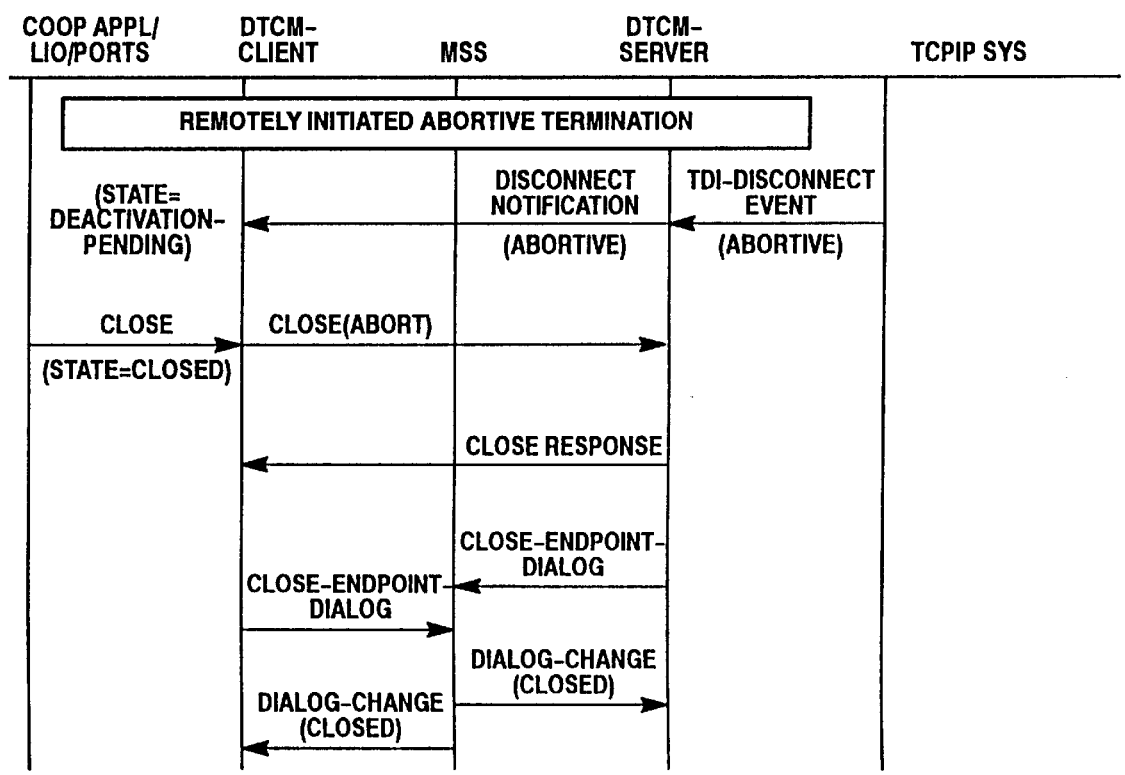
FIG. 39 illustrates normal processing for DTCM abortive dialog termination initiated by the remote application (or by NT TCP/IP due to a network error) in accordance with the invention.

Processing for abortive dialog termination initiated by the remote application (or by NT TCP/IP 58 due to a network error) is shown in FIG. 39 and is summarized below:
1. NT TCP/IP 58 provides DTCM-Server 94 with an abortive TDI-Disconnect event for the MCP environment side of the TCP dialog. A corresponding abortive Disconnect Notification is issued to DTCM-Client 90 (on the control path).
2. On processing the abortive Disconnect Notification, MCP DTCM-Client 90 moves the connection's state to DEACTIVATIONPENDING. Note that any previously queued input is still READable by the MCP environment application but WRITE operations are no longer permissible.
3. At the MCP environment application's discretion, it at some later point initiates a Close operation on its side of the TCP Dialog. (Note that unlike the NT TDI application interface, the MCP APIs do require/allow an application to close a dialog after being informed that the remote application has abortively closed.) DTCM-Client 90 then issues a Close(Abort), regardless of the type of close performed by the application, and moves the connection's state to ClosedInputPending or Closed, depending on whether or not there is outstanding data to be read. If or when all of the data has been read by the application, the connection's state goes to closed.
4. On processing the Close(Abort) request, DTCM-Server 94 simply replies with a corresponding response because it has already sent an abortive Disconnect Notification. The close response is issued on the MSS control dialog.
5. Cleanup for the MSS Endpoint-Dialog occurs as described in the orderly termination cases described earlier.

G. DTCM Protocol

In a preferred embodiment of the invention as described above for the Unisys ClearPath HMP NX enterprise server, the DTCM protocol is designed to optimize performance of the MCP components (at the cost of potentially decreasing performance of the NT components). To this end, field container sizes and alignments are selected to be favorable for MCP environment manipulation. Also, note that this protocol definition includes items related to DTCM implementation for UDP which is otherwise not described in the detailed description above.

1. Common DTCM Data Structures

The data structures used in the DTCM protocol are described in this section.

EBCDIC-String-Structure

Character strings are transmitted with the following format:

Field: String-Length

Data Type: Unsigned Integer

Length: 2 bytes

Description: Specifies the number of bytes in the String-Value field which follows.

Field: String-Value

Data Type: Array of characters.

Length: As specified by String-Length field.

Description: The character string value.

IP-Address-Structure
  An IP address is formatted as follows:
  Field: IP-Version
  Data Type: Unsigned Integer
  Length: 1 byte
  Description: Identifies the IP version this IP-Address is formatted in.
  Field: Pad
  Data Type: Not applicable.
  Length: 1 byte
  Description: This field is used to maintain byte-alignment of fields favorable for MCP environment interpretation of this data structure.
  Field: IP-Address
  Data Type: Array of 1-byte, unsigned integers.
  _Length: When IP-Version is 4, length is 4 bytes.
  _Description: The IP address.
2. DTCM Control Message Interfaces
  All control messages contain, at their start, the header described below.
  DTCM Control Message Header
  Field: Interface-Level
  Data Type: Unsigned integer
  Length: 2 bytes
  Description: Identifies the level of interface this message contains.
  Field: Message-Class
  Data Type: Unsigned integer
  Length: 2 bytes
  Values: REQUEST 1;
    RESPONSE=2;
    NOTIFICATION=3
  Description: Identifies the class for this message. A REQUEST contains a request for action. A RESPONSE is the result of completing processing for a REQUEST. A NOTIFICATION provides unsolicited information.
  Field: Message-Type
  Data Type: Unsigned Integer
  Length: 2 bytes
    For requests/responses:
      HANDSHAKE=0x0001
      OPEN=0x0010
      CLOSE=0x0011
      OPEN-ABORT=0x0012
    For notifications:
      DISCONNECT=0x0100
      IP-ADDRESS-AVAILABILITY=0x0101
      CREDIT-ADJUSTMENT=0x0102
  Field: Message-Length
  Data Type: Unsigned Integer
  Length: 6 bytes
  Description: The length, in bytes, of this message (including the header).
  Field: Request-Reference
  Data Type: Unsigned Integer
  Length: 6 bytes
  Description: In a request, a requester specified value which will be returned in the corresponding response. Its value is completely transparent to all modules except the requester. In a notification, its value is irrelevant but should be set to all zeros.
  Field: Requester-Connection-Reference
  Data Type: Unsigned Integer
  Length: 6 bytes
  Description: In a message which is applicable to an individual Connection, this field contains the requester's assigned reference value for that Connection. The requesting DTCM component provides the responding DTCM component with this value in its OPEN request. When the message does not apply to a particular Connection, its value must be all zeros.
  Field: Responder-Connection-Reference
  Data Type: Unsigned Integer
  Length: 6 bytes
  Description: In a message which is applicable to an individual Connection, this field contains responder's assigned reference value for that Connection. The responding DTCM component provides the requesting DTCM component with this value in its OPEN response. When the message does not apply to a particular Connection, its value must be all zeros. Also, in both the OPEN and OPEN-ABORT requests, its value must be zeroes because the requesting DTCM component does not yet know the responder's assigned value.
  Field: Status
  Data Type: Unsigned Integer
  Length: 4 bytes
  Description: In a response message, provides the response/error code for the requested operation. For all other message classes, this value must be all zeros.
  Field: Pad
  Data Type: Not applicable.
  Length: 2 bytes
  Description: This field is used to maintain byte-alignment of fields favorable for MCP environment interpretation of fields which follow this header.
CLOSE Request/Response
  This request is issued by DTCM-Client to close (and destroy) a DTCM-Server Endpoint.
  Request Format
  In addition to the control message header, this request contains the following fields:
  Field: Close-Type
  Data Type: Unsigned Integer
  Length: 1 byte
  Values: ORDERLY=1
    ABORTIVE=2
  Description: Specifies whether an orderly or an abortive close should be performed.
  Response Format(s)
  DTCM-Server 94 may return any of the following status codes:
    STATUS_DTCM_SUCCESS indicates that the request was completed successfully.
    STATUS_DTCM_ALREADY_CLOSED indicates that the target endpoint is already closed.
    STATUS_DTCM_ALREADY_CLOSING indicates that a close operation of this type (orderly/abortive) has already been initiated or that an orderly close was requested when an abortive close was already in progress.
  There are no fields other than the control message header for any of these responses.

Credit-Adjustment Notification

This notification is issued by either DTCM-Server 94 or DTCM-Client 90 to adjust Input/Output credits.

Notification Format

In addition to the control message header, this notification contains the following fields:

Field: Adjustment-Type

Data Type: Unsigned Integer

Length: 1 byte

Values: ZERO-CREDITS=1
SET-CREDITS=2
ADD-CREDITS=3
DELETE-CREDITS=4

Description: Specifies the action requested: ZERO-CREDITS means that the issuer is removing all credits, SET-CREDITS means that the issuer is setting a new credit limit, ADD-CREDITS grants additional credits, and DELETE-CREDITS removes a specific amount of previously granted credits.

Field: Credits

Data Type: Unsigned Integer

Length: 4 bytes

Description: When Adjustment-Type is SET-CREDITS, specifies the new credit limit. When Adjustment-type ADD-CREDITS or DELETE-CREDITS, specifies the number of credits being added or deleted.

DISCONNECT Notification

This notification is issued by DTCM-Server 94 to provide indication that a transport connection has been disconnected (the remote side of the dialog has closed).

Notification Format

In addition to the control message header, this notification contains the following fields:

Field: Disconnect-Type

Data Type: Unsigned Integer

Length: 1 byte

Values: ORDERLY=1
ABORTIVE=2

Description: Specifies whether the disconnect is orderly or abortive. Note that an abortive disconnect may override a previous orderly disconnect.

Handshake Request/Response

This request is issued by DTCM-Client 90 to initialize communication with a DTCM-Server 94.

Request Format

In addition to the control message header, this request contains the following fields:

Field: DTCM-Client Version

Data Type: String-Structure

Description: A string identifying the version (e.g., software level) of DTCM-Client 90. This value is used for diagnostic purposes only.

Response Format(s)

DTCM-Server 90 may return any of the following status codes:

STATUS_DTCM_SUCCESS indicates that the Handshake request was successful.

STATUS_DTCM_INCOMPATIBLE_INTERFACE_LEVEL indicates that Server does not understand the specified interface level.

When STATUS_DTCM_SUCCESS is returned, the following fields are present after the control message header:

Field: IP-Address-Count

Data Type: Unsigned Integer

Length: 2 bytes

Description: Specifies the number of entries in the Available-IP-Addresses field below (this value may be zero).

Field: Pad

Data Type: Not applicable.

Length: 4 bytes

Description: This field is used to maintain byte-alignment of fields favorable for MCP environment interpretation of fields in this data structure.

Field: Available-IP-Addresses

Data Type: Array of IP-Address-Structure entries

Description: Specifies all IP addresses in the Server's environment which are currently available for use by the DTCM-Client 90.

Field: DTCM-Server Version

Data Type: EBCDIC-String-Structure

Description: A string identifying the version (e.g., software level) of DTCM-Server 94. This value is used for diagnostic purposes only.

When STATUS-INCOMPATIBLE-INTERFACE-LEVEL is returned, the following fields are present after the control message header:

Field: Supported-Interface-Level

Data Type: Unsigned Integer

Length: 2 bytes

Values: Indicates the highest interface level, less than the Client's specified interface level, which is supported by the Server. DTCM-Client 90 may attempt another handshake at that interface level or lower.

IP-Address Availability Notification

This request is issued by DTCM-Server 94 to indicate that a DTCM-Client 90 environment IP address in the Server's environment has become available or has become unavailable for use.

Notification Format

In addition to the control message header, this notification contains the following fields:

Field: IP-Address

Data Type: IP-Address-Structure

Description: Specifies the IP-Address that has changed status.

Field: Availability

Data Type: Unsigned Integer

Length: 1 byte

Values: AVAILABLE=1
UNAVAILABLE=2

Description: Specifies whether the IP-Address has become available or unavailable.

Open Request/Response

This request is issued by DTCM-Client 90 to create and open a DTCM-Server 94 Endpoint.

Request Format

In addition to the control message header, this request contains the following fields:

Field: Open-Type
Data Type: Unsigned Integer
Length: 1 byte
Values: UDP=1
TCP-PASSIVE=2
TCP-DIRECTED=3
Description: Specifies what type of open is requested. UDP indicates that a UDP Endpoint is requested. TCP-PASSIVE and TCP-DIRECTED indicate that a TCP Endpoint is requested with a either a passive or directed open operation, as appropriate.
Field: Pad
Data Type: Not applicable.
Length: 1 byte
Description: This field is used to maintain byte-alignment of fields favorable for MCP environment interpretation of fields in this data structure.
Field: Local-Port-Number
Data Type: Unsigned integer
Length: 2 bytes
Description: Specifies the local Port Number to be used for this Endpoint. In all cases, a zero value is permitted—completion of the open operation results in selection of a local Port Number.
Field: Remote-Port-Number
Data Type: Unsigned integer
Length: 2 bytes
Description: Not applicable to UDP Endpoints (ignored by DTCM-Server). For TCP-DIRECTED opens, its value may not be zero. For TCP-PASSIVE opens a zero value is permitted—completion of the open operation results in assignment of a remote Port Number.
Field: Pad
Data Type: Not applicable.
Length: 2 bytes
Description: This field is used to maintain byte-alignment of fields favorable for MCP environment interpretation of fields in this data structure.
Field: Receive-Credit-Limit
Data Type: Unsigned integer
Length: 4 bytes
Description: The number of receive credits initially available to DTCM-Server 94.
Field: Pad
Data Type: Not applicable.
Length: 2 bytes
Description: This field is used to maintain byte-alignment of fields favorable for MCP environment interpretation of fields in this data structure.
Field: My-MSS-Dialog-Id
Data Type: MSS-Dialog-Id
Description: Specifies the Client environment's MSS dialog id for the Endpoint-Dialog to be used with the Server-Endpoint.
Field: Local-IP-Address
Data Type: IP-Address-Structure
Description: Specifies the local IP address to be used for this Endpoint. For UDP Endpoints, a zero value is permitted and implies the Endpoint is not associated with any particular local IP address. For TCP Endpoints, a zero value is also permitted—completion of the open operation results in selection of a local IP address.
Field: Remote-IP-Address
Data Type: IP-7Address-Structure
Description: Not applicable to UDP Endpoints (ignored by DTCM-Server). For TCP-DIRECTED opens, its value specifies the remote system to connect to; its value may not be null. For TCP-PASSIVE opens, its value specifies which remote system may connect to this passive open—its value may be null indicating that any remote system is acceptable; in this case, completion of the open operation results in assignment of a remote IP address.
Response Format(s)
DTCM-Server 94 may return any of the following status codes:
STATUS_DTCM_SUCCESS indicates that the request was completed successfully.
STATUS_DTCM_INSUFFICIENT_RESOURCES indicates that DTCM was not able to procure resources required to complete this request.
STATUS_NT_INSUFFICIENT_RESOURCES indicates that some underlying NT component was not able to procure resources required to complete this request.
STATUS_NT_CONNECTION_REFUSED indicates that the transport connection attempt was refused by the remote system.
STATUS_NT_NETWORK_UNREACHABLE indicates the remote network is not reachable by the transport.
STATUS_NT_HOST_UNREACHABLE indicates the remote system is not reachable by the transport.
When STATUS_DTCM_SUCCESS is returned, the following fields are present after the control message header (none of the other responses contain data fields):
Field: Local-Port-Number
Data Type: Unsigned integer
Length: 2 bytes
Description: Indicates the local port number for this endpoint.
Field: Remote-Port-Number
Data Type: Unsigned integer
Length: 2 bytes
Description: Indicates the remote port number for this endpoint. Not applicable for UDP Endpoints.
Field: Pad
Data Type: Not applicable.
Length: 2 bytes
Description: This field is used to maintain byte-alignment of fields favorable for MCP environment interpretation of fields in this data structure.
Field: Send-Credit-Limit
Data Type: Unsigned integer
Length: 4 bytes
Description: The number of send credits initially available to DTCM-Client 90.
Field: Pad
Data Type: Not applicable.
Length: 2 bytes
Description: This field is used to maintain byte-alignment of fields favorable for MCP environment interpretation of fields in this data structure.

Field: Local-IP-Address

Data Type: IP-Address-Structure

Description: Indicates the local IP address for this endpoint.

Field: Remote-IP-Address

Data Type: IP-Address-Structure

Description: Indicates the remote IP address for this endpoint. Not applicable for UDP Endpoints.

Open-Abort Request/Response

This request is used by DTCM-Client 90 to abort an in-progress Open operation. Note that the Open-Endpoint operation may have been completed in the Server environment but not yet reflected in the Client environment.

Request Format

There are no data fields (other than the control message header).

Response Format(s)

DTCM-Server 94 may return only the STATUS_DTCM_SUCCESS status code, indicating that the request was completed successfully.

When STATUS_DTCM_SUCCESS is returned, the following fields are present after the control message header:

Field: Open-Completed

Data Type: BOOLEAN

Length: 1 byte

Values: 0 (=>FALSE)
1 (=>TRUE)

Description: Indicates whether the original Open-Endpoint had been completed in the Server environment.

Data Transfer Interfaces

All data transfers between DTCM components include a Data Transfer Header. Variations of this header exist for TCP and UDP traffic. However, for either variant, its length is always fixed. When the MSS completes a data transfer in multiple pieces, the Data Transfer Header is included only in the first piece.

Data Transfer Header

Field: Interface-Level

Data Type: Unsigned Integer

Length: 2 bytes

Description: Identifies the level of interface this message contains. At this point only interface level 1 is defined. Future implementations may use additional interface levels.

Field: Credited-Adjustment

Data Type: Signed Integer

Length: 4 bytes

Description: Indicates piggy-back credit grants or reductions. The most significant bit is used for sign (one is negative); the remaining bits indicate credits granted/reduced. This value may be zero.

Field: Sequence-Number

Data Type: Unsigned Integer

Length: 4 bytes

Description: The sequence number for this data transfer operation—each data transfer operation is numbered sequentially starting at one and wrapping around as needed. Although this field may be utilized for future functionality, its current purpose is for diagnostics only.

Field: Data-Flags

Data Type: Bit Mask

Length: 2 bytes

Description: Contains individual flags as defined below:

TRUNCATED (0x0001)—For UDP transfers only, indicates that this message has been truncated. Valid only on transfers from Server to Client.

ENTIRE-MESSAGE (0x0002)—For TCP transfers, maps to usage of the PUSH flag.

BROADCAST (0x0004)—For UDP transfers from Server, indicates that data was broadcast.

For UDP transfers from Client, indicates that the data is to be broadcast.

URGENT-DATA (0x0008)—indicates that this data transfer contains urgent data. Not applicable for UDP transfers.

UDP-INFO-PRESENT (0x0010)—indicates whether the UDP-Info-xxx fields (see below) is present. This flag will always be on for UDP transfer and always off for TCP transfers.

Field: UDP-Remote-Port

Data Type: Unsigned Integer

Length: 2 bytes

Description: For transfers from Server, indicates the source port number. For transfers from Client, indicates the destination port number.

Field: UDP-Local-IP-Address

Data Type: IP-Address-Structure

Description: For transfers from Server, indicates the IP address this datagram was received on. For transfers from Client, indicates the IP address the datagram should be sent from.

Field: UDP-Remote-IP-Address

Data Type: IP-Address-Structure

Description: For transfers from Server, indicates the source IP address. For transfers from Client, indicates the destination IP address (may be a broadcast address in this case).

Those skilled in the art will appreciate that the present invention is not limited to use with only one network protocol provider on each system. Rather, the present invention can be used to transfer data to and from multiple network protocol providers on each system. Also, it is understood that changes may be made to the embodiments described above without departing from the broad inventive concepts thereof. For example, while the present invention is described above in the context of a system comprising an A Series server and an NT server, it is understood that the methods and apparatus of the present invention can be employed with any two closely coupled computer systems, whether of the same or different types. Additionally, the interconnection of the present invention is not limited to the particular embodiments disclosed. Rather, the term "interconnection" is intended to encompass other methods and apparatus for transferring data between the I/O subsystems of the first and second computer systems. For example, other embodiments may not require the functionality of the QSP and LANSG components. Rather, a more direct interface between the interconnection device driver (ICD) and the MSS and DTCM could be employed. Accordingly, the present invention is not limited to the particular embodiments disclosed, but is intended to cover all modifications that are within the spirit and scope of the invention as defined by the appended claims.

What is claimed is:

1. Apparatus which enables a transport protocol executing on a first computer system to be utilized by applications executing on a second computer system which is directly interconnected and closely coupled to the first computer system, comprising:

an interconnection coupling an input/output (I/O) subsystem of the first computer system to an I/O subsystem of the second computer system and over which data can be transmitted between the first and second computer systems independent of a network interface card;

an interconnection messaging system executing on the first and second computer systems that provides general purpose transport interfaces between said first and second computer systems; and a distributed transport communications manager executing on the first and second computer systems, said distributed communications manager controlling use of said interconnection messaging system to establish a dialog through which the transport protocol of the first computer system may be used by an application executing on the second computer system in a manner which is transparent to said application.

2. The apparatus as in claim 1, wherein the interconnection between the I/O subsystem of the first computer system and the I/O subsystem of the second computer system comprises a physical connection between the I/O subsystems over which data can be transmitted.

3. The apparatus as in claim 1, wherein the interconnection messaging system includes a messaging subsystem ("MSS") which provides said general purpose transport interfaces, said general purpose transport interfaces being independent of communication protocols of the interconnection, and which provides further interfaces on either end of the interconnection which are dependent on the communication protocols of the interconnection, whereby only the further interfaces must be changed when the interconnection is changed.

4. Apparatus as in claim 3, wherein the MSS includes an MSS component on each of said first and second computer systems, each MSS component having at least one local MSS user connected thereto through said independent transport interface, an MSS component on the first computer system creating a dialog to each complementary remote MSS user of the second computer system.

5. Apparatus as in claim 4, wherein each MSS component includes means for building dialog tables for local MSS users informing the local MSS users about any complementary remote MSS users accessible via the interconnection and for updating said dialog tables as complementary remote MSS users are added or removed.

6. Apparatus as in claim 4, wherein each MSS component includes means for performing dialog management functions which allow the local MSS users to establish, receive status about, and destroy dialogs with the complementary remote MSS users over the interconnection.

7. Apparatus as in claim 4, wherein each MSS component includes means for performing control message functions which allow the local MSS users and the complementary remote MSS users to pass control messages to each other in a manner which is independent of the communication protocols of the interconnection.

8. Apparatus as in claim 4, wherein each MSS component includes means for transferring data between local and complementary remote MSS users over dialogs established between said local and remote MSS users.

9. Apparatus as in claim 4, wherein one of said local and one of said complementary remote MSS users comprise complementary components of said distributed transport communications manager.

10. The apparatus of claim 9, wherein said complementary components of said distributed transport communications manager use the MSS and the transport protocol of the first computer system to provide dialog establishment, data transfer, and dialog termination between a network application executing on said second computer system and another network application executing in a computer network including said first and second computer systems.

11. Apparatus as in claim 10, wherein said complementary components respectively interface with said network application executing on said second computer system and the transport protocol executing on the first computer system, and said complementary components are implemented on the first and second computer systems as complementary MSS users which are connected to the MSS through the independent transport interfaces of the MSS.

12. Apparatus as in claim 1, wherein said transport protocol executing on said first computer system is utilized by a plurality of networked computer systems including said second computer system, each of said plurality of computer systems being directly interconnected and closely coupled to said first computer system and using said interconnection messaging system to establish dialogs through which the transport protocol of the first computer system may be used by applications executing on the networked computer systems in a manner which is transparent to said applications.

13. Apparatus as in claim 1, wherein applications executing on said second computer system utilize transport protocols executing on a plurality of networked computer systems including said first computer system, each of said plurality of networked computer systems being directly interconnected and closely coupled to said second computer system and using said interconnection messaging system to establish dialogs through which the transport protocols of the networked computer systems may be used by applications executing on said second computer systems in a manner which is transparent to said applications.

14. Apparatus as in claim 1, wherein said distributed transport communications manager creates a plurality of dialogs over the interconnection for a plurality of pairs of network applications executed by said first and second computer systems whereby the network applications in each pair may communicate over the interconnection in a manner which is transparent to the first and second network applications in the pair, said distributed transport communications manager further specifying a transport dialog which is to be used for the data transfer between the network applications in the pair.

15. A method for enabling a transport protocol executing on a first computer system to be utilized by applications executing on a second computer system which is directly interconnected and closely coupled to the first computer system via an interconnection between an input/output (I/O) subsystem of the first computer system and an I/O subsystem of the second computer system to transmit data therebetween independent of a network interface using an interconnection messaging system on the first and second computer systems having a messaging subsystem (MSS) that provides general purpose transport interfaces between the first and second computer systems, use of said interconnection messaging system being controlled by a distributed transport communications manager (DTCM) having complementary DTCM components on said first and second computer systems, comprising the steps of:

said complementary DTCM components opening an MSS dialog over the interconnection;

the transport protocol of the first computer system and a transport entity in a computer network including said second computer system opening a transport dialog between said first computer system and another computer system in the computer network; and managing said MSS dialog and said transport dialog so that the transport protocol of the first computer system may be used by a network application executing on the second computer system in a manner which is transparent to said network application.

16. The method of claim 15, comprising the additional steps of creating a plurality of MSS dialogs over the interconnection for a plurality of pairs of network applications whereby the network applications in each pair may communicate in a manner which is transparent to the network applications in the pair, and specifying the transport dialog which is to be used for the data transfer between the network applications in the pair.

* * * * *